(12) United States Patent
Nakamura et al.

(10) Patent No.: US 8,750,632 B2
(45) Date of Patent: Jun. 10, 2014

(54) APPARATUS AND METHOD FOR ENCODING IMAGES FROM MULTIPLE VIEWPOINTS AND ASSOCIATED DEPTH INFORMATION

(75) Inventors: Hiroya Nakamura, Yokohama (JP); Motoharu Ueda, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 402 days.

(21) Appl. No.: 13/142,188

(22) PCT Filed: Dec. 9, 2009

(86) PCT No.: PCT/JP2009/006715
§ 371 (c)(1),
(2), (4) Date: Jun. 24, 2011

(87) PCT Pub. No.: WO2010/073513
PCT Pub. Date: Jul. 1, 2010

(65) Prior Publication Data
US 2011/0255796 A1    Oct. 20, 2011

(30) Foreign Application Priority Data

Dec. 26, 2008  (JP) ................................. 2008-333854
Dec. 26, 2008  (JP) ................................. 2008-333855
Dec. 26, 2008  (JP) ................................. 2008-333856
Dec. 26, 2008  (JP) ................................. 2008-333857
Dec. 26, 2008  (JP) ................................. 2008-333858
Dec. 26, 2008  (JP) ................................. 2008-333859

(51) Int. Cl.
*G06K 9/00*     (2006.01)
*G06K 9/36*     (2006.01)
*G06K 9/46*     (2006.01)

(52) U.S. Cl.
USPC ........................................... 382/232; 382/154

(58) Field of Classification Search
USPC ........ 382/154, 232, 236; 375/240.01, 240.08, 375/240.1
See application file for complete search history.

(56) References Cited

U.S. PATENT DOCUMENTS 7,292,257 B2 *  11/2007  Kang et al. .................... 345/629
2005/0041737 A1 *  2/2005  Matsumura et al. ..... 375/240.01

(Continued)

FOREIGN PATENT DOCUMENTS

JP     61-144191       1/1986
JP     06-098312 A     4/1994

(Continued)

OTHER PUBLICATIONS

Morvan et al. ("Multiview depth-image compression using an extended H.264 encoder," ACIVS 2007, pp. 675-686).*

(Continued)

*Primary Examiner* — Yubin Hung
(74) *Attorney, Agent, or Firm* — Venable LLP; Michael A. Sartori; F. Brock Riggs

(57) ABSTRACT

An image signal encoding unit generates image encoded data by encoding a plurality of images from multiple viewpoints different from each other. A depth information encoding unit (e.g., a depth signal encoding unit) generates depth information encoded data by encoding depth information that indicates the depth of a specific space from at least one viewpoint. A unitization unit generates an encoded stream including the image encoded data and depth information encoded data, which are respectively generated by the image signal encoding unit and the depth information encoding unit.

4 Claims, 26 Drawing Sheets

(56) References Cited

U.S. PATENT DOCUMENTS

| | | |
|---|---|---|
| 2006/0132610 A1 | 6/2006 | Xin et al. |
| 2006/0146138 A1 | 7/2006 | Xin et al. |
| 2006/0146141 A1 | 7/2006 | Xin et al. |
| 2006/0146143 A1 | 7/2006 | Xin et al. |
| 2007/0030356 A1 | 2/2007 | Yea et al. |
| 2007/0109409 A1 | 5/2007 | Yea et al. |
| 2007/0121722 A1 | 5/2007 | Martinian et al. |
| 2009/0079728 A1* | 3/2009 | Sugita et al. ............. 345/418 |
| 2010/0278267 A1* | 11/2010 | Lai et al. ............. 375/240.16 |
| 2011/0044550 A1* | 2/2011 | Tian et al. ............. 382/238 |

FOREIGN PATENT DOCUMENTS

| | | | |
|---|---|---|---|
| JP | 2001-061164 A | | 3/2001 |
| JP | 2008-022549 A | | 1/2008 |
| JP | 2008-263528 A | | 10/2008 |
| JP | 2008263528 A | * | 10/2008 |
| WO | WO-2008153294 A2 | | 12/2008 |

OTHER PUBLICATIONS

Merkle et al. ("Efficient compression of multi-view video exploiting inter-view dependencies based on H.264/MPEG4-AVC," IEEE ICME 2006, pp. 1717-1720).*

Yang et al. ("Efficient multiview video coding based on MPEG-4," PCM 2004, pp. 167-174).*

Joint Draft 6.0 on Multiview Video Coding, Joint Video Team of ISO/IEC MPEG & ITU-T VCEG, JVT-Z209, Jan. 2008.

ITU-T Recommendation H.264 (Nov. 2007).

* cited by examiner

FIG.9
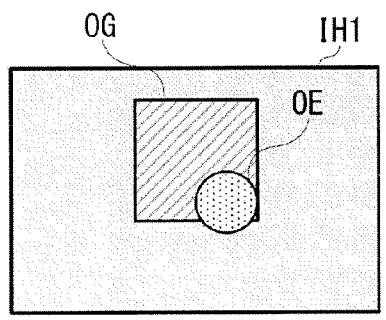
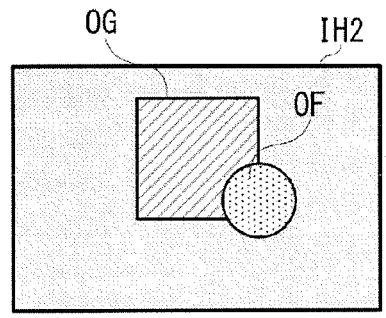
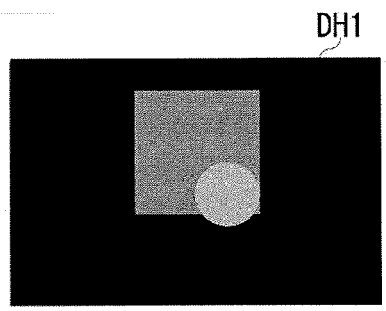
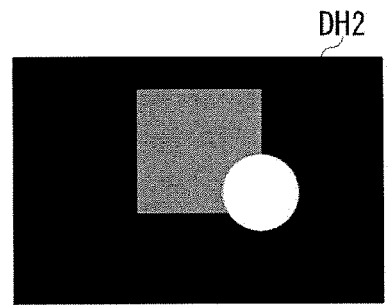
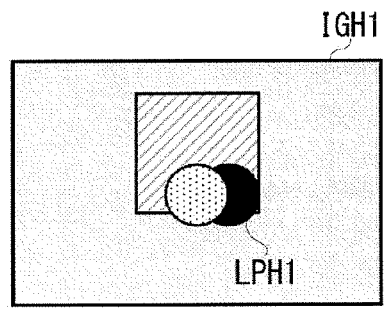
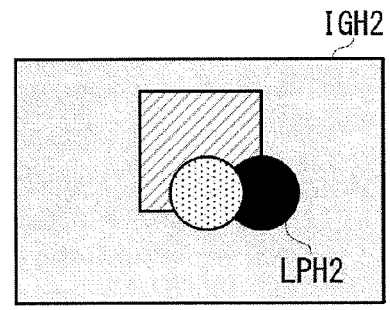
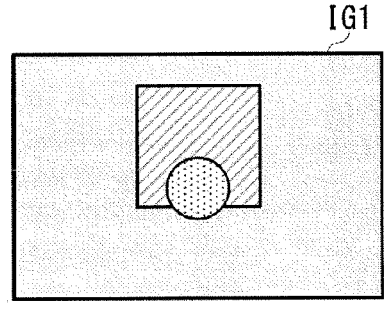
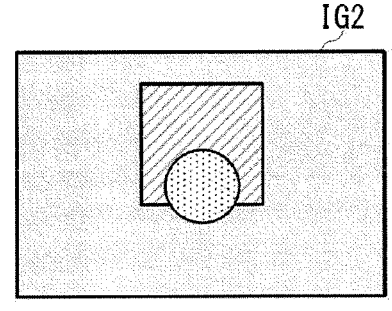

FIG.12

| nal_unit_type | DEFINITION OF NAL UNIT |
|---|---|
| 0 | NON-DEFINED |
| 1 | ENCODED SLICE OF NON-IDR PICTURE |
| 2 | ENCODED SLICE OF DATA PARTITION A |
| 3 | ENCODED SLICE OF DATA PARTITION B |
| 4 | ENCODED SLICE OF DATA PARTITION C |
| 5 | ENCODED SLICE OF IDR PICTURE |
| 6 | SEI (SUPPLEMENTAL ENHANCEMENT INFORMATION) |
| 7 | SEQUENCE PARAMETER SET |
| 8 | PICTURE PARAMETER SET |
| 9 | AU DELIMITER |
| 10 | END OF SEQUENCE |
| 11 | END OF STREAM |
| 12 | FILLER DATA |
| 13 | SEQUENCE PARAMETER SET EXTENSION |
| 14 | PREFIX NAL UNIT |
| 15 | SUBSET SEQUENCE PARAMETER SET |
| 16, 17, 18 | UNUSED (RESERVED FOR FUTURE EXTENSION) |
| 19 | ENCODED SLICE OF ENCODED SUPPLEMENTAL PICTURE |
| 20 | ENCODED SLICE (OTHER THAN BASE VIEWPOINT) |
| 21, 22, 23 | UNUSED (RESERVED FOR FUTURE EXTENSION) |
| 24, 25, 26, 27, 28, 29, 30, 31 | NON-DEFINED |

APPARATUS AND METHOD FOR ENCODING IMAGES FROM MULTIPLE VIEWPOINTS AND ASSOCIATED DEPTH INFORMATION

FIELD OF THE INVENTION

The present invention relates to an apparatus, a method, and a program for encoding images taken from multiple viewpoints different from each other, and to an apparatus, a method, and a program for decoding an image that decodes encoded image data in which images taken from multiple viewpoints different from each other are encoded.

BACKGROUND OF ART

In recent years, applications using images from multiple viewpoints have been widely used. An example of the applications is a binocular three-dimensional (3D) television system. In the binocular 3D television system, an image for left eye and that for right eye, which have been respectively taken from two directions different from each other by two cameras, are generated and displayed on a common screen to present a 3D image to a viewer. In this case, the image for left eye and that for right eye are separately transmitted or recorded as independent images, respectively. In this case, an amount of information that is approximately two times that of a single two-dimensional (2D) image is needed.

Accordingly, a technique is proposed in which, assuming that one of the images for left eye and right eye is a main image and the other thereof is a sub-image, the information of the sub-image is compressed by the general compression encoding method to suppress the amount of information (see, for example, Patent Document 1). In the proposed 3D TV image transmission method, it is made that, for every small area of the sub-image, a relative position having high correlation with the main image is determined such that a positional deviation amount (hereinafter, referred to as a disparity vector) and a differential signal (hereinafter, referred to as a prediction residual signal) of the relative position are transmitted or recorded. An image close to the sub-image can be restored by using the main image and the disparity vector; however, because the information of the sub-image that the main image does not include, such as the information of an area shadowed by an object, cannot be restored, the prediction residual signal is also transmitted or recorded.

In 1996, a 3D image encoding method called Multi-view Profile (ISO/IEC 13818-2/AMD3) has been added to the MPEG-2 Video (ISO/IEC 13818-2), which is the international standard for encoding a single-view image. The MPEG-2 Video Multi-view Profile is a two-layer encoding method in which an image for left eye is encoded in the base layer and that for right eye is encoded in the enhancement layer, and an image is compression-encoded by using the disparity-compensated prediction utilizing an inter-view redundancy, in addition to the motion-compensated prediction utilizing a temporal redundancy and the discrete cosine transform utilizing a spatial redundancy.

Also, a technique is proposed in which an amount of information of multi-view images taken by three or more cameras is suppressed by using the motion-compensated prediction and the disparity-compensated prediction (see, for example, Patent Document 2). In the proposed high-efficient image encoding method, the encoding efficiency is improved by performing pattern matching with reference pictures from multiple viewpoints to select a motion-compensated prediction image or a disparity-compensated prediction image having the smallest error.

Also, work for standardizing the Multiview Video Coding (MVC) (hereinafter, referred to as the MVC), in which the AVC/H. 264 (see Non-Patent Document 1) is extended to multi-view images, is underway in the JVT (Joint Video Team) (see Non-Patent Document 2). Similarly to the aforementioned MPEG-2 Video Multi-view Profile, the encoding efficiency of the MVC is also improved by adopting a prediction between viewpoints.

Patent Documents

[Patent Document 1] Japanese Patent Application Publication No. S61-144191
[Patent Document 2] Japanese Patent Application Publication No. H6-98312

Non-Patent Documents

[Non-Patent Document 1] ITU-T Recommendation H.264 (November 2007)
[Non-Patent Document 2] Joint Draft 6.0 on Multiview Video Coding, Joint Video Team of ISO/IEC MPEG & ITU-T VCEG, JVT-Z209, January 2008

DISCLOSURE OF THE INVENTION

Problem to be Solved by the Invention

Multi-view images from multiple viewpoints can be encoded by using the aforementioned various methods. In these methods, however, all images from required viewpoints are encoded, and hence it is mostly difficult to efficiently transmit or store multi-view images, taking into consideration limited transmission speed and storage capacity. For example, when the number of required viewpoints is large, an amount of data, occurring when all images from these viewpoints are transmitted or stored, becomes very large. That is, it is needed that a very large amount of data is received or read on the decoding side. Further, it is mostly difficult to accurately generate, on the decoding side, a free-viewpoint image in accordance with a user's direction.

The present invention has been made in view of these situations, and a general purpose of the invention is to provide an image encoding apparatus, an image encoding method, and a program thereof, by which multi-view images can be efficiently transmitted or stored. Another general purpose of the invention is to provide an image decoding apparatus, an image decoding method, and a program thereof, by which multi-view images can be efficiently received or read.

Means for Solving the Problem

An image encoding apparatus according to an embodiment of the present invention comprises: a first encoding unit configured to generate image encoded data by encoding a plurality of images from multiple viewpoints different from each other; a second encoding unit configured to generate depth information encoded data by encoding depth information that indicates the depth of a specific space from at least one viewpoint; and a stream generation unit configured to generate an encoded stream including the image encoded data and the depth information encoded data, which have been respectively generated by the first encoding unit and the second encoding unit.

An image encoding apparatus according to another embodiment of the present invention comprises: a first encoding unit configured to generate image encoded data by encoding a plurality of images from multiple viewpoints different from each other; a second encoding unit configured to generate depth information encoded data by encoding depth information that indicates the depth of a specific space from at least one viewpoint; a determination unit configured to determine whether depth information from a certain viewpoint is made to be encoding object; and a stream generation unit configured to generate an encoded stream including both the image encoded data generated by the first encoding unit and the depth information encoded data in which the depth information, which has been determined to be encoding object by the determination unit, has been encoded by the second encoding unit.

An image decoding apparatus according to an embodiment of the present invention comprises: a breakdown unit configured to break down an encoded stream including both image encoded data in which a plurality of images from multiple viewpoints different from each other have been encoded and depth information encoded data in which depth information indicating the depth of a specific space from at least one viewpoint has been encoded; a first decoding unit configured to restore the plurality of images by decoding the image encoded data broken down by the breakdown unit; and a second decoding unit configured to restore the depth information by decoding the depth information encoded data broken down by the breakdown unit.

An image encoding apparatus according to still another embodiment of the present invention comprises: a first encoding unit configured to generate image encoded data by encoding a plurality of images from multiple viewpoints different from each other; a second encoding unit configured to generate depth information encoded data by encoding depth information that indicates the depth of a specific space from at least one viewpoint; a third encoding unit configured to generate parameter information encoded data by encoding parameter information including viewpoint information for specifying the multiple viewpoints that are bases of the plurality of images and the depth information; and a stream generation unit configured to generate an encoded stream including the image encoded data, the depth information encoded data, and the parameter information encoded data, which have been respectively generated by the first encoding unit, the second encoding unit, and the third encoding unit.

An image decoding apparatus according to another embodiment of the present invention comprises: a breakdown unit configured to breakdown an encoded stream including image encoded data in which a plurality of images from multiple viewpoints different from each other have been encoded, depth information encoded data in which depth information indicating the depth of a specific space from at least one viewpoint has been encoded, and parameter information encoded data in which parameter information including viewpoint information for specifying the multiple viewpoints that are bases of the plurality of images and the depth information have been encoded; a first decoding unit configured to restore the plurality of images by decoding the image encoded data broken down by the breakdown unit; and a second decoding unit configured to restore the depth information by decoding the depth information encoded data broken down by the breakdown unit; and a third decoding unit configured to restore the parameter information by decoding the parameter information encoded data broken down by the breakdown unit.

An image encoding apparatus according to still another embodiment of the present invention comprises: a first encoding unit configured to generate image encoded data by encoding a plurality of images from multiple viewpoints different from each other; a depth information generation unit configured to generate, from the plurality of images, depth information indicating the depth of a specific space from at least one virtual viewpoint; a second encoding unit configured to generate depth information encoded data by encoding the depth information generated by the depth information generation unit; and a stream generation unit configured to generate an encoded stream including the image encoded data and the depth information encoded data, which have been respectively generated by the first encoding unit and the second encoding unit.

It is noted that any combination of the aforementioned components or any component or manifestation of the present invention exchanged between methods, apparatuses, systems, recording mediums, computer programs, and so forth, is effective as an embodiment of the present invention.

Advantage of the Invention

According to the preset invention, multi-view images can be efficiently transmitted or stored. Further, multi-view images can be efficiently received or read.

BRIEF DESCRIPTION OF THE DRAWINGS

FIG. 9 is a diagram illustrating the taken images, depth maps corresponding to the images, and generated images, in the example of FIG. 8;

FIG. 12 is a diagram illustrating the types of the NAL unit stipulated in the AVC/H.264;

REFERENCE NUMERALS

Figure 1:
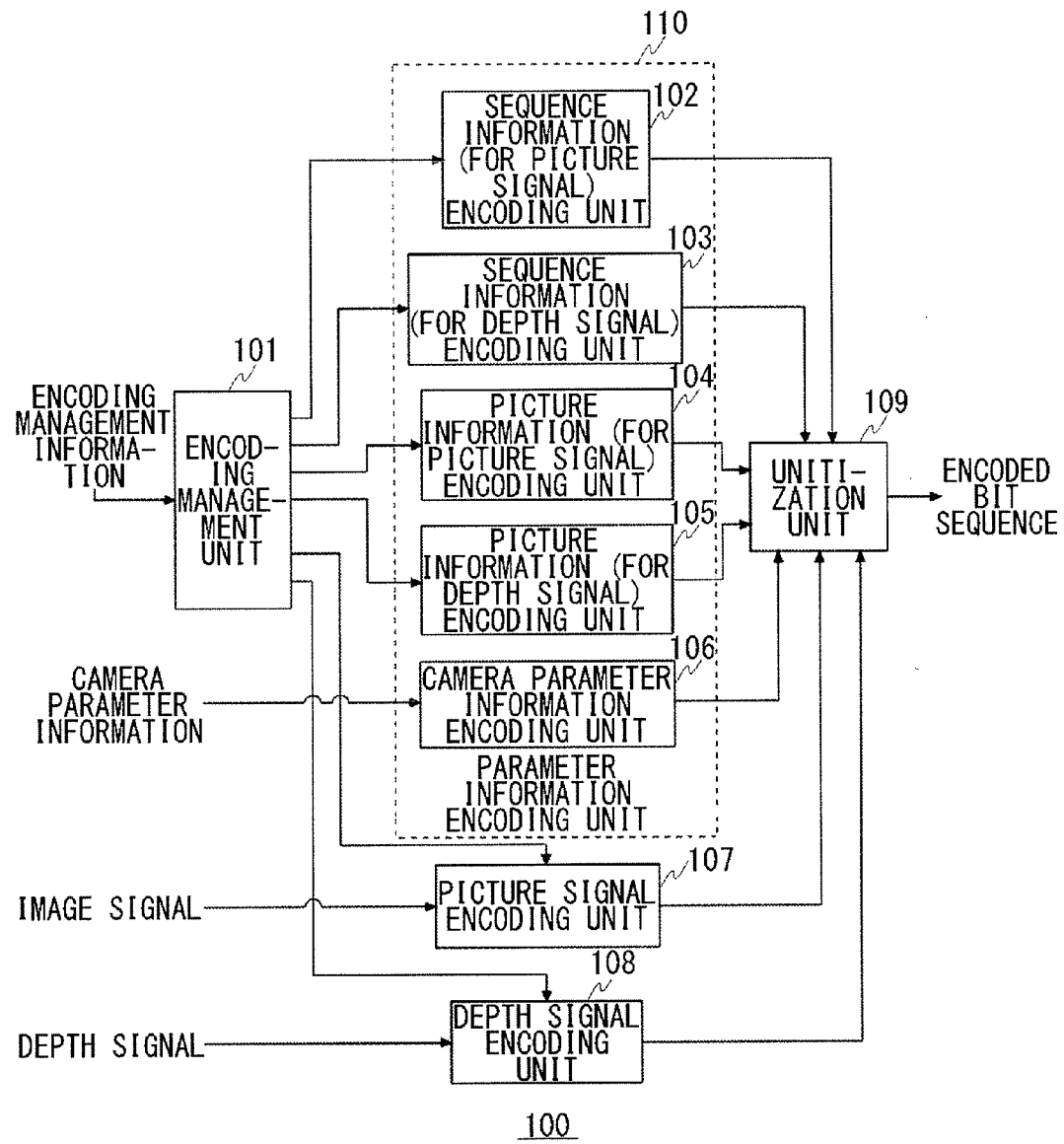
FIG. 1 is a block diagram illustrating the configuration of an image encoding apparatus according to Embodiment 1.

100 IMAGE ENCODING APPARATUS
101 ENCODING MANAGEMENT UNIT
102 SEQUENCE INFORMATION (FOR IMAGE SIGNAL) ENCODING UNIT
103 SEQUENCE INFORMATION (FOR DEPTH SIGNAL) ENCODING UNIT
104 PICTURE INFORMATION (FOR IMAGE SIGNAL) ENCODING UNIT
105 PICTURE INFORMATION (FOR DEPTH SIGNAL) ENCODING UNIT
106 CAMERA PARAMETER INFORMATION ENCODING UNIT
107 IMAGE SIGNAL ENCODING UNIT
108 DEPTH SIGNAL ENCODING UNIT
109 UNITIZATION UNIT
110 PARAMETER INFORMATION ENCODING UNIT
110 DEPTH SIGNAL GENERATION UNIT
120 DETERMINATION UNIT
121, 122 SWITCHING UNIT
300, 301 BREAKDOWN UNIT
302 DECODING MANAGEMENT UNIT
303 SEQUENCE INFORMATION (FOR THE IMAGE SIGNAL AT THE BASE VIEWPOINT) DECODING UNIT
304 SEQUENCE INFORMATION (INCLUDING THE MVC EXTENSION INFORMATION) DECODING UNIT
305 PICTURE INFORMATION DECODING UNIT
306 SUPPLEMENTAL ENHANCEMENT INFORMATION DECODING UNIT
307 IMAGE SIGNAL DECODING UNIT
309 DEPTH SIGNAL DECODING UNIT
310 DECODED IMAGE BUFFER
320 PARAMETER INFORMATION DECODING UNIT
320 VIRTUAL VIEWPOINT IMAGE GENERATION UNIT

BEST MODE FOR CARRYING OUT THE INVENTION

Embodiments of the present invention will now be described with reference to the accompanying drawings. In the following embodiments, an example will be described in which multi-view images are encoded according to a method in which the MVC, in which the AVC/H.264 is expanded to multi-view images, is further expanded.

The AVC/H.264 will be first described briefly. In the AVC/H.264, a higher encoding efficiency is achieved in comparison with the encoding methods, such as the conventional MPEG-2 video (ISO/IEC 13818-2) and MPEG-4 visual (ISO/IEC 14496-2).

In a P-picture (i.e., a forward predictive coded picture) of interest in the encoding methods, such as the MPEG-2 video and MPEG-4 visual, motion-compensated prediction has been performed only from the I-picture or P-picture immediately preceding the P-picture of interest in the picture display order. On the other hand, in the AVC/H.264, a plurality of pictures can be used as reference pictures for the encoding of a P-picture or B-picture of interest, and motion-compensated prediction can be performed by selecting, for every block, an optimal picture therefrom. Further, in addition to the pictures preceding a picture of interest in the picture display order, the already-encoded pictures following the picture of interest in the display order can be used as reference pictures.

In the encoding methods, such as the MPEG-2 video and MPEG-4 visual, the encoding of a B-picture of interest refers to one reference picture preceding the B-picture of interest in the display order, one reference picture following the B-picture of interest, or both the preceding and following reference pictures on a simultaneous basis, and in the latter case, the mean between the preceding and following reference pictures is used as a reference picture for prediction. And then, the difference data between the B-picture of interest and the reference picture has been encoded. On the other hand, in the AVC/H.264, arbitrary pictures can be used as reference pictures for prediction without being limited to one preceding picture and one following picture in the display order and irrespective of preceding and following pictures. Further, a B-picture other than the B-picture of interest can also be used as a reference picture.

In addition, the MPEG-2 video defines a picture as one unit and the MPEG-4 defines a video object plane (VOP) as one unit such that an encoding mode is specified for every picture or VOP; however, the AVC/H.264 defines a slice as the unit for encoding, and it is also possible to include different slices, such as an I-slice, P-slice, and B-slice, in one picture.

Further, the AVC/H.264 defines a VCL (Video Coding Layer) for encoding and decoding video pixel signals (i.e., an encoding mode, motion vectors, DCT coefficients, etc.) and an NAL (Network Abstraction Layer).

An encoded stream encoded according to the AVC/H.264 is composed of NAL units each being one section of the NAL. The NAL units are composed of both VCL NAL units each including data (i.e., an encoding mode, motion vectors, and DCT coefficients, etc.) encoded in the VCL and non-VCL NAL units each excluding data encoded in the VCL. The non-VCL NAL units have an SPS (Sequence Parameter Set) including parameter information associated with the encoding of the whole sequence, a PPS (Picture Parameter Set) including parameter information associated with the encoding of a picture, and an SEI (Supplemental Enhancement Information) not required for the decoding of the data encoded in the VCL, etc.

The basic unit for the encoding according to the AVC/H.264 is a slice into which a picture is divided, and the VCL NAL unit is assigned to a slice. Accordingly, a unit called an access unit composed of some NAL units is defined as including one encoded picture.

Subsequently, the MVC will be described briefly. Herein, the relationship between viewpoints in encoding each image of multi-view images and in decoding an encoded stream, and the reference dependence relationship between the images to be encoded of which the multi-view images are composed, will be described by using an example of five viewpoints.

Figure 2:
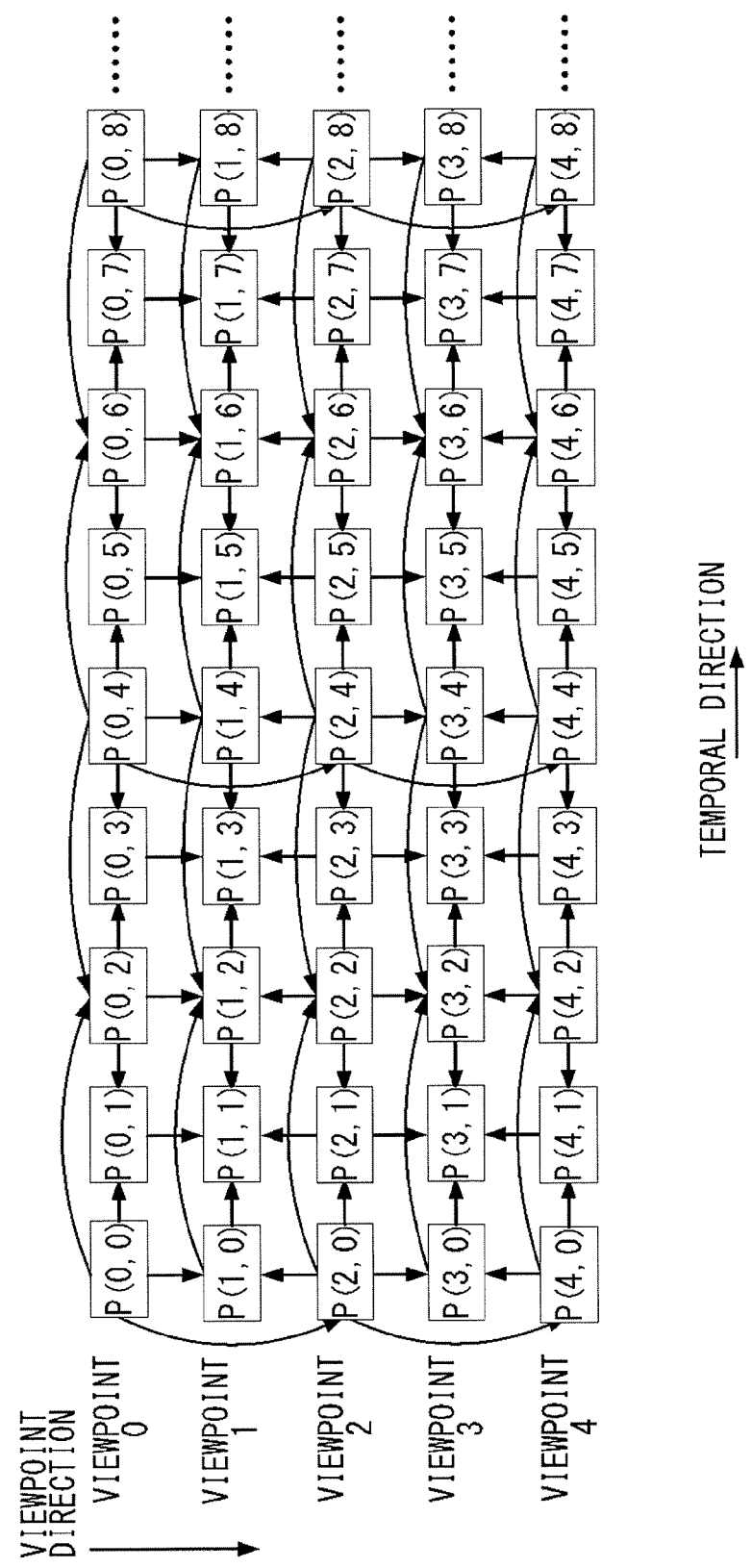
FIG. 2 is a diagram illustrating an example of the reference dependence relationship between images in encoding multi-view images from five viewpoints according to the MVC.

FIG. 2 is a diagram illustrating an example of the reference dependence relationship between images in encoding multi-view images from five viewpoints according to the MVC. The vertical axis represents the spatial direction of multiple viewpoints (in the present specification, the spatial direction of the multiple viewpoints is assumed to be the viewpoint direction), and the horizontal axis represents the temporal direction in the photographing or display order. P (v, t) (viewpoint V=0, 1, 2, . . . ; time t=0, 1, 2, . . . ) is an image at a viewpoint V at the time t.

The image indicated on the side of the end point of an arrow is a target picture to be encoded or decoded. The image indicated on the side of the starting point of an arrow is a reference picture to be referred to when the target picture is encoded or decoded. That is, it is a reference picture to be referred to in inter-prediction in the temporal direction (e.g., motion-compensated prediction) or in inter-view prediction (e.g., disparity-compensated prediction). More specifically, the image indicated on the side of the starting point of a horizontal arrow is a reference picture to be referred to in the inter-prediction in the temporal direction when a target picture is encoded or decoded, and the image indicated on the side of the starting point of a vertical arrow is a reference picture to be referred to in the inter-view prediction.

Herein, the inter prediction in the temporal direction is a prediction method in which an image at another time is referred to, whereas the inter-view prediction is a prediction method in which an image at another viewpoint is referred to. The image used as a reference picture for the inter prediction in the temporal direction is assumed to be only the image preceding in the encoding or decoding order in the temporal direction, whereas the image used as a reference picture for the inter-view prediction is assumed to be only the image preceding in the encoding or decoding order in the viewpoint direction. For example, in the reference dependence relationship illustrated in FIG. 2, it is only needed to define the encoding or decoding order of viewpoints in the viewpoint direction as the order of viewpoint 0, viewpoint 2, viewpoint 1, viewpoint 4, and viewpoint 3. Also, it is only needed to define the encoding or decoding order of viewpoints in the temporal direction as the order of t=0, 4, 2, 1, 3, 8, 6, 5 and 7, . . . . The images from each viewpoint at the same time of t=0 are first encoded or decoded in the order of P(0,0), P(2,0), P(1,0), P(4,0), and P(3,0) in accordance with the aforementioned encoding or decoding order of viewpoints in the viewpoint direction. Then, the images from each viewpoint at the time of t=4 are similarly encoded or decoded in the order of P(0,4), P(2,4), P(1,4), P(4,4), and P(3,4) in accordance with the aforementioned encoding or decoding order of viewpoints in the viewpoint direction. Hereinafter, the images from each viewpoint at the time of t=2 or more will be similarly handled.

The viewpoint 0 is designated as a base viewpoint. The MVC defines the base viewpoint as a viewpoint at which the image can be encoded or decoded without being dependent on other viewpoints. Only one viewpoint is designated as the base viewpoint in the whole sequence of multi-view images. That is, the image at the base viewpoint can be encoded or decoded alone without using images from other viewpoints as reference images for the inter-view prediction. On the other hand, an image at a non-base viewpoint (i.e., a viewpoint other than the base viewpoint) can use images from other viewpoints as reference images for the inter-view prediction.

In the MVC, it is also made that the number of the viewpoints of multi-view images to be encoded, the encoding or decoding order in the viewpoint direction, and the reference dependence relationship between each viewpoint in the inter-view prediction, are encoded as the whole sequence. These are encoded by extending an SPS that is a parameter set of the sequence information.

By encoding, on the encoding side, the aforementioned parameters, i.e., the number of viewpoints and the viewpoint dependence information of each viewpoint as the whole sequence, the reference dependence relationship between each viewpoint can be determined as the whole sequence on the decoding side. The reference dependence relationship information between each viewpoint is used for decoding processing, such as initialization of a reference picture list for the inter-view prediction pictures.

Embodiment 1

FIG. 1 is a block diagram illustrating the configuration of an image encoding apparatus 100 according to Embodiment 1. The image encoding apparatus 100 according to Embodiment 1 comprises an encoding management unit 101, a parameter information encoding unit 110, an image signal encoding unit 107, and a depth information encoding unit (more specifically, a depth signal encoding unit 108). The parameter information encoding unit 110 includes a sequence information (for image signal) encoding unit 102, a sequence information (for depth signal) encoding unit 103, a picture information (for image signal) encoding unit 104, a picture information (for depth signal) encoding unit 105, and a camera parameter information encoding unit 106.

Although these configurations can be achieved by a CPU, memory, and other LSIs of any computer in terms of hardware, whereas achieved by a program loaded on a memory in terms of software, functional blocks achieved by the cooperation of them are illustrated herein. Accordingly, it should be understood by a person skilled in the art that these functional blocks can be achieved in various forms by only hardware or software or by the combination of hardware and software.

The image signal encoding unit 107 generates image encoded data by encoding a plurality of images from multiple viewpoints different from each other. The plurality of images may be images actually taken by a camera or images generated by computer graphics. When one viewpoint to be a basis is set among the multiple viewpoints, the image signal encoding unit 107 can generate first image encoded data by encoding an image from the viewpoint to be a basis and second image encoded data by encoding an image other than the aforementioned image, among the plurality of images.

In this case, the image signal encoding unit 107 may perform "intra prediction coding" on the image from a viewpoint to be a basis, among the plurality of images, and perform "inter-frame prediction coding" between multiple images of the images other than the aforementioned image. In the MVC, the viewpoint to be a basis is the aforementioned base viewpoint. The "inter-frame prediction coding" is the aforementioned inter-view prediction coding.

In addition, when the plurality of images are moving images, the image signal encoding unit 107 can also perform "inter-frame prediction coding" on the moving images from each viewpoint in the temporal direction, respectively. It is needless to say that the "inter-frame prediction coding" in the viewpoint direction and that in the temporal direction can be used in combination.

The depth information encoding unit generates depth information encoded data by encoding depth information indicating the depth of a specific space from at least one viewpoint. The depth information may be expressed by an image in a monochrome format (hereinafter, appropriately referred to as a monochrome image) from a certain viewpoint. In this case, the depth information encoding unit generates the depth information encoded data by encoding the monochrome image.

The depth information encoding unit may perform "intra prediction coding" on the monochrome image from a viewpoint to be a basis, among a plurality of monochrome images from multiple viewpoints different from each other, and perform "inter-frame prediction coding" between multiple monochrome images of the monochrome images other than the aforementioned monochrome image. Herein, the viewpoint to be a basis of the monochrome image may or may not be the same as the viewpoint to be a basis of the image encoded by the image signal encoding unit 107.

In addition, when the plurality of monochrome images are moving images, the depth information encoding unit can also perform "inter-frame prediction coding" on the moving images in monochrome formats from each viewpoint in the temporal direction. It is needless to say that the "inter-frame prediction coding" in the viewpoint direction and that in the temporal direction can be used in combination.

Herein, the number of the viewpoints to be bases of the depth information may be set so as to be less than that of the viewpoints to be bases of the images to be encoded by the first encoding unit, or be set such that both the numbers are equal to each other. The position of each viewpoint to be a basis of the aforementioned depth information may be set so as to be equal to that of any one of the multiple viewpoints to be bases of the plurality of images to be encoded by the image signal encoding unit 107, or be set so as to be equal to none of the positions thereof.

The parameter information encoding unit 110 generates parameter information encoded data by encoding parameter information that includes viewpoint information for specifying the multiple viewpoints to be bases of the aforementioned plurality of images and the aforementioned depth information. When one viewpoint to be a basis is set as stated above, the parameter information encoding unit 110 generates first parameter information encoded data, second parameter information encoded data, and third parameter information encoded data by respectively encoding first parameter information of the image from the viewpoint to be a basis, second parameter information of an image other than the image, among the plurality of images, and third parameter information of the depth information.

Herein, the third parameter information is written in a syntax structure corresponding to that of the second parameter information. For example, the second and third parameter information can be written in accordance with the Multi-view High Profile of the AVC/H.264. In the second and third parameter information, viewpoint-identification information is written. When the position of the viewpoint to be a basis of the image to be encoded by the image signal encoding unit 107 matches the position of the viewpoint to be a basis of the aforementioned depth information, common identification information is provided to these viewpoints. That is, viewpoint-identification information is managed uniformly between the image and the depth information.

A unitization unit 109 generates an encoded stream including the aforementioned image encoded data and depth information encoded data, which are respectively generated by the image signal encoding unit 107 and the depth information encoding unit. The unitization unit 109 can also generate an encoded stream further including the aforementioned parameter information encoded data generated by the parameter information encoding unit 110.

When one viewpoint to be a basis is set among the multiple viewpoints to be bases of the images to be encoded by the image signal encoding unit 107, the unitization unit 109 generates an encoded stream including the aforementioned first image encoded data, the second image encoded data, the depth information encoded data, the first parameter information encoded data, the second parameter information encoded data, and the third parameter information encoded data, which are respectively generated by the image signal encoding unit 107, the depth information encoding unit and the parameter information encoding unit 110.

Figure 3:
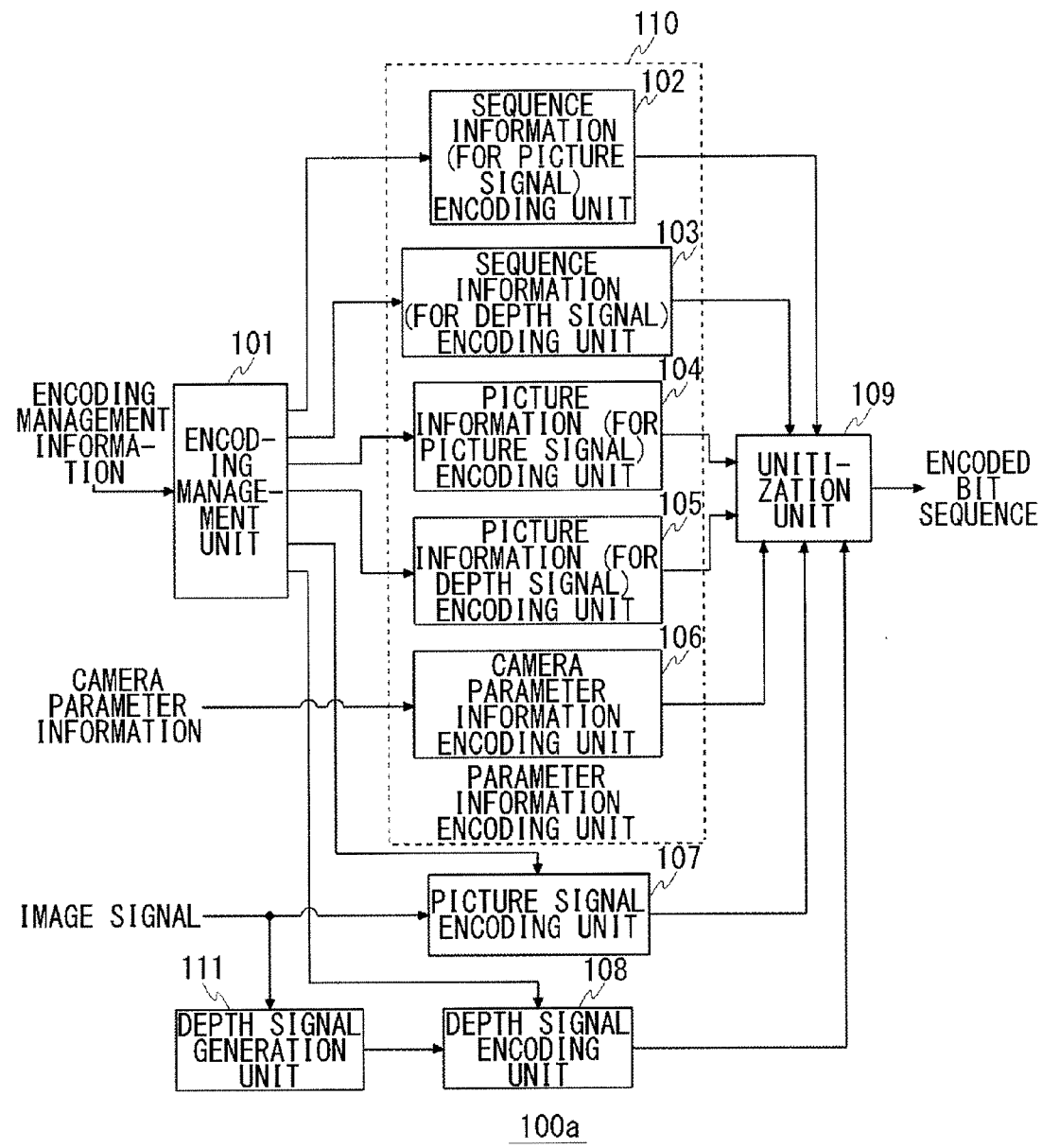
FIG. 3 is a block diagram illustrating the configuration of an image encoding apparatus according to a variation of Embodiment 1.

FIG. 3 is a block diagram illustrating the configuration of an image encoding apparatus 100a according to a variation of Embodiment 1. The image encoding apparatus 100a according thereto has the configuration in which a depth information generation unit (more specifically, a depth signal generation unit 111) is added to the image encoding apparatus 100 illustrated in FIG. 1.

In the variation, the aforementioned depth information generation unit generates, from a plurality of images to be encoded by the image signal encoding unit 107, depth information indicating the depth of a specific space from at least one viewpoint. The depth information generation unit can achieve the generation of the depth information by using an existing algorithm. The depth information encoding unit generates depth information encoded data by encoding the depth information generated by the depth information generation unit. Because other processing are the same as those of the image encoding apparatus 100 according to the basic example of Embodiment 1 illustrated in FIG. 1, descriptions thereof will be omitted.

Herein, an image and depth information to be encoded by the image encoding apparatus 100 according to Embodiment 1 will be described. The image is generated with a subject being projected on a two-dimensional plane corresponding to each viewpoint by an image pickup apparatus, such as a camera. In addition, an image signal is generated by converting an image that indicates two-dimensional information into a one-dimensional flow of signals. The minimum unit of an image and an image signal digitally expressed is a pixel. Multi-view images signals inputted into the image encoding apparatus 100 is ones including image signals respectively obtained at the preset two or more multiple viewpoints. An image signal at a certain viewpoint may be one obtained by being actually taken from the viewpoint or one generated by computer graphics, etc., as being virtually taken from the viewpoint. With respect to an image signal obtained by being actually taken, there are sometimes the cases where position compensation or luminance/color level correction is performed in order to correct an error in each camera used in taking the image.

The aforementioned depth signal may be multi-view depth signals including depth signals respectively obtained from the preset two or more multiple viewpoints. A depth signal at a certain viewpoint may be one obtained by being actually taken from the viewpoint with an infrared camera, etc., or one generated by an operation based on the aforementioned multi-view image signals as being virtually taken from the viewpoint.

The depth information indicates the depth of a specific space. For example, the depth information is expressed as the depth information of a subject (i.e., an object) in an image with respect to the image plane. More specifically, the depth information indicates the depth of the image projected on a two-dimensional plane. An image in which the depth information corresponding to each pixel of an image projected on a two-dimensional plane is mapped in pixel units or in multiple pixel units is called a depth map. A depth signal is generated by converting a depth map that indicates two-dimensional information into a one-dimensional flow of signals. Similarly to an image and an image signal, the minimum unit of a depth map and a depth signal digitally expressed is also a pixel. The aforementioned depth signal may be multi-view depth signals including depth signals respectively obtained at the preset two or more viewpoints. A depth signal at a certain viewpoint may be one obtained by being actually taken from the viewpoint with an infrared camera, etc., or one generated by an operation based on the aforementioned multi-view image signals, as being virtually taken from the viewpoint.

Although a pixel value of a depth signal is mostly expressed in an 8-bit format in the same way as an image signal, it may be expressed in an approximately 9 to 14-bit format in order to enhance the reproducibility in the depth direction. A depth map is expressed as an image in a monochrome format. The resolution of the depth map may be lower than that of the aforementioned image as far as the correspondence with each pixel of the image can be established.

The depth signal is mainly used in generating an image signal at a desired virtual viewpoint, which does not exist, from an image signal at an actually existing viewpoint. When a free-viewpoint image, in which the viewpoint of an image to be displayed in accordance with a user's direction cannot be specified beforehand, is displayed on the decoding side or when, because the number of viewpoints is large, it is difficult to photograph, transmit, or store all images from these viewpoints, it is effective to generate an image signal at a virtual viewpoint.

Japanese Patent Application Publication No. H9-81746 discloses one of the techniques for generating an image at a non-existing virtual viewpoint, from an image signal at an existing viewpoint. In the technique, when an image at a non-existing virtual viewpoint is generated, the depth information is calculated from an image signal at an existing viewpoint such that an image at a desired virtual viewpoint is generated in accordance with the depth information.

In the technique for transmitting or storing an encoded stream obtained by encoding multi-view image signals and for generating an image signal at a desired virtual viewpoint by determining a depth signal from the image signal obtained by decoding the encoded stream, a load on the processing of calculating a depth signal is large on the decoding side. Further, the quality of a depth signal generated on the decoding side is generally inferior to that of a depth signal generated on the encoding side. It is because, in the general encoding method, the high frequency component of the original image signal is omitted when the image is encoded.

Accordingly, in the present embodiment, depth signals are generated from multi-view image signals on the encoding side such that image signals at multiple viewpoints and depth signals at multiple viewpoints are to be encoded. On the decoding side, a depth signal can be obtained in addition to an image signal by decoding an encoded stream. Thereby, it is not required on the decoding side to generate a depth signal after the decoding and an image signal at a desired virtual viewpoint can be generated from an image signal and a depth signal that can be obtained by decoding the encoded stream.

When an image signal at a virtual viewpoint is generated, a better image at the virtual viewpoint can be obtained by generating the image from image signals and depth signals at multiple viewpoints than by generating the image from an image signal and a depth signal at one viewpoint. Hereinafter, this knowledge will be described in detail with reference to FIGS. 4 and 5.

Figure 4:
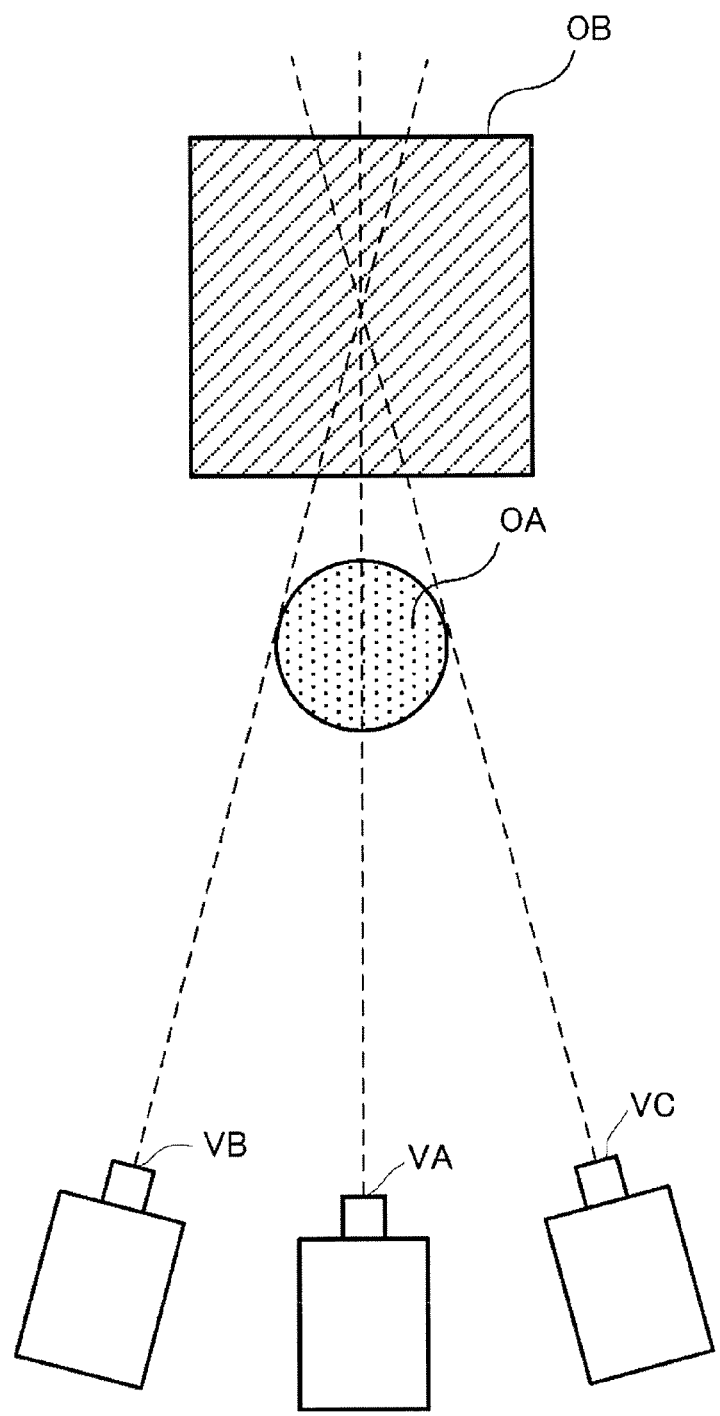
FIG. 4 is a diagram illustrating an example of generating an image at a first viewpoint, which is a virtual viewpoint, by photographing a scene where a first object and a second object are present from second and third viewpoints.
Figure 5:
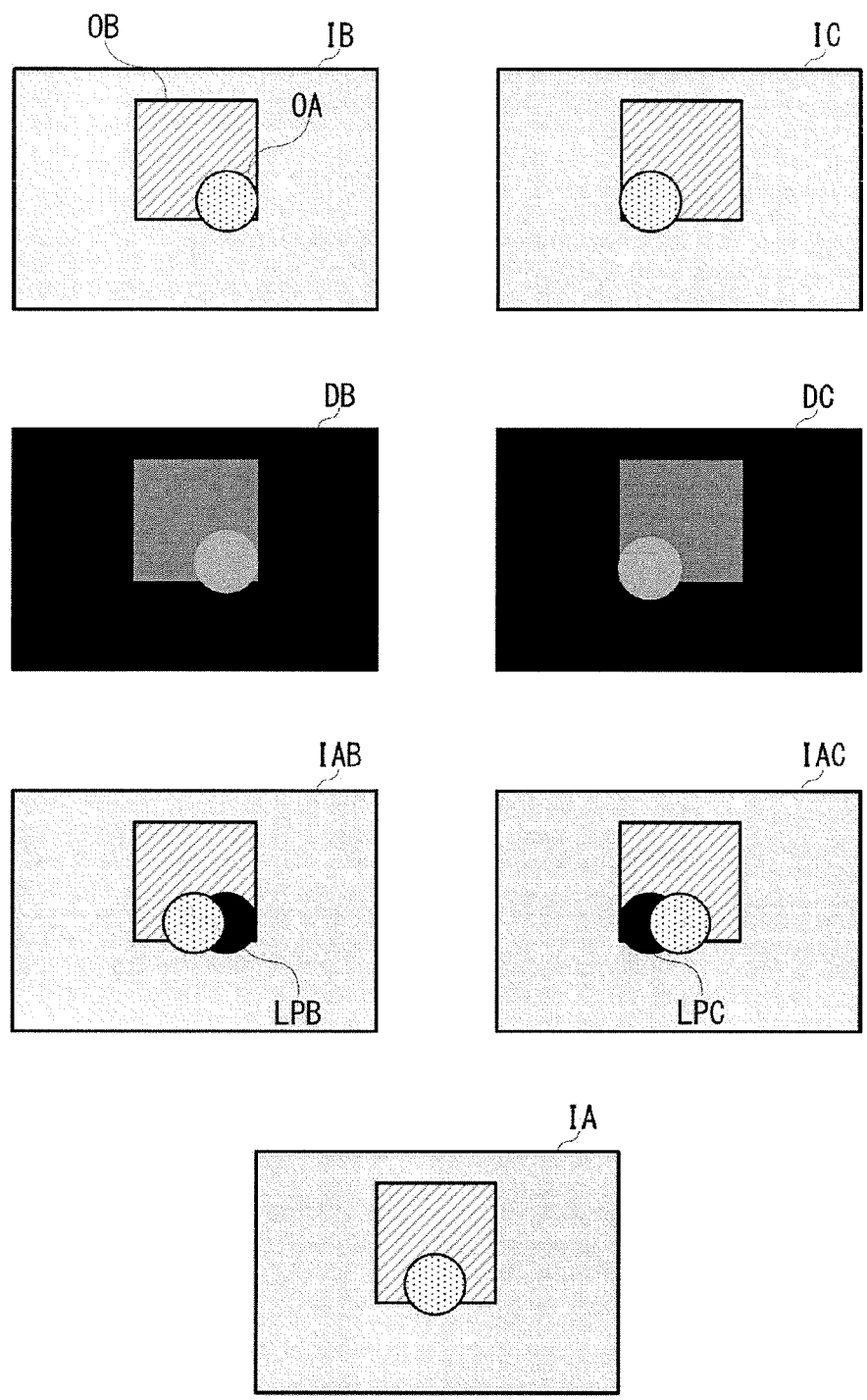
FIG. 5 is a diagram illustrating the taken images, depth maps corresponding to the images, and a generated image, in the example of FIG. 4.

FIG. 4 is a diagram illustrating an example of generating an image at a first viewpoint VA that is a virtual viewpoint (hereinafter, referred to as a first virtual viewpoint VA) by photographing, from a second viewpoint VB and a third viewpoint VC, a scene where a first object OA and a second object OB are present. FIG. 5 is a diagram illustrating the taken images, depth maps corresponding to the images, and a generated image, in the example of FIG. 4. In FIG. 5, a second image IB illustrates the image taken from the second viewpoint VB in FIG. 4, and a third image IC illustrates the image taken from the third viewpoint VC in FIG. 4. A second depth map DB illustrates a depth map corresponding to the second image IB and a third depth map DC illustrates a depth map corresponding to the third image IC.

In the following description, it is assumed that a pixel value of a depth signal corresponding to the most backward object, i.e., the object most away from a camera, is made to be a minimum value of 0 and that of a depth signal is made to be larger as an object moves forward, i.e., an object is closer to the camera. In addition, the first image IA illustrates an image obtained when it is supposed to be taken from the first virtual viewpoint VA (hereinafter, referred to as a predicted image), which is an image not actually taken, but to be generated.

A first-second image IAB is a predicted image at the first virtual viewpoint VA generated from the second image IB taken from the second viewpoint VB and the second depth map DB corresponding thereto. When a predicted image at the first virtual viewpoint VA is generated from the second image IB taken from the second viewpoint VB and the second depth map DB corresponding thereto, a portion hidden by the forward first object OA is unclear when photographed from the second viewpoint VB, resulting in a missing portion. The black portion in the first-second image IAB is a second missing portion LPB generated in the predicted image at the first virtual viewpoint VA.

A first-third image IAC is a predicted image at the first virtual viewpoint VA generated from the third image IC taken from the third viewpoint VC and the third depth map DC corresponding thereto. A missing portion is also generated in the first-third image IAC. The black portion in the first-third image IAC is a third missing portion LPC generated in the predicted image at the first virtual viewpoint VA. The third missing portion LPC in the first-third image IAC is generated at a position different from that where the second missing portion LPB is generated in the first-second image IAB.

Accordingly, by compensating for the second missing portion LPB in the first-second image IAB with an image signal of the first-third image IAC, the first image IA at the first virtual viewpoint VA, in which a missing portion is small, can be generated. An object actually has a three-dimensional effect and the shade, and accordingly differences in brightness and color are generated between images obtained by photographing due to the relative relationship between the position and direction of a viewpoint where the image is taken, and a light source; however, FIGS. 4 and 5 are depicted, not taking into consideration the point.

In order to take into consideration a difference in luminance occurring at each viewpoint and to reduce a noise, there is a method in which, for the pixel present in both the first-second image IAB and the first-third image IAC, a mean value of the two images is used, and only for the pixel forming a missing portion in either image, the pixel present in the other image is only used. A better image having less missing portions can be obtained from an image generated from image signals and depth signals at two viewpoints than an image at a virtual viewpoint generated from an image signal and a depth signal at a single viewpoint (the first-second image IAB or first-third image IAC in FIG. 5), as stated above.

Further, a better image having a less missing portion can be obtained by using image signals and depth signals at three or more viewpoints than by generating an image signal at a virtual viewpoint from image signals at two viewpoints and depth signals at two viewpoints. As stated above, when an image at a virtual viewpoint is generated, a better image at the virtual viewpoint can be obtained by generating the image from image signals and depth signals at multiple viewpoints than by generating the image from an image signal and a depth signal at one viewpoint.

When an image at a virtual viewpoint is generated from image signals and depth signals at two viewpoints, a better image signal at a virtual viewpoint can be obtained by being generated from image signals and depth signals at two viewpoints the distance between which is small than by being generated from those at two viewpoints the distance between which is large. Hereinafter, this knowledge will be described in detail with reference to FIGS. 6 and 7.

Figure 6:
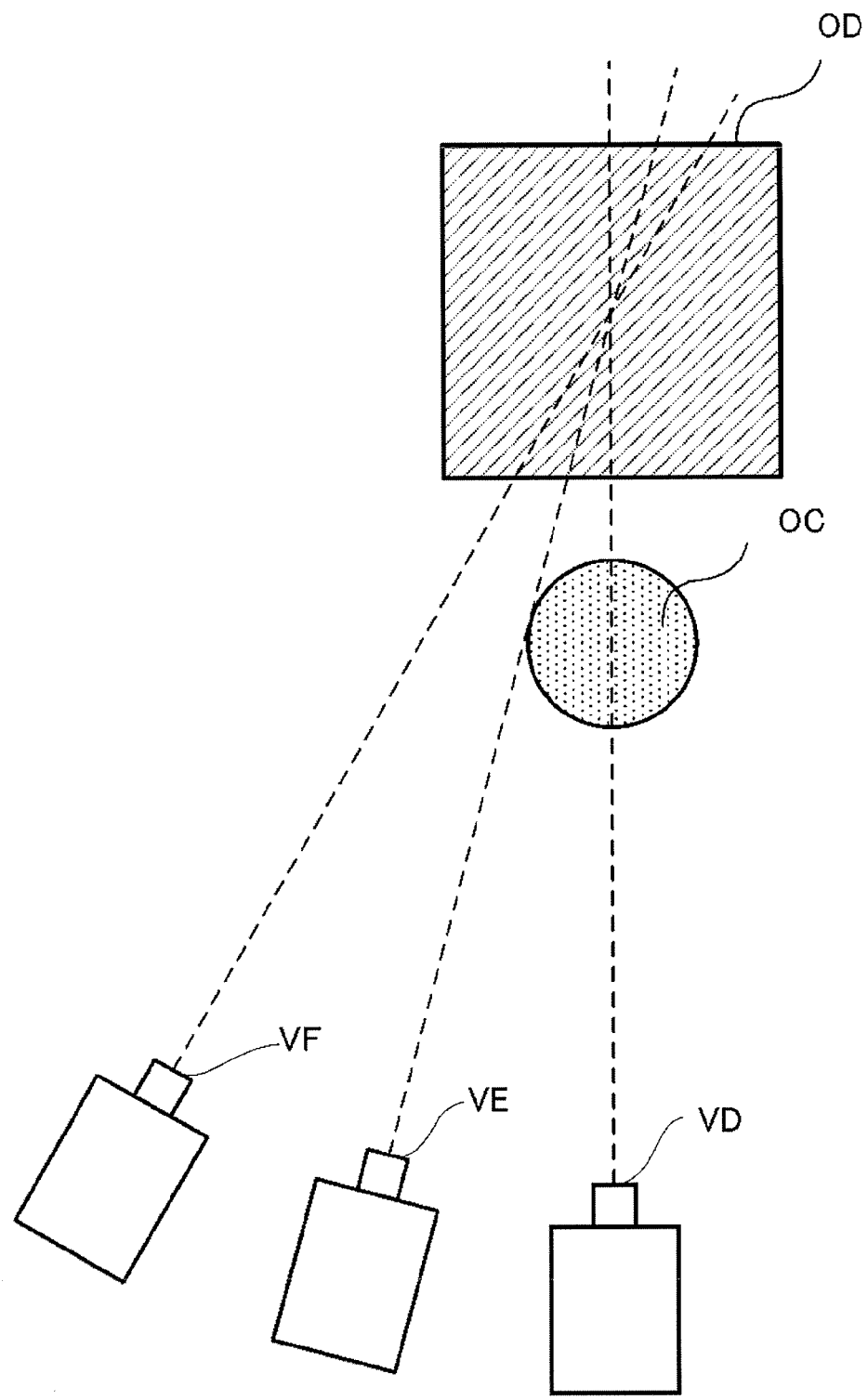
FIG. 6 is a diagram illustrating an example of generating an image at a fourth viewpoint, which is a virtual viewpoint, by photographing a scene where a third object and a fourth object are present from fifth and sixth viewpoints.
Figure 7:
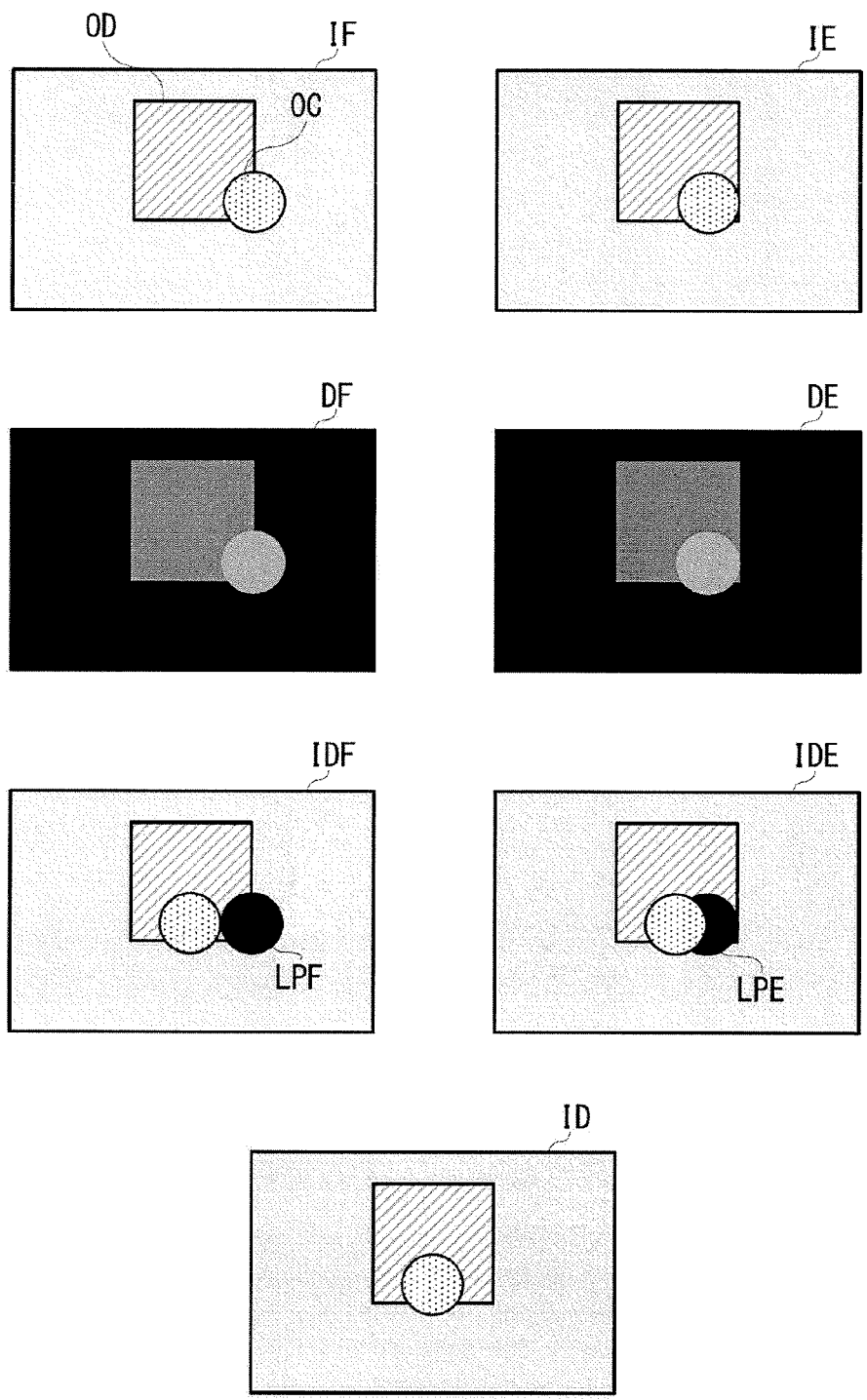
FIG. 7 is a diagram illustrating the taken images, depth maps corresponding to the images, and a generated image, in the example of FIG. 6.

FIG. 6 is a diagram illustrating an example of generating an image at a fourth viewpoint VD that is a virtual viewpoint (hereinafter, referred to as a fourth virtual viewpoint VD) by photographing a scene where a third object OC and a fourth object OD are present from a fifth viewpoint VE and a sixth viewpoint VF. FIG. 7 is a diagram illustrating the taken images, depth maps corresponding to the images, and a generated image, in the example of FIG. 6. In FIG. 7, a fifth image IE illustrates the image taken from the fifth viewpoint VE in FIG. 6, and a sixth image IF illustrates the image taken from the sixth viewpoint VF in FIG. 6. A fifth depth map DE illustrates a depth map corresponding to the fifth image IE and a sixth depth map DF illustrates a depth map corresponding to the third image IC. In addition, the fourth image ID illustrates a predicted image obtained when it is supposed to be taken from the fourth virtual viewpoint VD, which is an image not actually taken, but to be generated.

A fourth-fifth image IDE is a predicted image at the fourth virtual viewpoint VD generated from the fifth image IE taken from the fifth viewpoint VE and the fifth depth map DE corresponding thereto. When a predicted image at the fourth virtual viewpoint VD is generated from the fifth image IE taken from the fifth viewpoint VE and the fifth depth map DE corresponding thereto, a portion hidden by the forward third object OC is unclear when photographed from the fifth virtual viewpoint VE, resulting in a missing portion. The black portion in the fourth-fifth image IDE is a fifth missing portion LPE generated in the predicted image at the fourth virtual viewpoint VD.

A fourth-sixth image IDF is a predicted image at the fourth virtual viewpoint VD generated from the sixth image IF taken from the sixth viewpoint VF and the sixth depth map DF corresponding thereto. A missing portion is also generated in the fourth-sixth image IDF. The black portion in the fourth-sixth image IDF is a sixth missing portion LPF generated in the predicted image at the fourth virtual viewpoint VD.

When the fifth viewpoint VE is compared with the sixth viewpoint VF, the sixth viewpoint VF is more away from the fourth virtual viewpoint, and hence a shift amount from the fourth image ID becomes larger in the sixth image IF, and the area of the sixth missing portion LPF in the fourth-sixth image IDF becomes larger than that of the fifth missing portion LPE in the fourth-fifth image IDE. As stated above, as the distance between the viewpoints of the subjects taken in an image is smaller, a shift amount, a deformation, and differences in brightness and color between the viewpoints become smaller, thereby allowing a better image to be obtained. Accordingly, when an image signal at a virtual viewpoint is generated, a better image at the virtual viewpoint can be obtained by being generated from image signals and depth signals at multiple viewpoints the distance among which is small than by being generated from those at multiple viewpoints the distance among which is large.

Further, a state of the depth of a content also changes how easy it is to generate an image signal at a virtual viewpoint. As a difference in the depth between subjects overlapping each other is smaller, a better image signal at a virtual viewpoint can be obtained. Hereinafter, this knowledge will be described in detail with reference to FIGS. 8 and 9.

Figure 8:
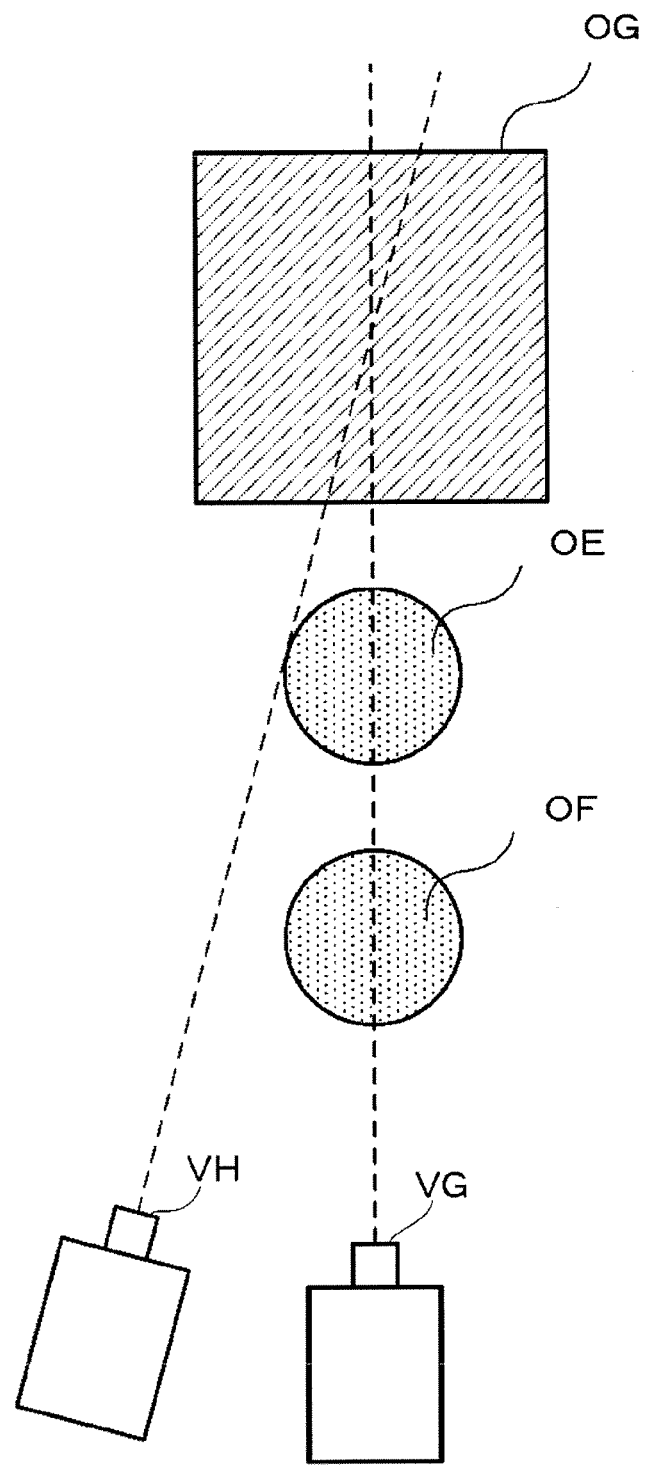
FIG. 8 is a diagram illustrating an example of generating an image at a seventh viewpoint, which is a virtual viewpoint, by photographing two scenes in each of which one of a fifth object and a sixth object, and a seventh object are present from an eighth viewpoint.

FIG. 8 is a diagram illustrating an example of generating an image at a seventh viewpoint VG that is a virtual viewpoint (hereinafter, referred to as a seventh virtual viewpoint VG) by photographing two scenes in each of which one of a fifth object OE and a sixth object OF, and a seventh object OG are present from an eighth viewpoint VH. When each scene is photographed, the fifth object OE and the sixth object OF are not present at a time. Herein, it is assumed that a scene where the fifth object OE and the seventh object OG are present is a first scene H1 and the scene where the sixth object OF and the seventh object OG are present is a second scene H2.

FIG. 9 is a diagram illustrating the taken images, depth maps corresponding to the images, and generated images, in the example of FIG. 8. In FIG. 9, an eighth-first image IH1 illustrates an image of the first scene H1 photographed from the eighth viewpoint VH in FIG. 8, and an eighth-second image IH2 similarly illustrates an image of the second scene H2 photographed from the eighth viewpoint VH in FIG. 8. An eighth-first depth map DH1 illustrates a depth map corresponding to the eighth-first image IH1, and an eighth-second depth map DH2 illustrates a depth map corresponding to the eighth-second image IH2.

A seventh-first image IG1 illustrates a predicted image obtained when it is supposed that the first scene H1 is photographed from the seventh virtual viewpoint VG, which is an image not actually taken, but to be generated. A seventh-second image IG2 illustrates a predicted image obtained when it is supposed that the second scene H2 is photographed from the seventh virtual viewpoint VG, which is an image not actually taken, but to be generated.

A seventh-eighth-first image IGH1 is a predicted image of the first scene H1 at the seventh virtual viewpoint VG, the image IGH1 being generated from the eighth-first image IH1 of the first scene H1 photographed from the eighth viewpoint VH and the eighth-first depth map DH1 corresponding thereto. When a predicted image of the first scene H1 at the seventh virtual viewpoint VG is generated from the eighth-first image IH1 of the first scene H1 photographed from the eighth viewpoint VH and the eighth-first depth map DH1 corresponding thereto, a portion hidden by the forward fifth object OE is unclear when photographed from the eighth viewpoint VH, resulting in a missing portion. The black portion in the seventh-eighth-first image IGH1 is an eighth-first missing portion LPH1 generated in the predicted image of the first scene H1 at the seventh virtual viewpoint VG.

A seventh-eighth-second image IGH2 is a predicted image of the second scene H2 from at seventh virtual viewpoint VG, the image IGH2 being generated from the eighth-second image IH2 of the second scene H2 photographed from the eighth viewpoint VH and the eighth-second depth map DH2 corresponding thereto. A missing portion is also generated in the seventh-eighth-second image IGH2. The black portion in the seventh-eighth-second image IGH2 is an eighth-second missing portion LPH2 generated in the predicted image of the second scene H2 at the seventh virtual viewpoint VD.

When the shift amount between the eighth-first image IH1 and the seventh-first image IG1 is compared with that between the eighth-second image IH2 and the seventh-second image IG2, the latter becomes larger. Accordingly, the area of the eighth-second missing portion LPH2 in the seventh-eighth-second image IGH2 becomes larger than that of the eighth-first missing portion LPH1 in the seventh-eighth-first image IGH1. Thus, a state of the depth of a content also changes how easy it is to generate an image signal at a virtual viewpoint. That is, as a difference in the depth between subjects overlapping each other is smaller, a relative shift amount between the subjects overlapping each other in an image becomes smaller, and a missing portion in a generated image becomes smaller, thereby allowing a better image to be obtained.

The difference in the depth of the subjects overlapping each other can be calculated from a depth signal. The edge (i.e., a position where the density is steeply changed) of a depth signal (in FIG. 9, the eighth-first depth map DH1 and the eighth-second depth map DH2) is extracted to calculate a difference between the values of pixels by which the boundary of the edge portion is sandwiched. It is determined that, as the difference is smaller, the difference in the depth between the subjects overlapping each other is smaller.

As stated above, by adopting multi-view depth signals including depth signals at multiple viewpoints in addition to multi-view image signals including image signals at multiple viewpoints, an accurate image signal at a virtual viewpoint can be generated on the decoding side. Further, by adopting multi-view image signals at multiple viewpoints the interval between which is small and multi-view depth signals corresponding to each of the image signals at each viewpoint, a further accurate image signal at a virtual viewpoint can be generated on the decoding side.

However, if the number of viewpoints is set to be too large, a bit rate becomes high, causing a transmission efficiency or storing efficiency to be decreased. Accordingly, it is required that, taking into consideration the transmission rate of a target application or the capacity of a storing medium, the viewpoints to be encoded in each of multi-view image signals and multi-view depth signals are appropriately determined.

In this case, it is not necessarily required that the viewpoints of the multi-view image signals to be encoded corresponds one-to-one to those of the multi-view depth signals to be encoded, and accordingly the multi-view image signals and the multi-view depth signals, which are different from each other in the number of viewpoints, may be encoded. In this case, encoding can be performed more flexibly. For example, even when it is required that all of the image signals obtained by actually being photographed are encoded to be transmitted or stored, the number of the viewpoints for the depth signals to be encoded is set to be small when an image signal at a virtual viewpoint is easily generated. In this case, a more efficient encoded stream can be generated. Herein, the expression of "when an image signal at a virtual viewpoint can be easily generated" means the case where the interval between the viewpoints for multi-view image signals to be encoded is sufficiently small or the case where a difference in the depth between the subjects included in a content is not large, etc.

Figure 10:
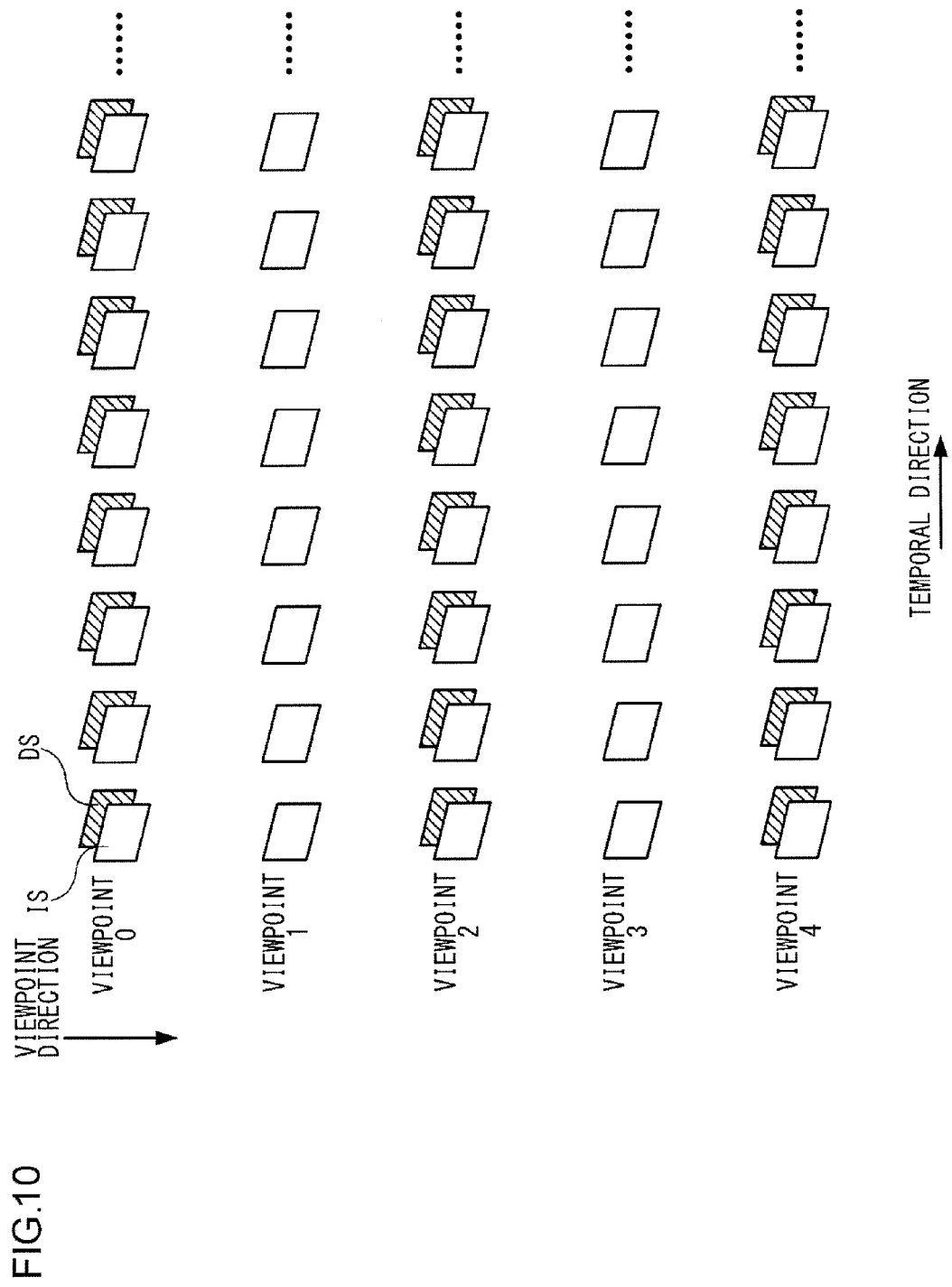
FIG. 10 is a diagram illustrating multi-view images to be encoded including images from five viewpoints (viewpoint 0, viewpoint 1, viewpoint 2, viewpoint 3, and viewpoint 4), and multi-view depth maps to be encoded including depth DSs from three viewpoints (viewpoint 0, viewpoint 2, and viewpoint 4)

Subsequently, an encoded stream generated by being encoded by the image encoding apparatus 100 according to Embodiment 1 will be described. FIG. 10 is a diagram illustrating multi-view images to be encoded including images IS from five viewpoints (viewpoint 0, viewpoint 1, viewpoint 2, viewpoint 3, and viewpoint 4), and multi-view depth maps to be encoded including depth DSs from three viewpoints (viewpoint 0, viewpoint 2, and viewpoint 4). The vertical axis represents the viewpoint direction and the horizontal axis represents the temporal direction. The viewpoint 0 is designated as the aforementioned base viewpoint. The MVC defines the base viewpoint as a viewpoint the image at which can be encoded or decoded without being dependent on other viewpoints. Only one viewpoint is designated as the base viewpoint in the whole sequence including multi-view images. That is, the image at the base viewpoint can be encoded or decoded alone without using an image at another viewpoint as a reference image for the inter-view prediction. In addition, an image at a non-base viewpoint (i.e., a viewpoint other than the base viewpoint) can be encoded or decoded by using an image at another viewpoint as a reference image for the inter-view prediction. The case where the multi-view images and multi-view depth maps illustrated in FIG. 10 are encoded will be described below.

Figure 11:
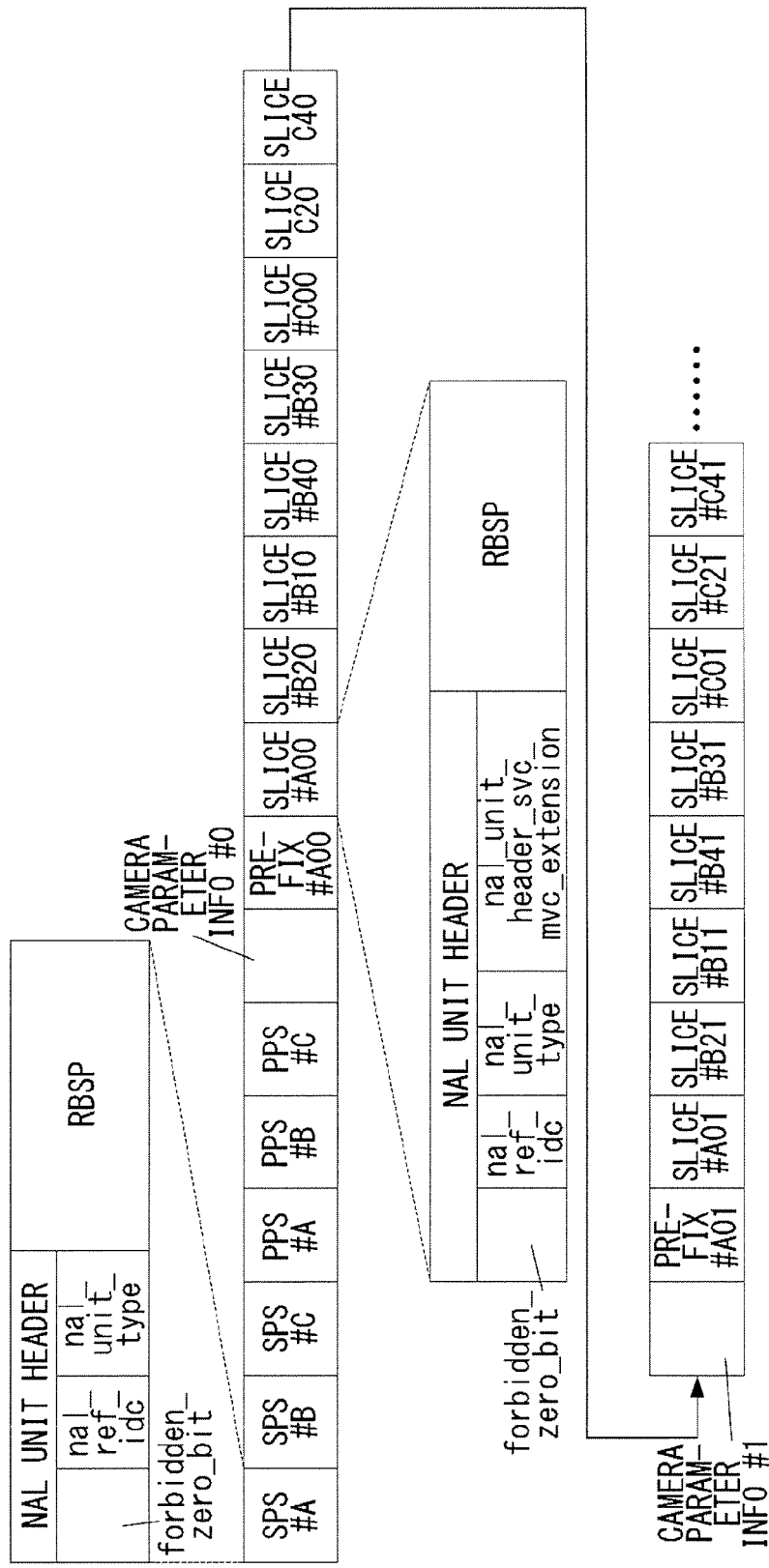
FIG. 11 is a diagram illustrating an example in which an encoded stream generated by the image encoding apparatus according to Embodiment 1 is expressed in units of NAL unit.

FIG. 11 is a diagram illustrating an example in which an encoded stream generated by the image encoding apparatus 100 according to Embodiment 1 is expressed in units of NAL unit. One rectangular block corresponds to one NAL unit. The NAL unit includes an NAL unit header, which is a header (i.e., a leading portion), and an RBSP (Raw Byte Sequence Payload) indicating raw data excluding the NAL unit header. The header of every NAL unit includes a flag always having a value of "0" (i.e., "forbidden_zero_bit"), an identifier by which it is identified whether a slice that is to be an SPS, PPS, or a reference picture is included (i.e., "nal_ref_idc"), and an identifier by which the type of the NAL unit is identified (i.e., "nal_unit_type").

FIG. 12 is a diagram illustrating the types of NAL units stipulated in the AVC/H.264. The decoding side can identify the type of an NAL unit by referring to the "nal_unit_type" that is an identifier for identifying the type of the NAL unit, which is included in the header of the NAL unit.

(SPS#A)

In the encoded stream illustrated in FIG. 11, an SPS#A NAL unit is first generated. The information associated with the encoding of the whole sequence of an image signal at the base viewpoint (in FIG. 10, a signal of the image at the viewpoint 0) is set in the SPS#A. The value of the "nal_unit_type" indicating the type of an NAL unit, which is included in the NAL unit header of the SPS#A, is set to be "7", which indicates that the NPL unit is an SPS (see FIG. 12).

Figure 13:
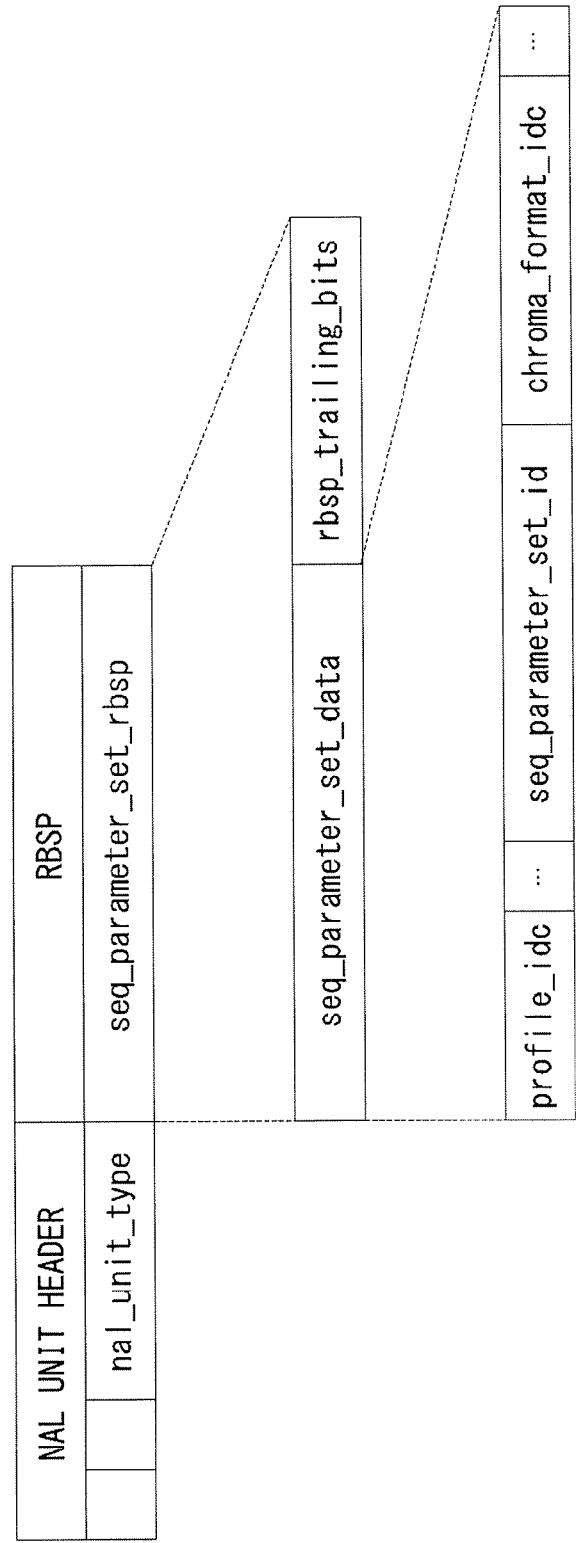
FIG. 13 is a diagram illustrating the configuration of an SPS NAL unit.

FIG. 13 is a diagram illustrating the configuration of an SPS NAL unit. The "seq_parameter_set_rbsp" that is the RBSP of an SPS includes "seq_parameter_set_data" including the information associated with the encoding of the whole sequence and "rbsp_trailing_bits" that is a bit for adjustment added to the end of the RBSP. The "profile_idc" for identifying a profile is included in the "seq_parameter_set_data". The profile herein means a subset of the syntax according to the AVC/H.264.

For example, by setting the value of the "profile_idc" of the SPS#A to be "100", it can be indicated that the encoded stream is in accordance with the High Profile of the AVC/H.264. In the case, the later-described NAL unit that should refer to the SPS#A is generated based on the restrictions in accordance with the High Profile. Further, the "seq_parameter_set_id", which is the SPS-specifying unique number for identifying an SPS, is included in the "seq_parameter_set_data", and an arbitrary value different from the "seq_parameter_set_id" of each of the later-described SPS#B and SPS#C is set in the "seq_parameter_set_id" of the SPS#A. The "seq_parameter_set_mvc_extension" including the later-described MVC extension information associated with the encoding of the whole sequence is not included in the SPS of the image signal at the base viewpoint.

(SPS#B)

Subsequently, an Sps#B NAL Unit is generated. The information associated with the encoding of the whole sequence of image signals at other viewpoints excluding the base viewpoint (in FIG. 10, signals of the images at the viewpoint1, viewpoint2, viewpoint 3, and viewpoint 4) are set in the SPS#B. The value of the "nal_unit_type" indicating the type of an NAL unit, which is included in the NAL unit header of the SPS#B, is set to be "15", which indicates that the NPL unit is a subset SPS that is an MVC extension SPS.

Figure 14:
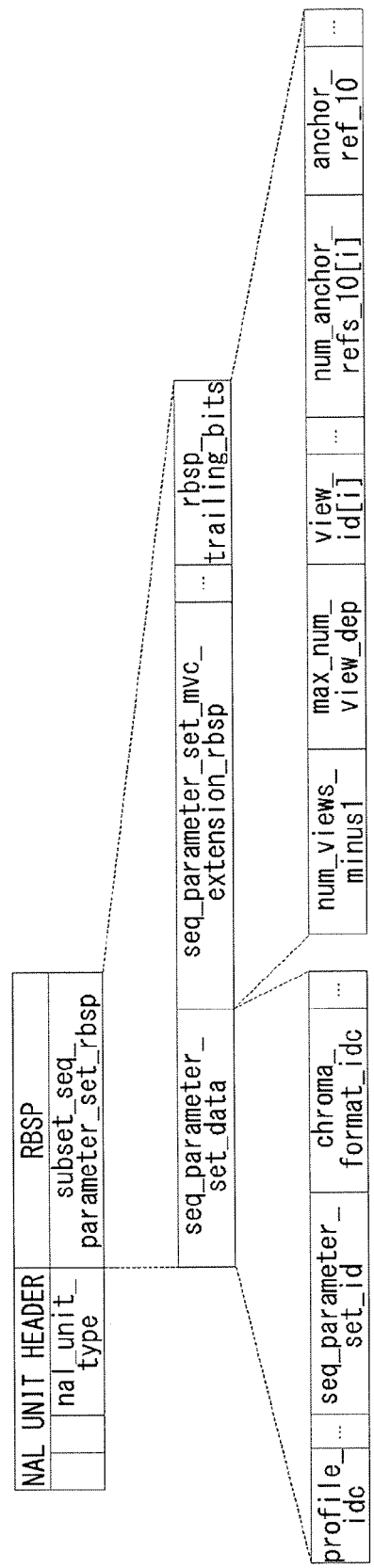
FIG. 14 is a diagram illustrating the configuration of a subset SPS NAL unit.

FIG. 14 is a diagram illustrating the configuration of a subset SPS NAL unit. The "seq_parameter_set_mvc_extension_rbsp" including the MVX extension information associated with the encoding of the whole sequence is included in the "subset_seq_parameter_set_rbsp", which is the RBSP of the subset SPS, in addition to the "seq_parameter_set_data" including the information associated with the encoding of the whole sequence. The value of the "profile_idc" of the SPS#B is set to be 118", which indicates the Multiview High Profile of the AVC/H.264. In the present specification, an encoding method according to the Multiview High Profile of the AVC/H.264 is called an MVC encoding method.

The later-described NAL unit that should refer to the SPS#B is generated based on the restrictions in accordance with the Multiview High Profile. In addition, an arbitrary value different from the "seq_parameter_set_id" of each of the aforementioned SPS#A and later-described SPS#C is set in the "seq_parameter_set_id" of the SPS#B. The "seq_parameter_set_mvc_extension_rbsp" includes the information indicating: the number of viewpoints for the image signals to be encoded; the encoding or decoding order in the viewpoint direction; and the dependence relationship between viewpoints for specifying viewpoints, which is to be referred to in the inter-view prediction when an image signal is encoded or decoded.

In FIG. 14, the "num_views_minus1" is a parameter for setting the aforementioned number of viewpoints in the aforementioned encoded bit sequence, the value of which is obtained by subtracting "1" from the number of viewpoints. In the example of FIG. 10, because multi-view image signals including the image signals at five viewpoints of viewpoint 0, viewpoint 1, viewpoint 2, viewpoint 3, and viewpoint 4, are encoded, the value of the "num_views_minus1" is set to be "4".

Subsequently, it is made that the "view_id[i]" is, for each viewpoint, set continuously and repeatedly in the encoding or decoding order in the viewpoint direction. The "view_id[i]" indicates viewpoint-identification information (hereinafter, referred to as a viewpoint ID) when the encoding or decoding order in the viewpoint direction is represented by i. That is, the "view_id[i]" indicates an i-th viewpoint ID in the encoding or decoding order in the viewpoint direction. Herein, it is assumed that an index (i.e., a suffix) of a sequence begins from 0. For example, the head of the sequence "view_id[i]" is represented by "view_id [0]" and the next one is represented by "view_id [1]". Also, in indicating the order, it is assumed that the first one is zeroth and the next one is the first. That is, it is assumed that the viewpoint first encoded or decoded in the viewpoint direction is zeroth and the viewpoint subsequently encoded or decoded is the first. For example, when encoding is performed in the order of the viewpoint 0, viewpoint 2, viewpoint 1, viewpoint 4, and viewpoint 3, the viewpoint IDs of the viewpoint 0, viewpoint 2, viewpoint 1, viewpoint 4, and viewpoint 3 are set in the "view_id [0]", "view_id [1]", "view_id [2]", "view_id [3]", and "view_id [4]", respectively.

(SPS#C)

Subsequently, an Sps#C NAL Unit is generated. The information associated with the encoding of the whole sequence of a depth signal at each viewpoint is set in the SPS#C. Similarly to the SPS#B, the value of the "nal_unit_type" indicating the type of an NAL unit, which is included in the NAL unit header of the SPS#C, is set to be "15", which indicates that the NAL unit is a subset SPS that is an MVC extension SPS. In the present embodiment, it is stipulated that the value of the "profile_idc" indicating that multi-view depth signals can also be decoded by this profile, is to be "120". Accordingly, the value of the "profile_idc" of the SPS#C is set to be "120". In addition, an arbitrary value different from the "seq_parameter_set_id" of each of the aforementioned SPS#A and SPS#B is set in the "seq_parameter_set_id" of the SPS#C. The "seq_parameter_set_mvc_extension_rbsp" includes the information indicating: the number of viewpoints for the depth signals to be encoded; the encoding or decoding order in the viewpoint direction; and the dependence relationship between viewpoints for specifying viewpoints, which is to be referred to in the inter-view prediction when a depth signal is encoded or decoded.

A parameter is set in the "seq_parameter_set_mvc_extension_rbsp" in the same way as the SPS#B in which the information associated with the encoding of the whole sequence of image signals from other viewpoints excluding the base viewpoint are set. As stated above, when multi-view depth signals including the image signals at three viewpoints of the viewpoint 0, viewpoint 2, and viewpoint 4 are encoded in the order of the viewpoint 0, viewpoint 2, and viewpoint 4, the value of each parameter is set as follows: the value of the "num_views_minus1" is first set to be "2", and then the viewpoint IDs of the viewpoint 0, viewpoint 2, and viewpoint 4 are set in the "view_id [0]", "view_id [1]", and "view_id [2]", respectively. By making the viewpoint ID for each of an image signal and a depth signal at the same viewpoint common between them, the correspondence relationship between the viewpoints for the image signal and the depth signal can be clearly specified on the decoding side.

Because a depth signal is encoded in the same way as an image in a monochrome format in the present embodiment, "0" indicating that an image is monochrome is set in the chroma format "chroma_format_idc" included in the "seq_parameter_set_data", the "chroma_format_idc" indicating a ratio of a luminance component to a color difference component. An example in which the value of the "profile_idc" indicating that multi-view depth signals can be decoded by this profile is stipulated to be "120" has been described above; however, any value other than the value of an existing "profile_idc" may be set. Alternatively, the value of the "profile_idc" of the SPS#C may be set to be "118" indicating the Multiview High Profile by preparing, in the RBSP of the subset SPS NAL unit, a flag indicating whether it is the sequence information of a depth signal.
(PPS#A)

Subsequently, a PPS#A NAL unit is generated. The information associated with the encoding of the whole picture of the image signal at the base viewpoint (in the example of FIG. 10, a signal of the image at the viewpoint 0) is set in the PPS#A. The value of the "nal_unit_type" indicating the type of an NAL unit, which is included in the NAL unit header of the PPS#A, is set to be "8", which indicates that the NAL unit is an PPS (see FIG. 12).

Figure 15:
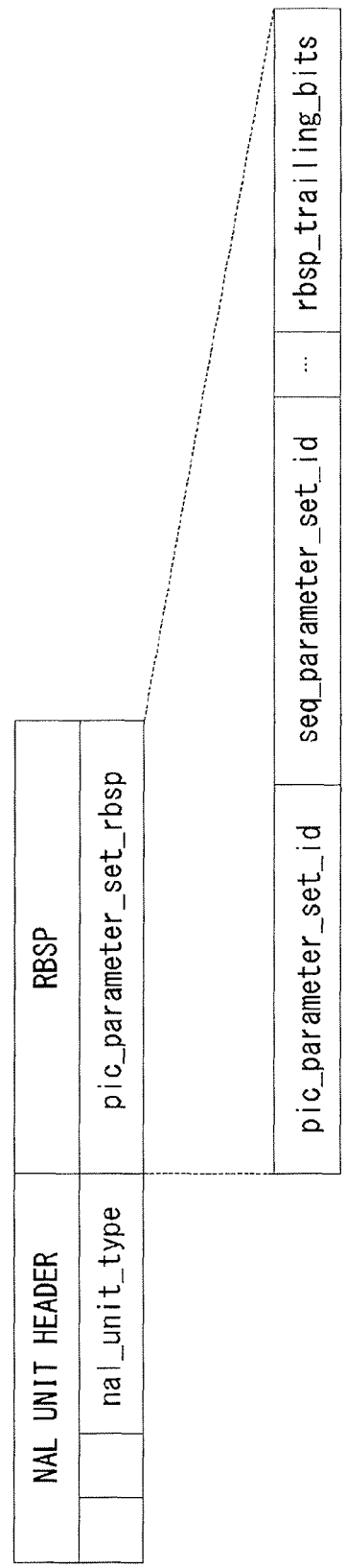
FIG. 15 is a diagram illustrating the configuration of a PPS NAL unit.

FIG. 15 is a diagram illustrating the configuration of a PPS NAL unit. The "pic_parameter_set_id", which is the PPS-specifying unique number for identifying a PPS, is included in the "pic_parameter_set_rbsp" that is the RBSP of the PPS. An arbitrary value different from the "pic_parameter_set_id" of each of the later-described PPS#B and PPS#C is set in the "pic_parameter_set_id" of the PPS#A. Further, the "seq_parameter_set_id", which is the number for specifying the SPS to be referred to, is included in the "pic_parameter_set_rbsp" that is the RBSP of the PPS, and the value of the "seq_parameter_set_id" of the SPS#A, which is to be referred to by the PPS#A, is set in the "seq_parameter_set_id" of the PPS#A.
(PPS#B)

Subsequently, a PPS#B NAL unit is generated. The information associated with the encoding of the whole picture of an image signal at another viewpoint excluding the base viewpoint (herein, each of the signals of the images at the viewpoints 1 and 2 in FIG. 10) are set in the PPS#B. Similarly to the PPS#A, the value of the "nal_unit_type" indicating the type of an NAL unit, which is included in the NAL unit header of the PPS#B, is set to be "8", which indicates that the NAL unit is a PPS.

An arbitrary value different from the "pic_parameter_set_id" of each of the aforementioned PPS#A and later-described PPS#C is set in the "pic_parameter_set_id" of the PPS#B. In addition, the value of the "seq_parameter_set_id" of the SPS#B, which is to be referred to by the PPS#B, is set in the "seq_parameter_set_id" of the PPS#B.
(PPS#C)

Subsequently, a PPS#C NAL unit is generated. The Picture information of a depth signal at each viewpoint is set in the PPS#C. Similarly to the PPS#A and PPS#B, the value of the "nal_unit_type" indicating the type of an NAL unit, which is included in the NAL unit header of the PPS#C, is set to be "8", which indicates that the NPL unit is a PPS. An arbitrary value different from the "pic_parameter_set_id" of each of the aforementioned PPS#A and PPS#B is set in the "pic_parameter_set_id" of the PPS#C. In addition, the value of the "seq_parameter_set_id" of the SPS#C, which is to be referred to by the PPS#C, is set in the "seq_parameter_set_id" of the PPS#C.
(Camera Parameter Information)

Subsequently, a camera parameter information #0 NAL unit is generated. The camera parameter information includes internal parameter information and external parameter information. The internal parameter information is one specific to a camera at each viewpoint and includes coefficients of the camera used in the photographing from each viewpoint, such as the focal length, principal point, and radial distortion (i.e., distortion of the lens toward the radiation direction from the principal point). The external parameter information includes the arrangement information of the camera at each viewpoint. It is possible to express the arrangement information by a position in a three-dimensional space (x, y, z coordinates) or by rotational angles (roll, pitch, yaw) around the three axes (x, y, z axes).

The camera parameter information is encoded at every time. For example, the camera parameter information #0 is one that has been used in photographing images of the later-described slices #A00 to #B30. The camera parameter information is encoded as "Multiview acquisition information SEI", which is one type of the supplemental enhancement information. The value of the "nal_unit_type" indicating the type of an NAL unit, which is included in the camera parameter information #0 NAL unit header, is set to be "6", which indicates that the NAL unit is the SEI (see FIG. 12). Although the camera parameter information is not a parameter directly required for decoding the data encoded in the VCL, but used in generating or displaying a virtual viewpoint after being decoded.
(Prefix NAL Unit #A00)

Subsequently, a prefix NAL unit #A00 is generated. The prefix NAL unit is an NAL unit for encoding the viewpoint information of the slice NAL unit following the prefix NAL unit. The value of the "nal_unit_type" indicating the type of an NAL unit, which is included in the NAL unit header of the prefix NAL unit #A00, is set to be "14", which indicates that the NAL unit is a prefix NAL unit (see FIG. 12).

Figure 16:
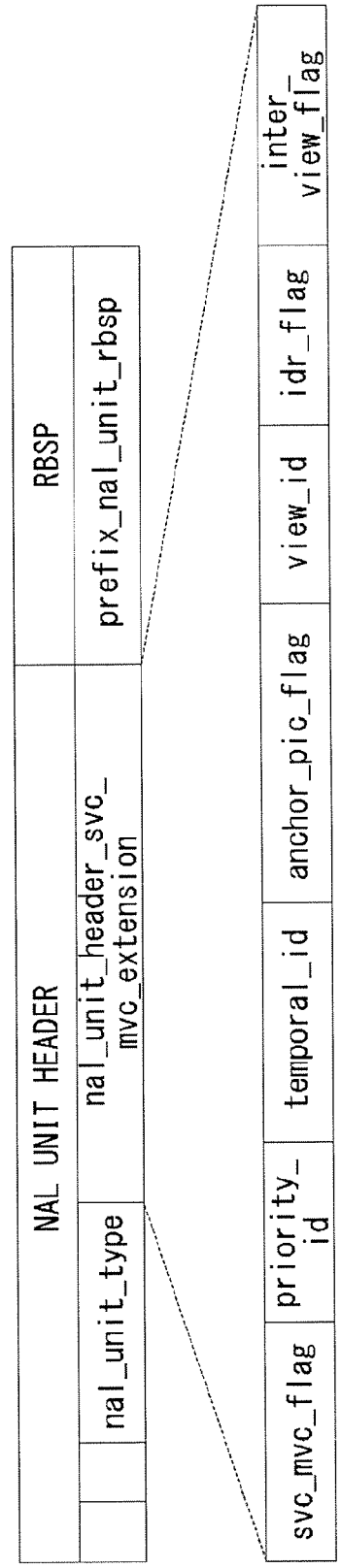
FIG. 16 is a diagram illustrating the configuration of a prefix NAL unit.

FIG. 16 is a diagram illustrating the configuration of the prefix NAL unit. The "nal_unit_header_svc_mvc_extension" is included in the NAL unit header that is the header of the prefix NAL unit, in addition to the "forbidden_zero_bit" and "nal_ref_idc, nal_unit_type". The viewpoint information of the slice NAL unit following the prefix NAL unit is set in the "nal_unit_header_svc_mvc_extension". The viewpoint information of the slice NAL unit #A00 following the prefix NAL unit #A00 is set in the "nal_unit_header_svc_mvc_extension" thereof.

The "view_id", which is the viewpoint-specifying unique number for identifying the viewpoint for the slice NAL unit following the prefix NAL unit, is included in the "nal_unit_header_svc_mvc_extension" of the prefix NAL unit as one of the viewpoint information. The value of the "view_id" of the prefix NAL unit #A00 is set to be a value indicating the viewpoint 0. Herein, the value of the "view_id" for the viewpoint 0 is stipulated to be a value different from the "view_id" for each of other viewpoints of the viewpoint 1, viewpoint 2, viewpoint 3, and viewpoint 4. The "view_id" of the prefix NAL unit #A00 is used as the "view_id" of the following slice NAL unit #A00 of the viewpoint 0. In the MVC, no data is defined in the "prefix_nal_unit_rbsp" that is the RBSP of the prefix NAL unit, and accordingly it is empty. That is, no data is set in the RBSP of the prefix NAL unit in the MVC.
(Slice NAL Unit #A00)

Subsequently, a slice NAL unit #A00 is generated. A slice of the image signal at the viewpoint 0, which is the base viewpoint, is set in the slice NAL unit #A00. Herein, the slice at the base viewpoint is generated as a VCL NAL unit in which the value of the "nal_unit_type" indicating the type of an NAL unit is "1" or "5" (see FIG. 12). The leading picture in the sequence of the image signal at the base viewpoint is encoded as an IDR picture and the picture following the leading picture is encoded as a non-IDR picture.

Because the slice NAL unit #A00 is the leading slice in the sequence, the value of the "nal_unit_type" indicating the type of an NAL unit, which is included in the NAL unit header of the slice NAL unit #A00, is set to be "5", which indicates that the NAL unit is a slice in which the IDR picture is encoded (see FIG. 12). In the example of FIG. 11, one picture is encoded as one slice; however, it is also possible to encode one picture by dividing into multiple slices.

Figure 17:
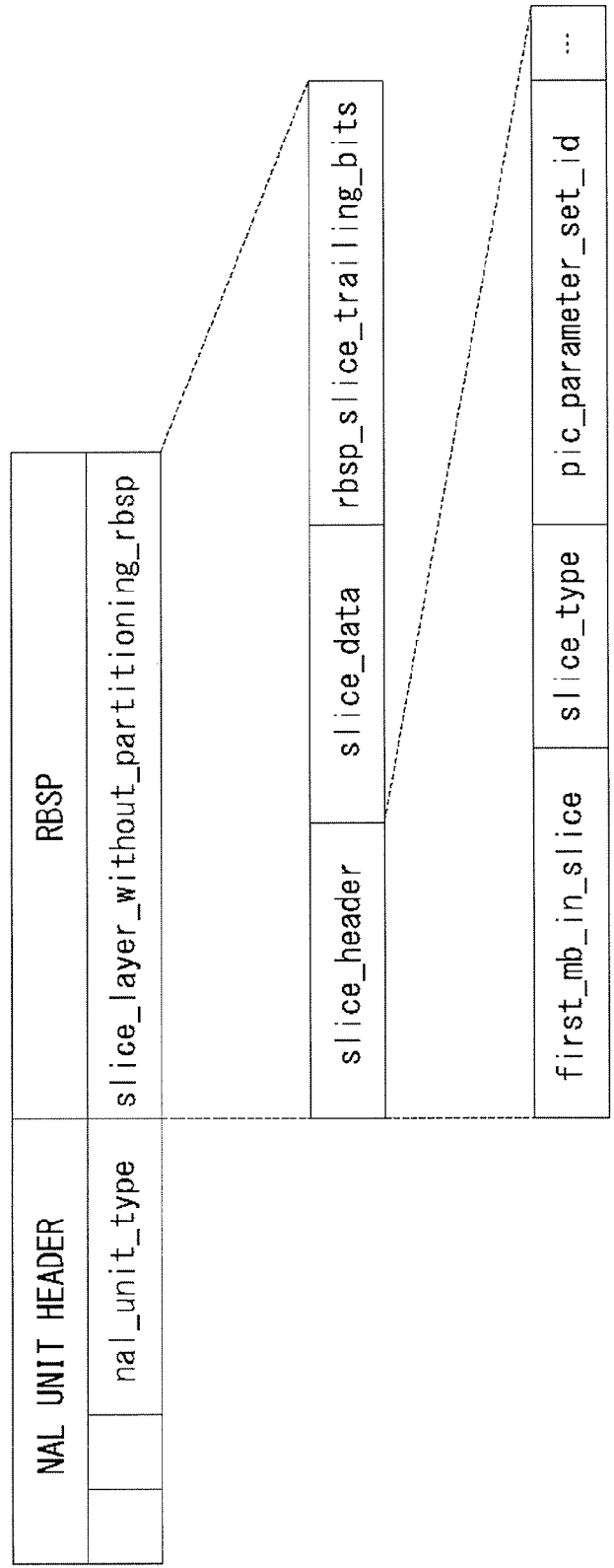
FIG. 17 is a diagram illustrating the configuration of a slice NAL unit in which the value of "nal_unit_type" is "1" or "5"

FIG. 17 is a diagram illustrating the configuration of a slice NAL unit in which the value of the "nal_unit_type" is "1" or "5". Because the "nal_unit_header_svc_mvc_extension" is not included in the NAL unit header of a slice NAL unit in which the value of the "nal_unit_type" is "1" or "5", the viewpoint information is not set. Accordingly, the viewpoint information set in the "nal_unit_header_svc_mvc_extension" of the prefix NAL unit, which has been previously encoded, is used. That is, the viewpoint information set in the "nal_unit_header_svc_mvc_extension" of the prefix NAL unit #A00 is made to be the viewpoint information of the slice NAL unit #A00.

The "slice_layer_without_partitioning_rbsp" that is the RBSP of a slice NAL unit in which the value of the "nal_unit_type" is "1" or "5" includes the "slice_header", "slice_data", and "rbsp_slice_trailing_bits". The "slice_header" includes the information associated with the encoding of a slice. The "slice_data" includes encoded data obtained by encoding an image signal in a slice, such as an encoding mode, motion vector, and encoded residual signal. The "rbsp_slice_trailing_bits" is a bit for adjustment.

The "slice_header" includes the "pic_parameter_set_id", which is the number for specifying the PPS to be referred to. The value of the "pic_parameter_set_id" of the PPS#A, which is to be referred to by the slice NAL unit #400, is set in the "pic_parameter_set_id" of the slice NAL unit #A00. In addition, because the value of the "seq_parameter_set_id" of the SPS #A, which is to be referred to by the PPS#A, is set in the "seq_parameter_set_id" of the PPS#A, it can be clearly specified that the sequence information to be referred to by the slice NAL unit #A00 is the SPS#A.

(Slice NAL Unit #B20)

Subsequently, a slice NAL unit #B20 is generated. A slice of the image signal at the viewpoint 2, which is a non-base viewpoint, is encoded in the slice NAL unit #B20. Herein, a slice of the image signal at the viewpoint 2, the slice having the same displayed time as that of the aforementioned slice #A00 at the viewpoint 0, is encoded. The value of the "nal_unit_type" indicating the type of an NAL unit, which is included in the NAL unit header of the slice NAL unit #B20, is set to be "20", which indicates that the NAL unit is an encoded slice at a viewpoint other than the base viewpoint (see FIG. 12).

Figure 18:
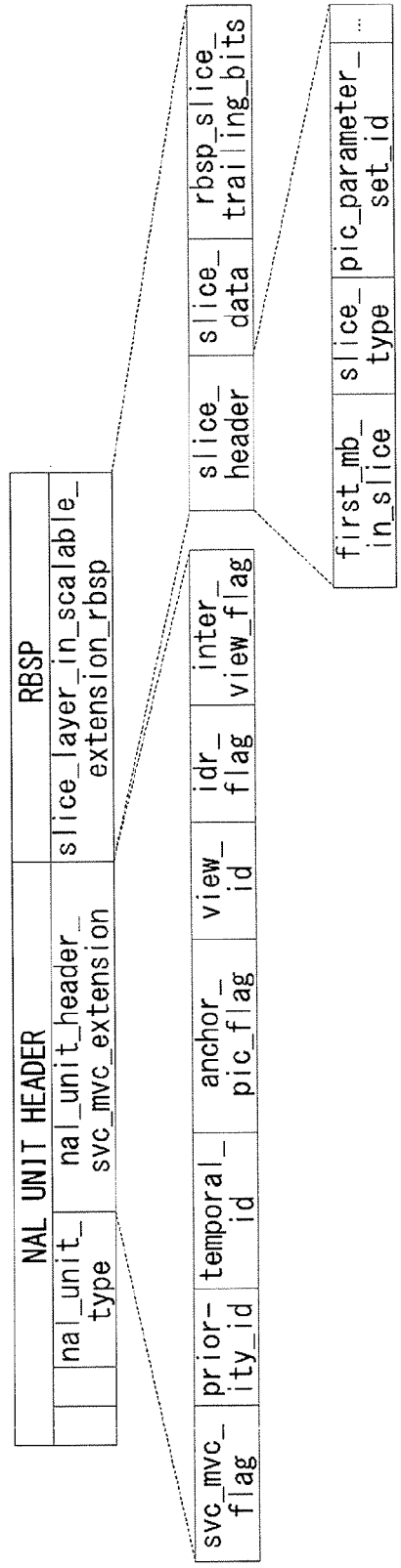
FIG. 18 is a diagram illustrating the configuration of a slice NAL unit in which the value of the "nal_unit_type" is "20"

FIG. 18 is a diagram illustrating the configuration of a slice NAL unit in which the value of the "nal_unit_type" is "20". The "nal_unit_header_svc_mvc_extension" is included in the NAL unit header, which is the header of a slice NAL unit in which the value of the "nal_unit_type" is "20", in addition to the "forbidden_zero_bit" and the "nal_ref_idc, nal_unit_type". The viewpoint information of the slice NAL unit is set in the "nal_unit_header_svc_mvc_extension". The "nal_unit_header_svc_mvc_extension" of the slice NAL unit in which the value of the "nal_unit_type" is "20" includes, as one of the viewpoint information, the "view_id" that is the viewpoint-specifying unique number for identifying the viewpoint for the slice NAL unit. The value indicating the viewpoint 2 is set in the "view_id" of the slice NAL unit #B20. Herein, it is assumed that the value of the "view_id" indicating the viewpoint 2 is different from the value of the "view_id" indicating each of the viewpoint 0, viewpoint 1, viewpoint 3, and viewpoint 4.

The "slice_layer_in_scalable_extension_rbsp" that is the RBSP of a slice NAL unit in which the value of the "nal_unit_type" is "20" includes the "slice_header", "slice_data", and "rbsp_slice_trailing_bits". The "slice_header" includes the information associated with the encoding of a slice. The "slice_data" includes encoded data obtained by encoding an image signal in a slice, such as an encoding mode, motion vector or disparity vector, and encoded residual signal. The "rbsp_slice_trailing_bits" is a bit for adjustment. The "pic_parameter_set_id", which is the number for specifying the PPS to be referred to, is included in the "slice_header". The value of the "pic_parameter_set_id" of the PPS#B, which is to be referred to by the slice NAL unit #B20, is set in the "pic_parameter_set_id" of the slice NAL unit #B20. In addition, because the value of the "seq_parameter_set_id" of the SPS#B, which is to be referred to by the PPS#B, is set in the "seq_parameter_set_id" of the PPS#B, it can be easily determined that the sequence information to be referred to by the slice NAL unit #B20 is the SPS#B.

(Slice NAL Unit #B10)

Subsequently, slice NAL units #B10, #B40, and #B30 are sequentially generated in the same way as the slice NAL unit #B20. A slice of the image signal at the viewpoint 1, which is a non-base viewpoint, is set in the slice NAL unit #B10, a slice of the image signal at the viewpoint 4, which is a non-base viewpoint, is set in the slice NAL unit #B40, and a slice of the image signal at the viewpoint 3, which is a non-base viewpoint, is set in the slice NAL unit #B30.

Herein, slices of the image signals at the viewpoint 1, viewpoint 4, and viewpoint 3, each of which has the same displayed time as each of the aforementioned slice #A00 at the viewpoint 0 and slice #B20 at the viewpoint 2, are encoded. Similarly to the slice NAL unit #B20, the value of each "nal_unit_type" indicating the type of an NAL unit, which is included in the NAL unit header of each of the slice NAL units #B10, #40, and #30, is set to be "20", which indicates that the NAL unit is an encoded slice at a viewpoint other than the base viewpoint (see FIG. 12). The values of the "view_id" of the slice NAL units #B10, #B40, and #B30 are respectively set to be the values indicating the viewpoint 1, viewpoint 4, and viewpoint 3. Herein, the value of the "view_id" at each viewpoint is set so as to be different from the value of the "view_id" at another viewpoint.

The value of the "pic_parameter_set_id" of the PPS#B, which is to be referred to by each of the slice NAL units #B10, #B40, and #B30, is set in the "pic_parameter_set_id" of each of the slice NAL_units #B10, #B40, and #B30. In addition, because the value of the "seq_parameter_set_id" of the SPS#B, which is to be referred to by the PPS#B, is set in the "seq_parameter_set_id" of the PPS#B, it can be clearly specified that the sequence information to be referred to by each of the slice NAL units #B10, #B40, and #B30 is the SPS#B.

(Slice NAL Unit #C00)

Subsequently, a slice NAL unit #C00 is generated. A slice of a depth signal corresponding to the slice NAL unit #A00 of the image signal at the viewpoint 0 is set in the slice NAL unit #C00. Herein, it is stipulated in the present embodiment that the value of the "nal_unit_type" indicating that an NAL unit is a slice NAL unit in which a depth signal is set is "21". Accordingly, the value of the "nal_unit_type" indicating the type of an NAL unit, which is included in the NAL unit header of the slice NAL unit #C00, is set to be "21".

By setting the value of the "nal_unit_type" of a slice NAL unit in which a depth signal is set, to be "21" without using an existing value of the "nal_unit_type", compatibility with the conventional MVC in which a depth signal is not decoded can be maintained. That is, it is because, when the aforementioned encoded bit sequence is decoded by a decoder according to the MVC in which a depth signal is not decoded, only image signals can be normally decoded by decoding the bit sequence without regard for an NAL unit in which the value of the "nal_unit_type" is "21". Although it is stipulated herein that the value of the "nal_unit_type" indicating that an NAL unit is a slice in which a depth signal is encoded is "21", other values reserved for future extension, such as "16", "17", "18", "22", or "23", may be adopted.

The configuration of a slice NAL unit in which the value of the "nal_unit_type" is "21" is stipulated similarly to the configuration illustrated in FIG. 18. That is, it is made that the NAL unit header, which is a header of a slice NAL unit in which the value of the "nal_unit_type" is "21", includes the "nal_unit_header_svc_mvc_extension" in addition to the "forbidden_zero_bit", "nal_ref_idc", and "nal_unit_type".

The value indicating the viewpoint 0 is set in the "view_id" of the slice NAL unit #C00. The value of the "view_id" of the slice NAL unit #C00 is equal to the value of the "view_id" of the prefix NAL unit #A00 in which the viewpoint information of the slice unit #A00 corresponding to the slice NAL unit #C00 is set.

The "slice_layer_in_scalable_extension_rbsp", which is the RBSP of a slice NAL unit in which the value of the "nal_unit_type" is "21", includes the "slice_header", "slice_data", and "rbsp_slice_trailing_bits". The "slice_header" includes the information associated with the encoding of a slice. The "slice_data" includes encoded data obtained by encoding a depth signal in a slice, such as an encoding mode, motion vector or disparity vector, and encoded residual signal. The "rbsp_slice_trailing_bits" is a bit for adjustment.

The "pic_parameter_set_id", which is the number for specifying the PPS to be referred to, is included in the "slice_header". The value of the "pic_parameter_set_id" of the PPS#C, which is to be referred to by the slice NAL unit #C00, is set in the "pic_parameter_set_id" of the slice NAL unit #C00. In addition, because the value of the "seq_parameter_set_id" of the SPS#C, which is to be referred to by the PPS#C, is set in the "seq_parameter_set_id" of the PPS#C, it can be clearly specified that the sequence information to be referred to by the slice NAL unit #C00 is the SPS#C.

(Slice NAL Unit #C20)

Subsequently, slice NAL units #C20 and #C40 are sequentially generated in the same way as the slice NAL unit #C00. A slice of the depth signal at the viewpoint 2 corresponding to the image signal at the viewpoint 2 is set in the slice NAL unit #C20, and a slice of the depth signal at the viewpoint 4 corresponding to the image signal at the viewpoint 4 is set in the slice NAL unit #C40. Similarly to the slice NAL unit #C00, the value of the "nal_unit_type" indicating the type of an NAL unit, which is included in the NAL unit header of each of the slice NAL units #C20 and #C40, is set to be "21".

The values respectively indicating the viewpoints 2 and 4 are set in the "view_id" of each of the slice NAL units #C20 and #C40. The value of the "view_id" of the slice NAL unit #C20 is equal to that of the "view_id" of the slice unit #B20 corresponding thereto, and the value of the "view_id" of the slice NAL unit #C40 is equal to that of the "view_id" of the slice unit #B40 corresponding thereto.

The value of the "pic_parameter_set_id" of the PPS#C, which is to be referred to by the slice NAL units #C20 and #C40, is set in the "pic_parameter_set_id" of each of the slice NAL units #C20 and #C40. In addition, because the value of the "seq_parameter_set_id" of the SPS#C, which is to be referred to by the PPS#C, is set in the "seq_parameter_set_id" of the PPS#C, it can be clearly specified that the sequence information to be referred to by the slice NAL units #C20 and #C40 is the SPS#C.

An NAL unit after the NAL unit #A1 of the camera parameter information, which follows the slice NAL unit #C40, is also generated from the camera parameter information #0 in the same way as the slice NAL unit #C40. The viewpoint information of the following slice #A01 is set in the prefix NAL unit #A01 in the same way as the prefix NAL unit #A00.

A slice of the image signal immediately following, in the encoding or decoding order, the image signal set in the slice NAL unit #A00 is set in the slice NAL unit A#01 in the same way as the slice NAL unit #A00. The value of the "nal_unit_type" indicating the type of an NAL unit, which is included in the NAL unit header of the slice NAL unit #A01, is set to be "1", which indicates that the NAL unit is a slice in which a non-IDR picture is encoded.

Slices of the image signals each immediately following, in the encoding or decoding order, the image signals at each of the viewpoints set in the slice NAL units #B20, #B10, #B40, and #B30 are respectively encoded in the slice NAL units #B21, #B11, #B41, and #B31 in the same way as the slice NAL units #B20 and #B10, etc. Slices of the depth signals each immediately following, in the encoding or decoding order, the depth signals at each of the viewpoints set in the slice NAL units #C00, #C20, and #C40 are respectively encoded in the slice NAL units #C01, #C21, and #C41 in the same way as the slice NAL units #C00, #C20, and #C40.

Referring back to FIGS. 1 and 3, the configuration of one of the image encoding apparatuses 100 and 100a according to Embodiment 1 will be described more specifically. Encoding management information is supplied to the encoding management unit 101 from an external or non-illustrated encoding management information holding unit. The encoding management unit 101 newly calculates a parameter, if necessary.

The encoding management unit 101 manages the information associated with the encoding of the information including: (a) parameter information associated with the whole sequence of an image signal (i.e., SPS of an image signal); (b) parameter information associated with the whole sequence of a depth signal (i.e., SPS of a depth signal); (c) parameter information associated with a picture of an image signal (i.e., PPS of an image signal); (d) parameter information associated with a picture of a depth signal (i.e., PPS of a depth signal); (e) header information associated with a slice of a picture of an image signal (i.e., slice header of an image signal); and (f) header information associated with a slice of a picture of a depth signal (i.e., slice header of a depth signal).

The encoding management unit 101 further manages the viewpoint information of multi-view image signals and multi-view depth signals, the reference dependence relationship between images to be encoded, and the encoding or decoding order. The encoding management unit 101 manages, as the aforementioned viewpoint information, the correspondence relationship between an image signal and a depth signal at each viewpoint by the viewpoint ID.

The encoding management unit 101 manages whether an image signal or a depth signal at another viewpoint is referred to in viewpoint units, as the aforementioned reference dependence relationship. The encoding management unit 101 further manages whether, when an image signal to be encoded or a depth signal to be encoded is encoded in picture or slice units, inter-view prediction (e.g., disparity-compensated prediction) in which an image signal or a depth signal at another viewpoint is used as a reference image, as the aforementioned reference dependence relationship, is performed. Furthermore, the encoding management unit 101 manages whether, after an image signal to be encoded or a depth signal to be encoded has been encoded, a decoded image signal or a decoded depth signal obtained by being decoded on the decoding side is used as a reference picture, as the aforementioned reference dependence relationship, when an image signal to be encoded or a depth signal to be encoded at another viewpoint is encoded. Furthermore, the encoding management unit 101 manages which reference image is to be referred to among multiple reference image candidates, as the aforementioned reference dependence relationship.

The encoding management unit 101 further manages the aforementioned encoding or decoding order such that the decoding order of image signals to be decoded on the decoding side, according to the aforementioned reference dependence relationship, is behind the decoding order of the reference images to be referred to by the image signal. The encoding management unit 101 further manages the aforementioned encoding or decoding order such that an image signal and a depth signal are encoded in an order suitable for simultaneously outputting an image signal and depth signal at each viewpoint at the same time after the two signals have been decoded.

The sequence information (for image signal) encoding unit 102 generates an encoded bit sequence by encoding the parameter information associated with the whole sequence of the image signal at the base viewpoint (i.e., SPS of the image signal at the base viewpoint), the image signal being managed by the encoding management unit 101. The encoded bit sequence corresponds to the RBSP of the SPS#A in the whole encoded bit sequence illustrated in FIG. 11. As stated above, the SPS of the image signal at the base viewpoint is encoded in accordance with the syntax structure of the "seq_parameter_set_rbsp", which is the RBSP illustrated in FIG. 13.

The sequence information (for image signal) encoding unit 102 further generates an encoded bit sequence by encoding the parameter information associated with the whole sequence of an image signal at a non-base viewpoint (i.e., SPS of an image signal at a non-base viewpoint), the image signal being managed by the encoding management unit 101. The encoded bit sequence corresponds to the RBSP of the SPS#B in the whole encoded bit sequence illustrated in FIG. 11. As stated above, the SPS of an image signal at a non-base viewpoint is encoded in accordance with the syntax structure of the "subset_seq_parameter_set_rbsp", which is the RBSP illustrated in FIG. 14. Herein, the MVC extension information of the SPS is also encoded in accordance with the syntax structure illustrated in FIG. 14.

The sequence information (for depth signal) encoding unit 103 generates an encoded bit sequence by encoding the parameter information associated with the whole sequence of a depth signal managed by the encoding management unit 101 (i.e., SPS of a depth signal). The encoded bit sequence corresponds to the RBSP of the SPS#C of the whole encoded bit sequence illustrated in FIG. 11. As stated above, the SPS of a depth signal is encoded in accordance with the syntax structure of the "subset_seq_parameter_set_rbsp", which is the RBSP illustrated in FIG. 14. Herein, the MVC extension information of the SPS is also encoded in accordance with the syntax structure illustrated in FIG. 14.

The picture information (for image signal) encoding unit 104 generates an encoded bit sequence by encoding the information associated with a picture of an image signal managed by the encoding management unit 101 (i.e., PPS of an image signal). The encoded bit sequence corresponds to the RBSP of each of the PPS#A and the PPS#B in the whole encoded bit sequence illustrated in FIG. 11. As stated above, the PPS of the image signal at the base viewpoint and that of an image signal at a non-base viewpoint are respectively encoded in accordance with the syntax structure of the "pic_parameter_set_rbsp", which is the RBSP illustrated in FIG. 15.

The picture information (for depth signal) encoding unit 105 generates an encoded bit sequence by encoding the information associated with a picture of a depth signal managed by the encoding management unit 101 (i.e., PPS of a depth signal). The encoded bit sequence corresponds to the RBSP of the PPS#C in the whole encoded bit sequence illustrated in FIG. 11. As stated above, the PPS of a depth signal is encoded in accordance with the syntax structure of the "pic_parameter_set_rbsp", which is the RBSP illustrated in FIG. 15.

The camera parameter information encoding unit 106 generates an encoded bit sequence by encoding, as an SEI, the parameter information of a camera used in the photographing at each viewpoint. Herein, the camera parameter information includes internal parameter information and external parameter information. The internal parameter information is specific to a camera at each viewpoint and includes coefficients of the camera used in the photographing from each viewpoint, such as a focal length, principal point, and radial distortion (i.e., distortion of the lens toward the radiation direction from the principal point). The external parameter information includes the arrangement information of a camera at each viewpoint. It is possible to express the arrangement information by a position in a three-dimensional space (x, y, z coordinates) or by rotational angles (roll, pitch, yaw) around three axes (x, y, z axes).

An image signal at each viewpoint is supplied to the image signal encoding unit 107. In the example of FIG. 10, the image signals at the viewpoint 0, viewpoint 1, viewpoint 2, viewpoint 3, and viewpoint 4, are supplied to the image signal encoding unit 107. The image signal encoding unit 107 generates an encoded stream by encoding the information associated with a slice of an image signal managed by the encoding management unit 101 (i.e., the slice header of an image signal) and by encoding the supplied image signal to be encoded in slice units.

The encoded stream corresponds to the RBSP of each of the slices #A00, #B20, #B10, #B40, #B30, #A01, #B21, #B11, #B41, and #B31 in the whole encoded stream illustrated in FIG. 11. As stated above, the slice header of the image signal at the base viewpoint and a slice of the supplied image signal at the base viewpoint to be encoded are respectively encoded in accordance with the syntax structure of the "slice_layer_without_partitioning_rbsp", which is the RBSP illustrated in FIG. 17. More specifically, a slice of the image signal at the base viewpoint is encoded through the processing, such as the intra prediction coding, inter prediction coding, orthogonal transform, quantization, entropy encoding, or the like.

The slice header of an image signal at a non-base viewpoint and a slice of the supplied image signal at a non-base viewpoint to be encoded are respectively encoded in accordance with the syntax structure of the "slice_layer_in_scalable_extension_rbsp", which is the RBSP illustrated in FIG. 18. The inter-view prediction or motion-compensated prediction is sometimes used in encoding an image signal, and in the case, an image signal that has been locally decoded from the picture of an already-encoded image signal can be used as a reference image.

A depth signal at each viewpoint is supplied to the depth signal encoding unit 108. In the example of FIG. 10, a depth signal supplied to the depth signal encoding unit 108 is signals of the depth maps at the viewpoint 0, viewpoint 2 and viewpoint 4. The depth signal encoding unit 108 generates an encoded stream by encoding the information associated with a slice of a depth signal managed by the encoding management unit 101 (i.e., the slice header of a depth signal) and by encoding the supplied depth signal to be encoded in slice units.

The encoded bit sequence corresponds to the RBSP of each of the slices #C00, #C20, #C40, #C01, #C21, and #C41 in the whole encoded bit stream illustrated in FIG. 11. As stated above, the slice header of a depth signal and a slice of the supplied depth signal to be encoded are respectively encoded in accordance with the syntax structure of the "slice_layer_in_scalable_extension_rbsp", which is the RBSP illustrated in FIG. 18. The inter-view prediction or motion-compensated prediction is sometimes used in encoding a depth signal, and in the case, a depth signal that has been locally decoded from the picture of an already-encoded depth signal can be used as a reference image. A depth signal can be encoded by using the same method as an image signal in a gray scale.

The unitization unit 109 respectively converts the following encoded bit sequences into NAL units by adding, to each of the encoded bit sequences, an NAL unit header that is header information for handling each of them with units of NAL unit: (a) an encoded bit sequence of sequence information of the image signal at the base viewpoint, which has been generated by the sequence information (for image signal) encoding unit 102; (b) an encoded bit sequence of sequence information of an image signal at a non-base viewpoint, which has been generated by the sequence information (for image signal) encoding unit 102; (c) an encoded bit sequence of sequence information of a depth signal, which has been generated by the sequence information (for depth signal) encoding unit 103; (d) an encoded bit sequence of picture information of the image signal at the base viewpoint, which has been generated by the picture information (for image signal) encoding unit 104; (e) an encoded bit sequence of picture information of an image signal at a non-base viewpoint, which has been generated by the picture information (for image signal) encoding unit 104; (f) an encoded bit sequence of picture information of a depth signal, which has been generated by the picture information (for depth signal) encoding unit 105; (g) an encoded bit sequence of camera parameter information, which has been generated by the camera parameter information encoding unit 106; (h) an encoded bit sequence of the information associated with a slice of the image signal at the base viewpoint (i.e., slice header of the image signal at the base viewpoint) and a slice of the image signal at the base viewpoint, which has been generated by the image signal encoding unit 107; (i) an encoded bit sequence of the information associated with a slice of an image signal at a non-base viewpoint (i.e., slice header of an image signal at a non-base viewpoint) and a slice of an image signal at a non-base viewpoint, which has been generated by the image signal encoding unit 107; and (j) an encoded bit sequence of the information associated with a slice for a depth signal (i.e., slice header of a depth signal) and a slice of a depth signal, which have been generated by the depth signal encoding unit 108.

Further, the unitization unit 109 generates an encoded bit sequence of the multi-view images illustrated in FIG. 11 by multiplexing, if necessary, the encoded bit sequences that have been converted into NAL units. In addition, when the encoded bit sequence is transmitted through a network, a non-illustrated packetization unit packetizes the bit sequence based on standards, such as the MPEG-2 System, MP4 File Format, or RTP. A non-illustrated transmission unit transmits the packetized encoded bit sequence.

Herein, the NAL unit header illustrated in FIG. 13 is added to the encoded bit sequence of the sequence information of the image signal at the base viewpoint, which is supplied from the sequence information (for image signal) encoding unit 102. Herein, the value of the "nal_unit_type" indicating the type of an NAL unit is set to be "7", which indicates that the NAL unit is an SPS. The encoded bit sequence to which the NAL unit header has been added corresponds to the SPS#A NAL unit in the encoded bit sequence illustrated in FIG. 11. In addition, the NAL unit header illustrated in FIG. 14 is added to the encoded bit sequence of the sequence information of an image signal at a non-base viewpoint. Herein, the value of the "nal_unit_type" indicating the type of an NAL unit is set to be "15", which indicates that the NAL unit is a subset SPS that is an MVC extension SPS. The encoded bit sequence to which the NAL unit header has been added corresponds to the SPS#B NAL unit in the whole encoded bit sequence illustrated in FIG. 11.

The NAL unit header illustrated in FIG. 14 is added to the encoded bit sequence of the sequence information of a depth signal, which is supplied from the sequence information (for depth signal) encoding unit 103. Herein, the value of the "nal_unit_type" indicating the type of an NAL unit is set to be "15", which indicates that the NAL unit is a subset SPS that is the MVC extension SPS. The encoded bit sequence to which the NAL unit header has been added corresponds to the SPS#C NAL unit in the whole encoded bit sequence illustrated in FIG. 11.

The NAL unit header illustrated in FIG. 15 is added to the encoded bit sequence of the picture information of the image signal at the base viewpoint, which is supplied from the picture information (for image signal) encoding unit 104. Herein, the value of the "nal_unit_type" indicating the type of an NAL unit is set to be "8", which indicates that the NAL unit is a PPS. The encoded bit sequence to which the NAL unit header has been added corresponds to the PPS#A NAL unit in the whole encoded bit sequence illustrated in FIG. 11. Also, the NAL unit header illustrated in FIG. 15 is added to the encoded bit sequence of the picture information of an image signal at a non-base viewpoint. Herein, the value of the "nal_unit_type" indicating the type of an NAL unit is set to be "8", which indicates that the NAL unit is a PPS. The encoded bit sequence to which the NAL unit header has been added corresponds to the PPS#B NAL unit in the whole encoded bit sequence illustrated in FIG. 11.

Also, the NAL unit header illustrated in FIG. 15 is added to the encoded bit sequence of the picture information of a depth signal, which is supplied from the picture information (for depth signal) encoding unit 105. Herein, the value of the "nal_unit_type" indicating the type of an NAL unit is set to be "8", which indicates that the NAL unit is a PPS. The encoded bit sequence to which the NAL unit header has been added corresponds to the PPS#C NAL unit in the whole encoded bit sequence illustrated in FIG. 11.

The NAL unit header for an SEI is added to the encoded bit sequence of the camera parameter information, which is supplied from the camera parameter information encoding unit 106. Herein, the value of the "nal_unit_type" indicating the type of an NAL unit is set to be "6", which indicates that the NAL unit is an SEI. The encoded bit sequence to which the NAL unit header has been added corresponds to the NAL unit of each of the camera parameter information #0 and #1 in the whole encoded bit sequence illustrated in FIG. 11.

The NAL unit header illustrated in FIG. 17 is added to the encoded bit sequence including the encoded slice header information of the image signal at the base viewpoint and the encoded image signal at the base viewpoint, which is supplied from the image signal encoding unit 107. Herein, the value of the "nal_unit_type" indicating the type of an NAL unit is set to be "1" or "5", which indicates that the NAL unit is a slice of the image signal at the base viewpoint. The encoded bit sequence to which the NAL unit header has been added corresponds to the NAL unit of each of the slice #A00 and #A01 in the whole encoded bit sequence illustrated in FIG. 11.

In addition, a prefix NAL unit for encoding the viewpoint information of the image signal at the base viewpoint is set before the slice NAL unit of the aforementioned image signal at the base viewpoint. Although the structure of the prefix NAL unit is as illustrated in FIG. 16, only the NAL unit header illustrated in FIG. 16 is set because an RBSP is not set in the MVC, as stated above. Herein, the value of the "nal_unit_type" indicating the type of an NAL unit is set to be "14", which indicates that the NAL unit is a prefix NAL unit. The encoded bit sequence in which only the NAL unit header has been encoded corresponds to the NAL unit of each of the prefix NAL units #A00 and #A01 in the whole encoded bit sequence illustrated in FIG. 11.

The NAL unit header illustrated in FIG. 18 is added to the encoded bit sequence including the slice header of an encoded image signal at a non-base viewpoint and the encoded slice an image signal at a non-base viewpoint. Herein, the value of the "nal_unit_type" indicating the type of an NAL unit is set to be "20", which indicates that the NAL unit is a slice of an image signal at a non-base viewpoint. The encoded bit sequence to which the NAL unit header has been added corresponds to the NAL unit of each of the slices #B20 #B10, #B40, #B30, #B21, #B11, #B41, and #B31 in the whole encoded bit sequence illustrated in FIG. 11.

The NAL unit header illustrated in FIG. 18 is added to the encoded bit sequence including the encoded slice header of a depth signal and the encoded slice of a depth signal, which is supplied from the depth signal encoding unit 108. Herein, the value of the "nal_unit_type" indicating the type of an NAL unit is set to be "21", which indicates that the NAL unit is a slice of a depth signal. The encoded bit sequence to which the NAL unit header has been added corresponds to the NAL unit of each of the slices #C00, #C10, #C20, #C01, #C11, and #C21 in the whole encoded bit sequence illustrated in FIG. 11.

Figure 19:
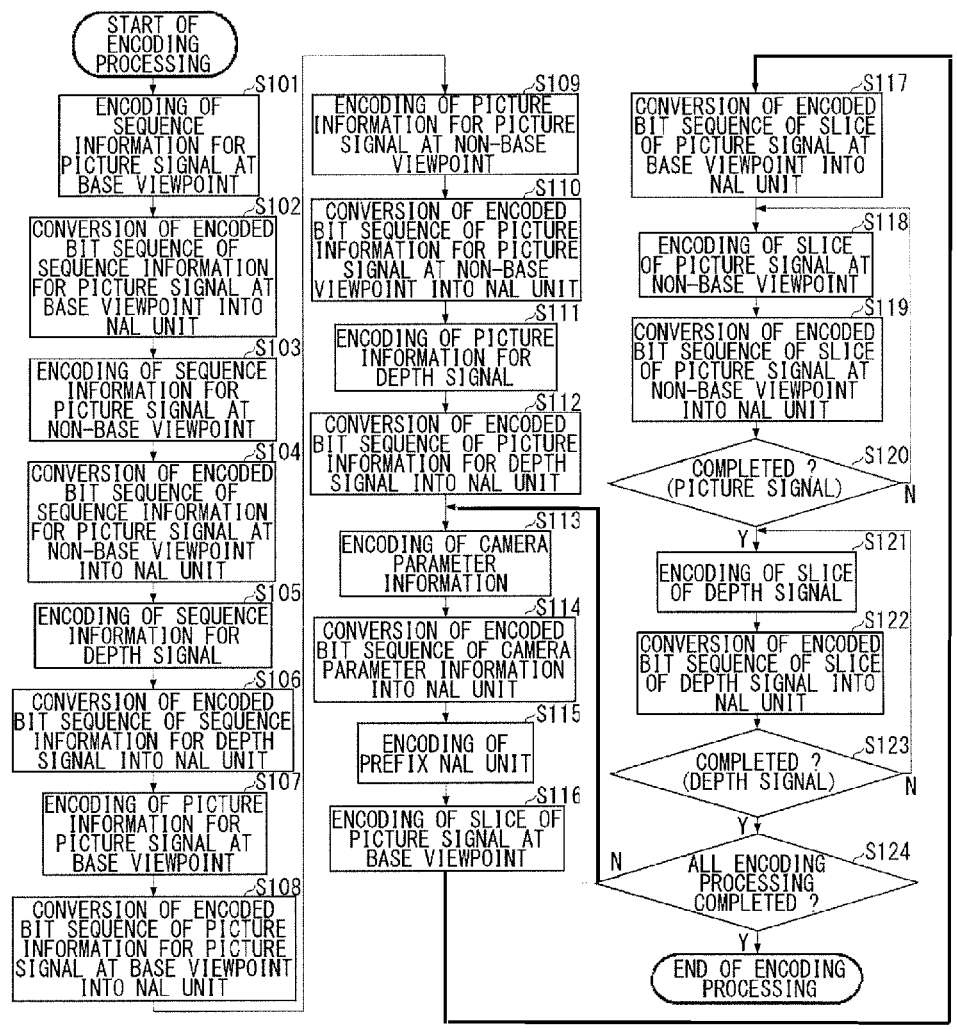
FIG. 19 is a flowchart illustrating a processing procedure for encoding multi-view images by the image encoding apparatus according to Embodiment 1.

Subsequently, a processing procedure for encoding multi-view images by one of the image encoding apparatuses 100 and 100a according to Embodiment 1, which are respectively illustrated in FIGS. 1 and 3, will be described. FIG. 19 is a flowchart illustrating the processing procedure for encoding multi-view images by one of the image encoding apparatuses 100 and 100a according to Embodiment 1. The sequence information (for image signal) encoding unit 102 first generates an encoded bit sequence of the sequence information of the image signal at the base viewpoint (i.e., SPS of the image signal at the base viewpoint) by encoding the parameter information associated with the encoding of the whole sequence of the image signal at the base viewpoint (S101).

Subsequently, the unitization unit 109 converts the encoded bit sequence of the sequence information of the image signal at the base viewpoint, which has been obtained by the processing of Step S101, into NAL units by adding thereto header information for handling the encoded bit sequence with units of NAL unit (S102). Further, the unitization unit 109 multiplexes the formed NAL units with another NAL unit, if necessary.

Subsequently, the sequence information (for image signal) encoding unit 102 generates an encoded bit sequence of the sequence information of an image signal at a non-base viewpoint (i.e., SPS of an image signal at a non-base viewpoint) by encoding the parameter information associated with the encoding of the whole sequence for an image signal at a non-base viewpoint (S103).

Subsequently, the unitization unit 109 converts the encoded bit sequence of the sequence information of an image signal at a non-base viewpoint, which has been obtained by the processing of Step S104, into NAL units by adding thereto header information for handling the encoded bit sequence with units of NAL unit (S104). Further, the unitization unit 109 multiplexes the formed NAL units with another NAL unit, if necessary.

Subsequently, the sequence information (for depth signal) encoding unit 103 generates an encoded bit sequence of the sequence information of a depth signal (i.e., SPS of a depth signal) by encoding the parameter information associated with the encoding of the whole sequence of the depth signal (S105).

Subsequently, the unitization unit 109 converts the encoded bit sequence of the sequence information of the depth signal, which has been obtained by the processing of Step S105, into NAL units by adding thereto header information for handling the encoded bit sequence with units of NAL unit (S106). Further, the unitization unit 109 multiplexes the formed NAL units with another NAL unit, if necessary.

Subsequently, the picture information (for image signal) encoding unit 104 generates an encoded bit sequence of the picture information of the image signal at the base viewpoint (i.e., PPS of the image signal at the base viewpoint) by encoding the parameter information associated with the encoding of the whole picture of the image signal at the base viewpoint (S107).

Subsequently, the unitization unit 109 converts the encoded bit sequence of the picture information of the image signal at the base viewpoint, which has been obtained by the processing of Step S107, into NAL units by adding thereto header information for handling the encoded bit sequence with units of NAL unit (S108). Further, the unitization unit 109 multiplexes the formed NAL units with another NAL unit, if necessary.

Subsequently, the picture information (for image signal) encoding unit 104 generates an encoded bit sequence of the picture information of an image signal at a non-base viewpoint (i.e., PPS of an image signal at a non-base viewpoint) by encoding the parameter information associated with the encoding of the whole picture of an an image signal at a non-base viewpoint (S109).

Subsequently, the unitization unit 109 converts the encoded bit sequence of the picture information of an image signal at a non-base viewpoint, which has been obtained by the processing of Step S109, into NAL units by adding thereto header information for handling the encoded bit sequence with units of NAL unit (S110). Further, the unitization unit 109 multiplexes the formed NAL units with another NAL unit, if necessary.

Subsequently, the picture information (for depth signal) encoding unit 105 generates an encoded bit sequence of the picture information of a depth signal (i.e., PPS of a depth signal) by encoding the parameter information associated with the encoding of the whole picture of the depth signal (S111).

Subsequently, the unitization unit 109 converts the encoded bit sequence of the picture information of a depth signal, which has been obtained by the processing of Step S111, into NAL units by adding thereto header information for handling the encoded bit sequence with units of NAL unit (S112). Further, the unitization unit 109 multiplexes the formed NAL units with another NAL unit, if necessary.

Subsequently, the camera parameter information encoding unit 106 generates an encoded bit sequence by encoding, as an SEI, the parameter information of a camera used in the photographing from each viewpoint (S113).

Subsequently, the unitization unit 109 converts the encoded bit sequence of the camera information, which has been obtained by the processing of Step S113, into NAL units by adding thereto header information for handling the encoded bit sequence with units of NAL unit (S114). Further, the unitization unit 109 multiplexes the formed NAL units with another NAL unit, if necessary.

Subsequently, the unitization unit 109 makes a prefix NAL unit by encoding header information for handling with units of NAL unit including the viewpoint information of the following NAL unit (S115). It is because an RBSP is not encoded in the MVC, as stated above. Further, the unitization unit 109 multiplexes the formed prefix NAL units with another NAL unit, if necessary.

Subsequently, the image signal encoding unit 107 generates an encoded bit sequence of a slice of the image signal at the base viewpoint by encoding the information associated with the slice of the image signal at the base viewpoint (i.e., slice header of the image signal at the base viewpoint) and by encoding the slice of the image signal at the base viewpoint to be encoded (S116).

Subsequently, the unitization unit 109 converts the encoded bit sequence of a slice of the image signal at the base viewpoint, which has been obtained from the processing of Step S116, into NAL units by adding thereto header information for handling the encoded bit sequence with units of NAL unit (S117). Further, the unitization unit 109 multiplexes the formed NAL units with another NAL unit, if necessary. Although not illustrated in FIG. 19, when a picture is encoded by dividing into multiple slices, the processing of Steps S116 and S117 are repeated.

Subsequently, the image signal encoding unit 107 generates an encoded bit sequence of a slice of an image signal at a non-base viewpoint by encoding the information associated with a slice of an image signal at a non-base viewpoint (i.e., slice header of an image signal at a non-base viewpoint) and by encoding a slice of the image signal at the base viewpoint to be encoded (S118).

Subsequently, the unitization unit 109 converts the encoded bit sequence of a slice of an image signal at a non-base viewpoint, which has been obtained from the processing of Step S117, into NAL units by adding thereto header information for handling the encoded bit sequence with units of NAL unit (S119). Further, the unitization unit 109 multiplexes the formed NAL units with another NAL unit, if necessary. Although not illustrated in FIG. 19, when a picture is encoded by dividing into multiple slices, the processing of Steps S118 and S119 are repeated.

Subsequently, the encoding management unit 101 determines whether, at the displayed time, the encoding processing of image signals from all viewpoints to be encoded have been completed (S120). When the encoding processing of the image signals at the displayed time have been completed (S120/Y), the procedure proceeds to the processing of Step S121, and when not completed (S120/N), the encoding processing of Steps S118 to S120 are repeated.

Subsequently, the depth signal encoding unit 108 generates an encoded bit sequence of a slice of a depth signal by encoding the information associated with a slice of a depth signal (i.e., slice header of a depth signal) and a slice of the depth signal to be encoded (S121).

Subsequently, the unitization unit 109 converts the encoded bit sequence of the slice of the depth signal, which has been obtained from the processing of Step S121, into an NAL unit by adding thereto header information for handling the encoded bit sequence with units of NAL unit (S122). Further, the unitization unit 109 multiplexes the formed NAL unit with another NAL unit, if necessary. Although not illustrated in FIG. 19, when a picture is encoded by dividing into multiple slices, the processing of Steps S121 and S122 are repeated.

Subsequently, the encoding management unit 101 determines whether, at the displayed time, the encoding processing of the depth signals from all viewpoints to be encoded have been completed (S123). When the encoding processing of the depth signals at the displayed time have been completed (S123/Y), the procedure proceeds to Step S121, whereas when not completed (S123/N), the encoding processing of Steps S121 to S123 are repeated.

Subsequently, the encoding management unit 101 determines whether the encoding processing of all the image signals and depth signals, which are to be encoded, have been completed (S124). When the encoding processing of all the image signals and depth signals have been completed (S124/Y), the present encoding processing is ended, whereas when not completed (S124/N), the encoding processing of Steps S113 to S124 are repeated.

Figure 20:
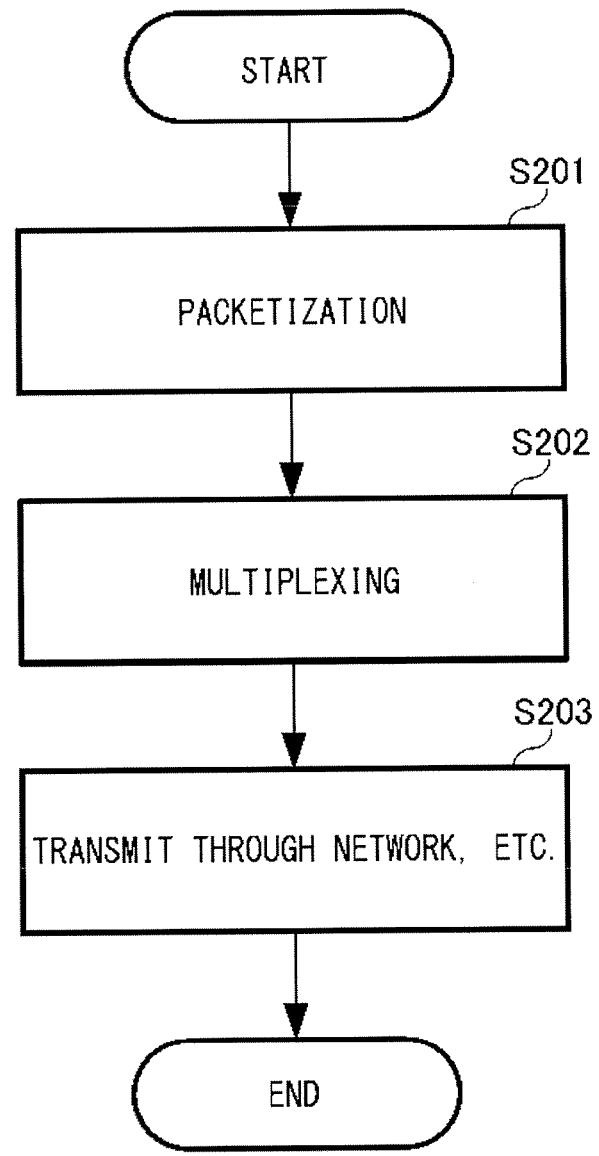
FIG. 20 is a flowchart illustrating a processing procedure for transmitting, through a network, an encoded bit sequence of multi-view images generated by the image encoding apparatus according to Embodiment 1.

Subsequently, a processing procedure for transmitting, through a network, the encoded bit sequence of the multi-view images generated by one of the picture encoding apparatuses 100 and 100a according to Embodiment 1, which are respectively illustrated in FIGS. 1 and 3, will be described. FIG. 20 is a flowchart illustrating a processing procedure for transmitting, through a network, the encoded bit sequence of the multi-view images generated by one of the image encoding apparatuses 100 and 100a according to Embodiment 1. The whole processing illustrated in the flowchart in FIG. 20 are performed, if necessary, after each processing of Steps S102, S104, S106, S108, S110, S112, S114, S115, S117, S119, and S122 in the flowchart in FIG. 19.

In the flowchart in FIG. 20, a non-illustrated packetization unit packetizes, if necessary, the encoded bit sequences obtained from the processing of Steps S102, S104, S106, S108, S110, S112, S114, S115, S117, S119, and S122 in the flowchart in FIG. 19, based on the standards, such as the MPEG-2 System, MP4 File Format, and RTP (S210).

Subsequently, the packetization unit multiplexes, if necessary, the packetized encoded bit sequence with an encoded bit sequence, such as audio (S202). Subsequently, a non-illustrated transmission unit transmits, through a network, etc., the packetized encoded bit sequence as needed (S203).

The encoded bit sequence encoded by one of the image encoding apparatuses 100 and 100a according to Embodiment 1 can also be decoded by a decoding apparatus according to the existing single-view AVC/H.264. In the case, only the image signal at the base viewpoint can be obtained on the decoding side. For example, the encoded bit sequence illustrated in FIG. 11, which has been encoded by one of the image encoding apparatuses 100 and 100a according to Embodiment 1, can be decoded by a decoding apparatus according to the High Profile of the AVC/H.264.

In the case, the following NAL units according to the High Profile of the AVC/H.264 are decoded: (a) an SPS NAL unit #A in which the value of the "nal_unit_type" is "7"; (b) PPS NAL units #A, #B, and #C in each of which the value of the "nal_unit_type" is "8"; (c) a slice NAL unit #A00 in which the value of the "nal_unit_type" is "1"; and (d) a slice NAL unit #A01 in which the value of the "nal_unit_type" is "5".

However, the PPS NAL units #B and #C are not actually used because an NAL unit referring to these PPS NAL units are not decoded. SPS NAL units #B and #C in each of which the value of the "nal_unit_type" is "15", which are not according to the High Profile of the AVC/H.264, are not decoded.

Similarly, the following NAL units are also not decoded: (a) a prefix NAL unit #A00 in which the value of the "nal_unit_type" is "14"; (b) slice NAL units #B10, #B20, #B11, and #B21 in each of which the value of the "nal_unit_type" is "20"; and (c) slice NAL units #C00, #C10, #C20, #C01, #C11, and #C21 in each of which the value of the "nal_unit_type" is "21".

Also, the encoded bit sequence encoded by one of the image encoding apparatuses 100 and 100a according to Embodiment 1 can be decoded by a decoding apparatus according to the existing MVC. In the case, only multi-view image signals can be obtained on the decoding side. For example, the encoded bit sequence illustrated in FIG. 11, which has been encoded by one of the image encoding apparatuses 100 and 100a according to Embodiment 1, can be decoded by a decoding apparatus according to the Multi-view High Profile of the AVC/H.264.

In the case, the following NAL units according to the Multi-view High Profile of the AVC/H.264 are decoded: (a) an SPS NAL unit #A in which the value of the "nal_unit_type" is "7"; (b) SPS NAL units #B and #C in each of which the value of the "nal_unit_type" is "15"; (c) PPS NAL units #A, #B, and #C in each of which the value of the "nal_unit_type" is "8"; (d) a prefix NAL unit #A00 in which the value of the "nal_unit_type" is "14"; (e) a slice NAL unit #A00 in which the value of the "nal_unit_type" is "1"; (f) a slice NAL unit #A01 in which the value of the "nal_unit_type" is "5"; and (g) slice NAL units #B10, #B20, #B11, and #B21 in each of which the value of the "nal_unit_type" is "20".

However, the SPS NAL unit #C and the PPS NAL unit #C are not actually used because an NAL unit referring to these SPS and PPS NAL units are not decoded. The slice NAL units #C00, #C10, #C20, #C01, #C11, and #C21 in each of which the value of the "nal_unit_type" is "21", which are not according to the Multi-view High Profile of the AVC/H.264, are not decoded.

According to Embodiment 1, by unitizing, as the same encoded stream, both a multi-view image encoded bit sequence, which has been generated by encoding multi-view picture signals including picture signals from multiple viewpoints, and a multi-view depth signal bit sequence, which has been generated, as supplemental information, by encoding multi-view depth signals including depth signals from multiple viewpoints, as stated above, the multi-view images can be efficiently transmitted or stored. That is, the number of the viewpoints for the image signals to be encoded can be drastically reduced, thereby allowing the encoding efficiency or reproducing quality to be enhanced.

Further, by making the data structure of the aforementioned encoded bit sequence have a structure in which only the image signal at the base viewpoint can be decoded by a conventional decoding apparatus for decoding a single-view image, or a structure in which only multi-view image signals can be decoded by a conventional decoding apparatus for decoding multi-view images, a scalable function can be achieved and the compatibility with the conventional AVC/H.264 in which a single-view, two-dimensional image is to be encoded and with the MVC in which only multi-view image signals are to be encoded, can be maintained.

Furthermore, not only an encoded bit sequence in which multi-view image signals and multi-view depth signals are the same as each other in number and correspond to each other one-to-one, but also an encoded bit sequence in which both the above signals are different from each other in the number of viewpoints and do not correspond to each other one-to-one, can be generated.

Embodiment 2

Figure 21:
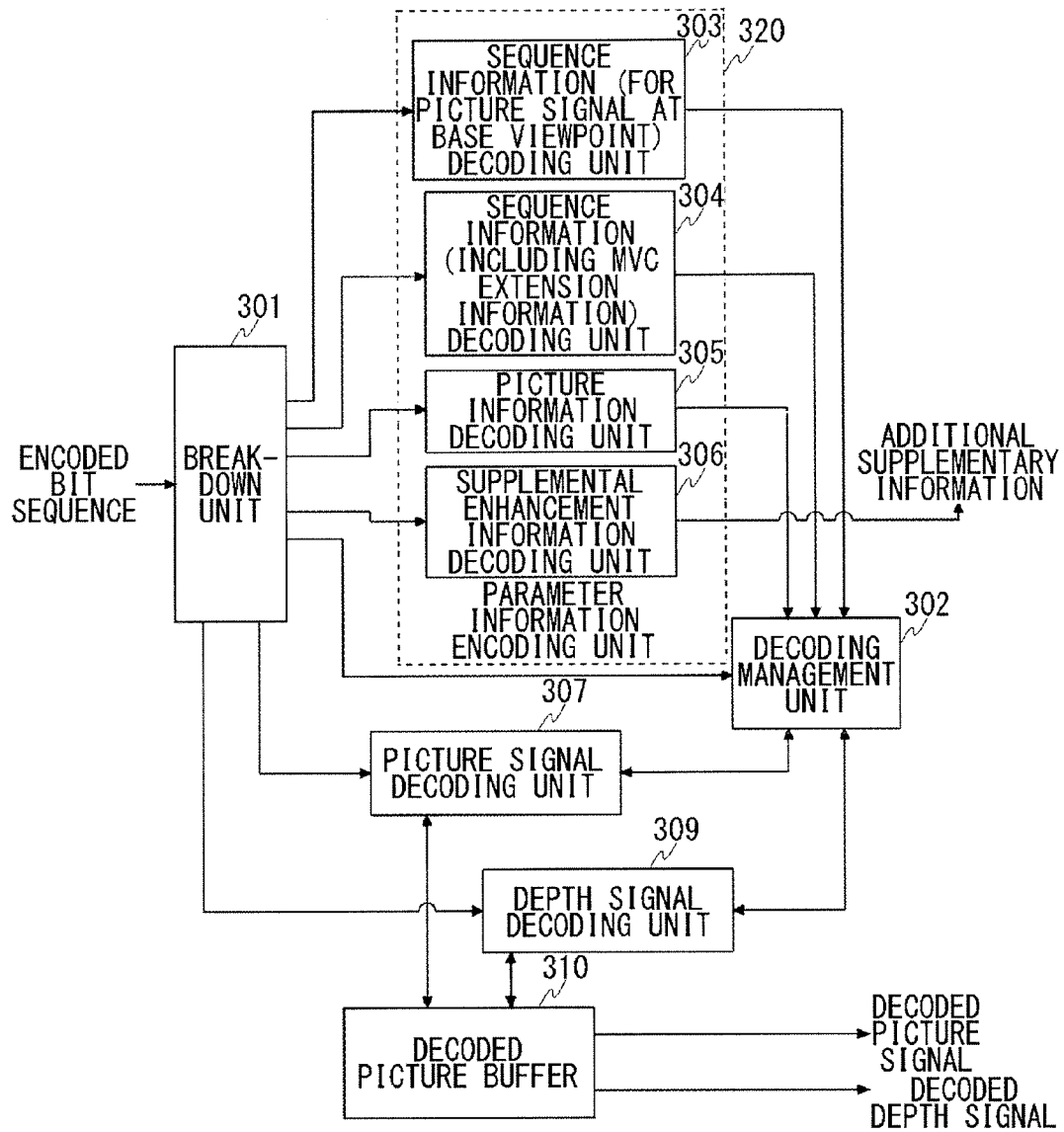
FIG. 21 is a block diagram illustrating the configuration of an image decoding apparatus according to Embodiment 2 of the present invention.

Subsequently, an image decoding apparatus 300 for decoding the encoded data encoded by one of the image encoding apparatuses 100 and 100a according to Embodiment 1, will be described. FIG. 21 is a block diagram illustrating the configuration of the image decoding apparatus 300 according to Embodiment 2 of the present invention. The image decoding apparatus 300 according to Embodiment 2 comprises a breakdown unit 301, a decoding management unit 302, a parameter information decoding unit 320, an image signal decoding unit 307, a depth information decoding unit (more specifically, a depth signal decoding unit 309), and a decoded image buffer 310. The parameter information decoding unit 320 includes a sequence information (for the image signal at the base viewpoint) decoding unit 303, a sequence information (including the MVC extension information) decoding unit 304, a picture information decoding unit 305, and a supplemental enhancement information decoding unit 306.

The breakdown unit 301 breaks down an encoded stream including: image encoded data in which a plurality of images from multiple viewpoints different from each other have been encoded; depth information encoded data in which depth information indicating the depth of a specific space from at least one viewpoint has been encoded; and parameter information encoded data in which parameter information including viewpoint information for specifying the multiple viewpoints that are bases of the plurality of images and the depth information, have been encoded. The above encoded stream includes the encoded stream generated by one of the image encoding apparatuses 100 and 100a according to Embodiment 1. The number of the depth information encoded data included in the encoded stream may be set to be smaller than that of the image encoded data.

The image signal decoding unit 307 restores the plurality of images by decoding the image encoded data broken down by the breakdown unit 301. When one viewpoint to be a basis is set among the aforementioned multiple viewpoints, the image signal decoding unit 307 restores an image from the viewpoint to be a basis by decoding first image encoded data in which the image has been encoded, and restores an image other than the picture from the viewpoint to be a basis by decoding second picture encoded data in which the picture has been encoded, among the plurality of images.

The aforementioned depth information decoding unit restores depth information by decoding the depth information encoded data broken down by the breakdown unit 301. Herein, the depth information encoded data may be the data in which depth information represented by a monochrome image from a certain viewpoint has been encoded. In this case, the depth information decoding unit restores the monochrome image by decoding the depth information encoded data.

The parameter information decoding unit 320 restores parameter information by decoding the parameter information encoded data broken down by the breakdown unit 301. When one viewpoint to be a basis is set among the aforementioned multiple viewpoints, the parameter information decoding unit 320 restores first parameter information of an image from the viewpoint to be a basis by decoding first parameter information encoded data in which the first parameter information has been encoded among the plurality of images. The parameter information decoding unit 320 also restores second parameter information of an image other than the image from the viewpoint to be a basis by decoding second parameter information encoded data in which the second parameter information thereof has been encoded among the plurality of images. The parameter information decoding unit 320 also restores third parameter information of the aforementioned depth information by decoding third parameter information encoded data in which the third parameter information has been encoded.

The third parameter information may be written in a syntax structure corresponding to that of the second parameter information. For example, the second and third parameter information may be written in accordance with the Multi-view High Profile of the AVC/H.264. In the second and third parameter information, viewpoint-identification information may be written. When the position of a viewpoint to be a basis of the image encoded as the aforementioned image encoded data and that of a viewpoint to be a basis of the depth information encoded as the aforementioned depth information encoded data are equal to each other, common identification information may be provided to these viewpoints.

Figure 22:
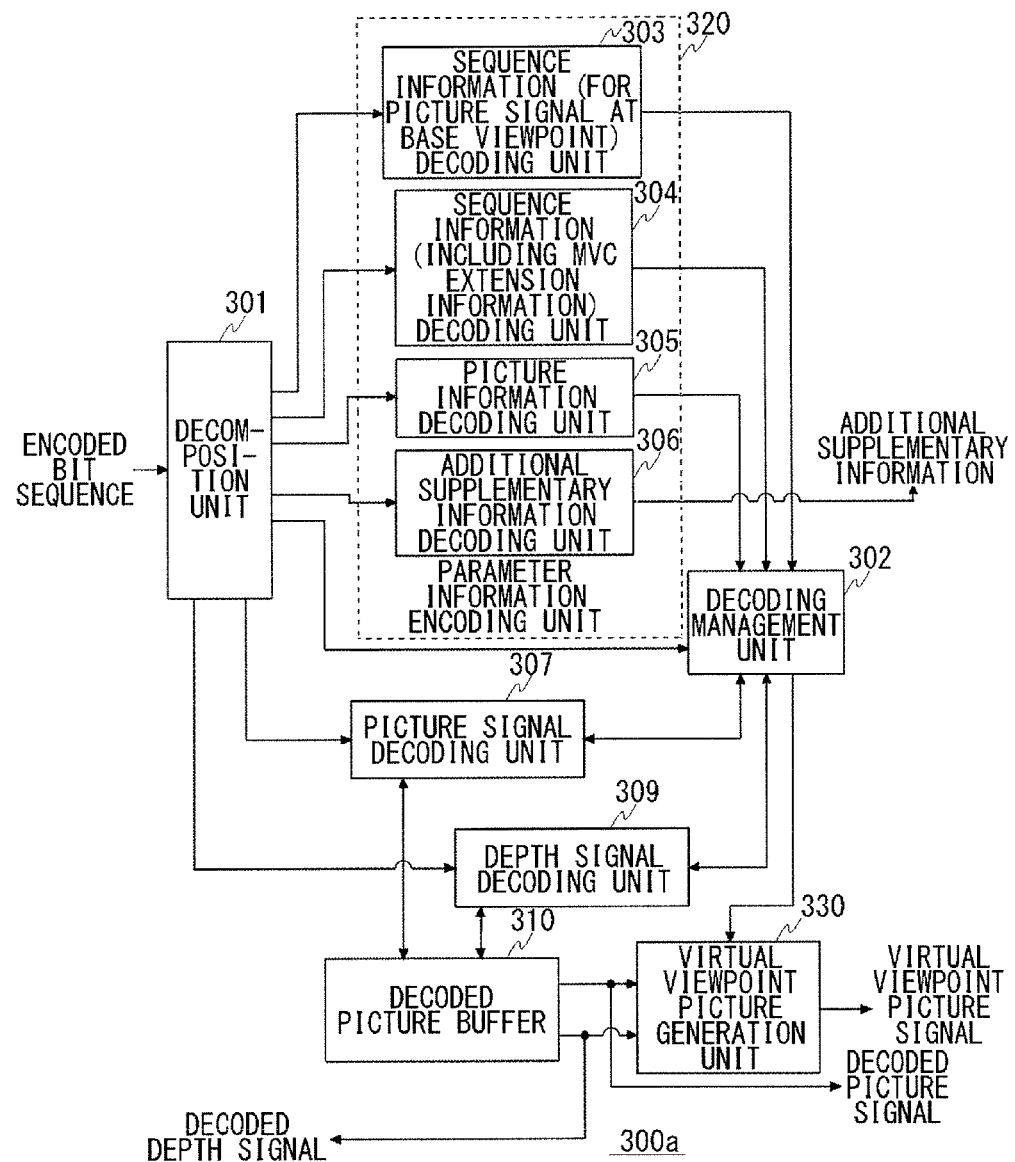
FIG. 22 is a block diagram illustrating the configuration of an image decoding apparatus according to a variation of Embodiment 2.

FIG. 22 is a block diagram illustrating the configuration of an image decoding apparatus 300a according to a variation of Embodiment 2. The image decoding apparatus 300a according to the variation of Embodiment 2 has a configuration in which a virtual viewpoint image generation unit 330 is added to the image decoding apparatus 300 illustrated in FIG. 21.

In the variation, the virtual viewpoint image generation unit 330 generates, based on the images decoded by the image signal decoding unit 307 and the depth information decoded by the depth information decoding unit, an image from another viewpoint different from the viewpoints to be bases of the aforementioned images. More specifically, the virtual viewpoint generation unit 330 generates an image from a virtual viewpoint based on the image decoded by the image signal decoding unit 307, the depth information decoded by the depth information decoding unit, and the parameter information decoded by the parameter information decoding unit 320, such as a camera parameter.

The virtual viewpoint image unit 330 can achieve the generation of an image from the virtual viewpoint by using an existing algorithm. The virtual viewpoint is designated by the virtual viewpoint image generation unit 330 in accordance with a direction from an application or an operation of a user. Other processing are the same as those in the description of the image decoding apparatus 300 according to the basic example of Embodiment 2, and hence the description thereof will be omitted.

Hereinafter, the configuration of each of the image decoding apparatuses 300 and 300a according to Embodiment 2 will be described more specifically. The breakdown unit 301 acquires an encoded bit sequence generated by one of the image encoding apparatuses 100 and 100a according to Embodiment 1. The encoded bit sequence may be acquired by being received through a network, by being read from a storage medium on which it is recorded, such as a DVD, or by being received via BS/terrestrial broadcasting.

The breakdown unit 301 separates the supplied encoded bit sequence into units of NAL unit. In this case, a non-illustrated packet breakdown unit removes a packet header according to the MPEG-2 System, MP4 File Format, RTP, or the like, if necessary. The breakdown unit 301 decodes the NAL unit header that is a header of a separated NAL unit to supply the information of the decoded NAL unit header to the decoding management unit 302. The information of these NAL unit headers are managed by the decoding management unit 302.

When the value of the "nal_unit_type", which is an identifier for identifying the type of an NAL unit included in the NAL unit header, is "7", that is, when the NAL unit is an encoded bit sequence in which the parameter information associated with the encoding of the whole sequence of the image signal at the base viewpoint has been encoded, the breakdown unit 301 supplies the encoded bit sequence of the RBSP of the NAL unit to the sequence information (for the image signal at the base viewpoint) decoding unit 303.

When the value of the "nal_unit_type" is "15", that is, when the NAL unit is an encoded bit sequence in which the parameter information (including the MVC extension information) associated with the encoding of the whole sequence is encoded, the breakdown unit 301 supplies the encoded bit sequence of the RBSP of the NAL unit to the sequence information (including the MVC extension information) decoding unit 304.

When the value of the "nal_unit_type" is "8", that is, when the NAL unit is an encoded bit sequence in which the parameter information, etc., associated with the encoding of a picture have been encoded, the breakdown unit 301 supplies the encoded bit sequence of the RBSP of the NAL unit to the picture information decoding unit 305.

When the value of the "nal_unit_type" is "6", that is, when the NAL unit is an encoded bit sequence in which the supplemental enhancement information has been encoded, the breakdown unit 301 supplies the encoded bit sequence of the RBSP of the NAL unit to the supplemental enhancement information decoding unit 306.

When the value of the "nal_unit_type" is "1" or "5", that is, when the NAL unit is an encoded bit sequence in which the encoding mode, motion vector or disparity vector, and encoded residual signal, etc., of the image signal at the base viewpoint have been encoded, the breakdown unit 301 supplies the encoded bit sequence of the RBSP of the NAL unit to the image signal decoding unit 307.

When the value of the "nal_unit_type" is "20", that is, when the NAL unit is an encoded bit sequence in which the encoding mode, motion vector or disparity vector, and encoded residual signal, etc., of an image signal at a non-base viewpoint have been encoded, the breakdown unit 301 supplies the encoded bit sequence of the RBSP of the NAL unit to the image signal decoding unit 307.

When the value of the "nal_unit_type" is "21", that is, when the NAL unit is an encoded bit sequence in which the encoding mode, motion vector or disparity vector, and encoded residual signal, etc., of a depth signal have been encoded, the breakdown unit 301 supplies the encoded bit sequence of the RBSP of the NAL unit to the depth signal decoding unit 309.

When the value of the "nal_unit_type" is "14", that is, when the NAL unit is a prefix NAL unit in which the viewpoint information, etc., of the following NAL unit have been encoded, the encoded bit sequence of the RBSP of the NAL unit is empty.

When the value of the "nal_unit_type" is "14", "20", or "21", the breakdown unit 301 also decodes the "nal_unit_header_svc_mvc_extension", which is the viewpoint information included in the NAL unit header, to supply the decoded viewpoint information to the decoding management unit 302. Herein, the decoded viewpoint information includes a viewpoint ID, etc. The viewpoint information included in the NAL unit header in which the value of the "nal_unit_type" is "14" is made to be the viewpoint information of the following NAL unit. Whereas, the viewpoint information included in the NAL unit header in which the value of the "nal_unit_type" is "20" or "21" is made to be the viewpoint information of the NAL unit. These viewpoint information are managed by the decoding management unit 302.

The sequence information (for the image signal at the base viewpoint) decoding unit 303 decodes the encoded bit sequence in which the parameter information associated with the encoding of the whole sequence of the image signal at the base viewpoint, the encoded bit sequence being supplied from the breakdown unit 301. The supplied encoded bit sequence corresponds to the RBSP of the SPS#A in the encoded bit sequence illustrated in FIG. 11. Herein, the supplied encode bit sequence of the RBSP is the "seq_parameter_set_rbsp" illustrated in FIG. 13. The sequence information (for the image signal at the base viewpoint) decoding unit 303 decodes the encoded bit sequence in accordance with the syntax structure of the "seq_parameter_set_rbsp" illustrated in FIG. 13, to obtain the parameter information associated with the encoding of the whole sequence of the image signal at the base viewpoint. The sequence information (for the image signal at the base viewpoint) decoding unit 303 supplies the sequence information of the decoded image signal at the base viewpoint to the decoding management unit 302. The sequence information of the image signal at the base viewpoint is managed by the decoding management unit 302.

The sequence information (including the MVC extension information) decoding unit 304 decodes the encoded bit sequence in which the parameter information (including the MVC extension information) associated with the encoding of the whole sequence, i.e., the sequence information of either an image signal at a non-base viewpoint or a depth information has been encoded, the encoded bit sequence being supplied from the breakdown unit 301. The supplied encoded bit sequence corresponds to the RBSP of each of the SPS#B and SPS#C in the encoded bit sequence illustrated in FIG. 11. Herein, the supplied encoded bit sequence of the RBSP is the "subset_seq_parameter_set_rbsp" illustrated in FIG. 14. The sequence information (including the MVC extension information) decoding unit 304 decodes the encoded bit sequence in accordance with the syntax structure of the "subset_seq_parameter_set_rbsp" illustrated in FIG. 14 to obtain the parameter information associated with the encoding of the whole sequence of an image signal at a non-base viewpoint or the parameter information associated with the encoding of the whole sequence of a depth signal.

It can be determined by referring to the value of the "profile_idc" which of the sequence information of an image signal at a non-base viewpoint and that of a depth signal has been encoded. When the value of the "profile_idc" is "118", which indicates the Multi-view High Profile of the AVC/H.264, the sequence information of an image signal at a non-base viewpoint has been encoded. When the value of the "profile_idc" is "120", which indicates a profile by which multi-view depth signals can also be decoded, the sequence information of a depth signal has been encoded. The MVC extension information is included in the "subset_seq_parameter_set_rbsp" and the sequence information decoded in the sequence information (including the MVC extension information) decoding unit 304 also includes the MVC extension information. The sequence information (including the MVC extension information) decoding unit 304 supplies the decoded sequence information of an image signal at a non-base viewpoint or that of a depth signal to the decoding management unit 302. These sequence information are managed by the decoding management unit 302.

The picture information decoding unit 305 decodes the encoded bit sequence in which the parameter information associated with the encoding the whole picture, the encoded bit stream being supplied from the breakdown unit 301. This supplied encoded bit sequence corresponds to the RBSP of each of the PPS#A, PPS#B, and PPS#C in the encode bit sequence illustrated in FIG. 11. Herein, the supplied encoded bit sequence of the RBSP is the "pic_parameter_set_rbsp" illustrated in FIG. 15. The picture information decoding unit 305 decodes the encoded bit sequence in accordance with the syntax structure of the "pic_parameter_set_rbsp" illustrated in FIG. 15, to obtain the parameter information associated with the encoding of the whole picture of the image signal at the base viewpoint, an image signal at a non-base viewpoint, or a depth signal. The picture information decoding unit 305 supplies the decoded picture information to the decoding management unit 302. The picture information is managed by the decoding management unit 302.

The supplemental enhancement information decoding unit 306 outputs supplemental enhancement information by decoding the encoded bit sequence in which the supplemental enhancement information has been encoded, the encoded bit sequence being supplied from the breakdown unit 301. When camera parameter information is included in the supplied encoded bit sequence, the camera parameter information can be used in generating or displaying an image signal at a virtual viewpoint after decoded.

The image signal decoding unit 307 decodes an encoded bit sequence in which the slice header and an encoding mode, motion vector, and encoded residual signal, etc., of a slice, of the image signal at the base viewpoint, have been encoded, the encoded bit sequence being supplied from the breakdown unit 301. The supplied encoded bit sequence corresponds to the RBSP of each of the slices #A00 and #A01 in the encoded bit sequence illustrated in FIG. 11. Herein, the supplied encoded bit sequence of the RBSP is the "slice_layer_without_partitioning_rbsp" illustrated in FIG. 17.

The image signal decoding unit 307 decodes the encoded bit sequence in accordance with the syntax structure of the "slice_layer_without_partitioning_rbsp" illustrated in FIG. 17. The image signal decoding unit 307 first obtains the information associated with a slice by decoding the "slice_header" included in the "slice_layer_without_partitioning_rbsp". The image signal decoding unit 307 supplies the information associated with the decoded slice to the decoding management unit 302.

As stated above, the "slice_header" included in the "slice_layer_without_partitioning_rbsp" includes the number of the "pic_parameter_set_id" for specifying the PPS to be referred to; and the value of the "pic_parameter_set_id" of the PPS#A, which is to be referred to by the slices #A00 and #A01 illustrated in FIG. 11, is set in the "pic_parameter_set_id" of each of the slices #A00 and #A01. In addition, because the value of the "seq_parameter_set_id" of the SPS#A, which is to be referred to by the PPS#A, is set in the "seq_parameter_set_id" of the PPS#A, it can clearly specified that the sequence information to be referred to by the slices #A00 and #A01 is the SPS#A. These management is performed by the decoding management unit 302.

The image signal decoding unit 307 decodes the "slice_data" included in the "slice_layer_without_partitioning_rbsp" by using the information associated with the slice decoded from the "slice_header" of each of the slices #A00 and #A01, and also by using the sequence information decoded from the SPS#A and the picture information decoded from the PPS#A, which are to be referred to by the slices #A00 and #A01, both the sequence information and picture information being supplied from the decoding management unit 302, to obtain the decoded image signal at the base viewpoint.

The decoded image signal at the base viewpoint is stored in the decoded image buffer 310. When an encoded bit sequence of the image signal at the base viewpoint is decoded, the inter prediction, such as the motion-compensated prediction, is sometimes used, and in the case, the decoded image signal at the base viewpoint, which has been already decoded and stored in the decoded image buffer 310, is used as a reference image. Although viewpoint information is not included in the NAL unit header of the slice NAL unit of at the base viewpoint, the viewpoint information of the NAL unit header of the prefix NAL unit, which is encoded before the slice NAL unit of at the base viewpoint, is made to be the viewpoint information of the slice NAL unit at the base viewpoint.

Further, the image signal decoding unit 307 decodes an encoded bit sequence in which the slice header and an encoding mode, motion vector or disparity vector, and encoded residual signal, etc., of a slice, of an image signal at a non-base viewpoint, have been encoded, the encoded bit sequence being supplied from the breakdown unit 301. The supplied encoded bit sequence corresponds to the RBSP of each of the slices #B20, #B10, #B40, #B30, #B21, #B11, #B41, and #B31 in the encoded bit sequence illustrated in FIG. 11.

Herein, the supplied encoded bit sequence of the RBSP is the "slice_layer_in_scalable_extension_rbsp" illustrated in FIG. 18. The image signal decoding unit 307 decodes the encoded bit sequence in accordance with the syntax structure of the "slice_layer_in_scalable_extension_rbsp" illustrated in FIG. 18. The image signal decoding unit 307 first obtains the information associated with a slice by decoding the "slice_header" included in the "slice_layer_in_scalable_extension_rbsp". The image signal decoding unit 307 supplies the information associated with the decoded slice to the decoding management unit 302.

As stated above, the "slice_header" included in the "slice_layer_in_scalable_extension_rbsp" includes the number of the "pic_parameter_set_id" for specifying the PPS to be referred to; and the value of the "pic_parameter_set_id" of the PPS#B, which is to be referred to by the slices #B20, #B10, #B40, #B30, #B21, #B11, #B41, and #B31 illustrated in FIG. 11, is set in the "pic_parameter_set_id" of each of the slices #B20, #B10, #B40, #B30, #B21, #B11, #B41, and #B31.

In addition, because the value of the "seq_parameter_set_id" of the SPS#B, which is to be referred to by the PPS#B, is set in the "seq_parameter_set_id" of the PPS#B, it can be clearly specified that the sequence information to be referred to by the slices #B20, #B10, #B40, #B30, #B21, #B11, #B41, and #B31 is the SPS#B. These management is performed by the decoding management unit 302.

The image signal decoding unit 307 obtains a decoded image signal at a non-base viewpoint by decoding the "slice_data" included in the "slice_layer_in_scalable_extension_rbsp" by using: (a) the information associated with a slice decoded from the "slice_header" of each of the slices #B20, #B10, #B40, #B30, #B21, #B11, #B41, and #B31; (b) the viewpoint information decoded from the "nal_unit_header_svc_mvc_extension" included in the NAL unit header of each of the slices #B20, #B10, #B40, #B30, #B21, #B11, #B41, and #B31, the viewpoint information being supplied from the decoding management unit 302; (c) the sequence information decoded from the SPS#B to be referred to by the slices #B20, #B10, #B40, #B30, #B21, #B11, #B41, and #B31; and (d) the picture information decoded from the PPS#B to be referred to by the slices #B20, #B10, #B40, #B30, #B21, #B11, #B41, and #B31.

The decoded image signal at a non-base viewpoint is stored in the decoded image buffer 310. When an encoded bit sequence of an image signal at a non-base viewpoint is decoded, the inter prediction, such as the inter-view prediction and motion-compensated prediction, is sometimes used, and in the case, the image signal at the base viewpoint or an image signal at a non-base viewpoint, which has been already decoded and stored in the decoded image buffer 310, is used as a reference image.

The depth signal decoding unit 309 decodes an encoded bit sequence in which the slice header and an encoding mode, motion vector or disparity vector, and encoded residual signal, etc., of a slice, of a depth signal, have been encoded, the encoded bit sequence being supplied from the breakdown unit 301. The supplied encoded bit sequence corresponds to the RBSP of each of the slices #C00, #C20, #C40, #C01, #C21, and #C41 in the encoded bit sequence illustrated in FIG. 11.

Herein, the supplied encoded bit sequence of the RBSP is the "slice_layer_in_scalable_extension_rbsp" illustrated in FIG. 18. The depth signal decoding unit 309 decodes the encoded bit sequence in accordance with the syntax structure of the "slice_layer_in_scalable_extension_rbsp" illustrated in FIG. 18. The depth signal decoding unit 309 first obtains the information associated with a slice by decoding the "slice_header" included in the "slice_layer_in_scalable_extension_rbsp". The depth signal decoding unit 309 supplies the decoded information associated with the slice to the decoding management unit 302.

As stated above, the "slice_header" included in the "slice_layer_in_scalable_extension_rbsp" includes the number of the "pic_parameter_set_id" for specifying the PPS to be referred to; and the value of the "pic_parameter_set_id" of the PPS#C, which is to be referred to by the slices #C00, #C20, #C40, #C01, #C21, and #C41 illustrated in FIG. 11, is set in the "pic_parameter_set_id" of each of the slices #C00, #C20, #C40, #C01, #C21, and #C41#. In addition, because the value of the "seq_parameter_set_id" of the SPS#C, which is referred to by the PPS#C, is set in the "seq_parameter_set_id" of the PPS#C, it can be clearly specified that the sequence information to be referred to by the slices #C00, #C20, #C40, #C01, #C21, and #C41 is the SPS#C. These management is performed by the decoding management unit 302.

The depth signal decoding unit 309 obtains a decoded depth signal by decoding the "slice_data" included in the "slice_layer_in_scalable_extension_rbsp" by using: (a) the information associated with the slices decoded from the "slice_header" of each of the slices #C00, #C20, #C40, #C01, #C21, and #C41; (b) the viewpoint information decoded from the "nal_unit_header_svc_mvc_extension" included in the NAL unit header of each of the slices #C00, #C20, #C40, #C01, #C21, and #C41, the viewpoint information being supplied from the decoding management unit 302; (c) the sequence information decoded from the SPS#C to be referred to by the slices #C00, #C20, #C40, #C01, #C21, and #C41; and (d) the picture information decoded from the PPS#C to be referred to by the slices #C00, #C20, #C40, #C01, #C21, and #C41.

The decoded depth signal is stored in the decoded image buffer 310. When an encoded bit sequence of a depth signal is decoded, the inter prediction, such as the inter-view prediction and motion-compensated prediction, is sometimes used, and in the case, a decoded depth signal, which has been already decoded and stored in the decoded image buffer 310, is used as a reference image. A depth signal can be decoded in the same way as an image signal in a monochrome format.

The decoding management unit 302 manages the output timing of each of a decoded image signal and a decoded depth signal that are stored in the decoded image buffer 310 and synchronizes a decoded image signal and a decoded depth signal at each viewpoint, which are at the same time, with each other to output them from the decoded image buffer 310. In this case, the decoding management unit 302 outputs the decoded image signal and decoded depth signal at each viewpoint by associating each of them with a viewpoint ID, which is the information for specifying the viewpoint thereof.

The decoded image signal at each viewpoint outputted from one of the image decoding apparatuses 300 and 300*a* may be displayed on a display device, etc. When a desired viewpoint is not outputted, an image signal at a virtual viewpoint is generated from an decoded image signal, an decoded depth signal, and supplemental enhancement information, such as a camera parameter, which have been outputted from one of the image decoding apparatus 300 and 300*a*, so that the obtained image signal at a virtual viewpoint is displayed on a display device, etc. In the image decoding apparatus 300*a* according to the variation, the image signal at the virtual viewpoint may be generated by the virtual viewpoint image generation unit 330.

Figure 23:
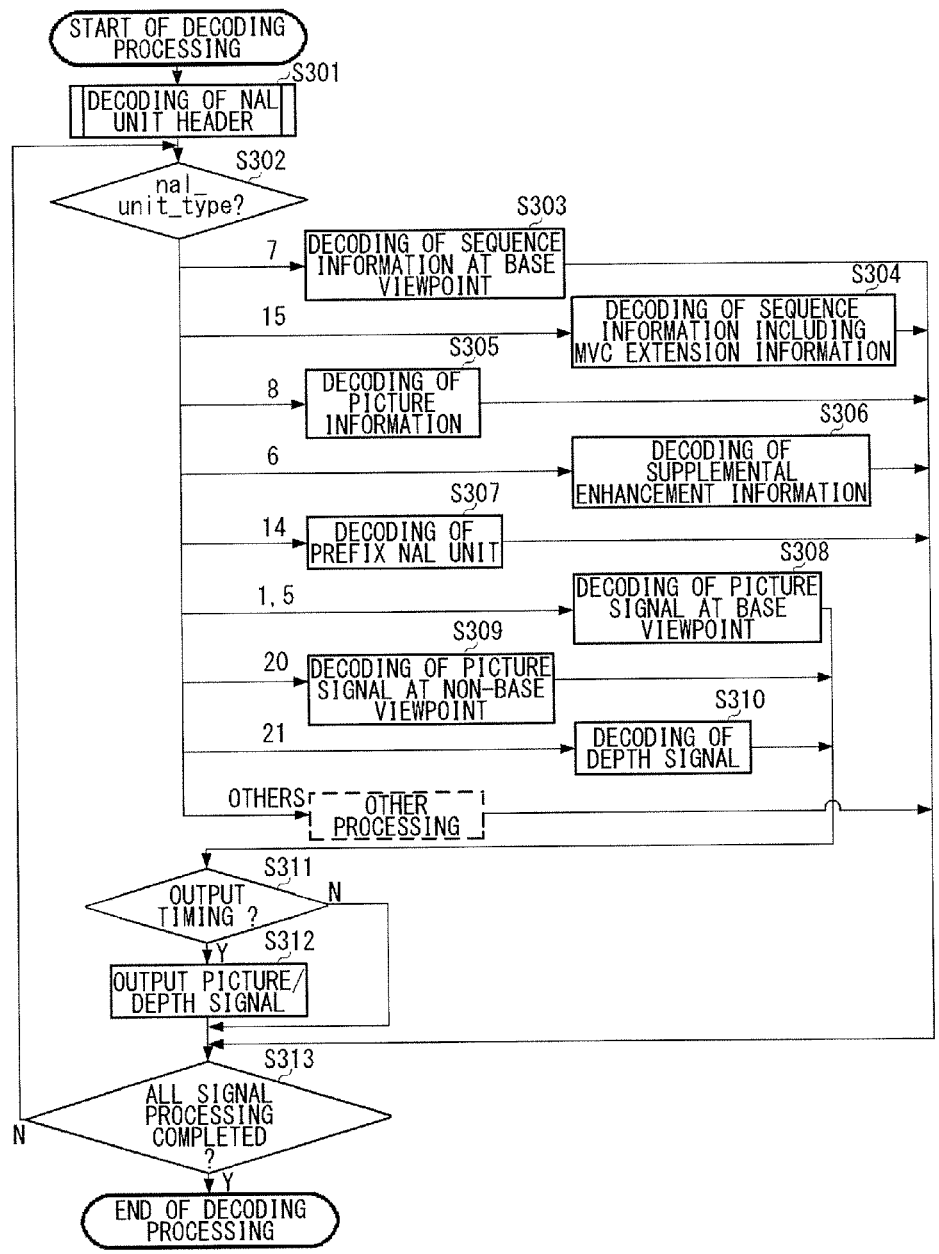
FIG. 23 is a flowchart illustrating a processing procedure for decoding multi-view images by the image decoding apparatus according to Embodiment 2.

Subsequently, a processing procedure for decoding multi-view images by one of the image decoding apparatuses 300 and 300*a* according to Embodiment 2, which are respectively illustrated in FIGS. 21 and 22, will be described. FIG. 23 is a flowchart illustrating a processing procedure for decoding multi-view images by one of the image decoding apparatuses 300 and 300*a* according to Embodiment 2. In the flowchart in FIG. 23, the breakdown unit 301 separates the obtained encoded bit sequence into units of NAL unit, and decodes the NAL unit header (S301). In this Step S301, a processing procedure for receiving the encoded bit sequence through a network and for separating into units of NAL unit will be described more specifically.

Figure 24:
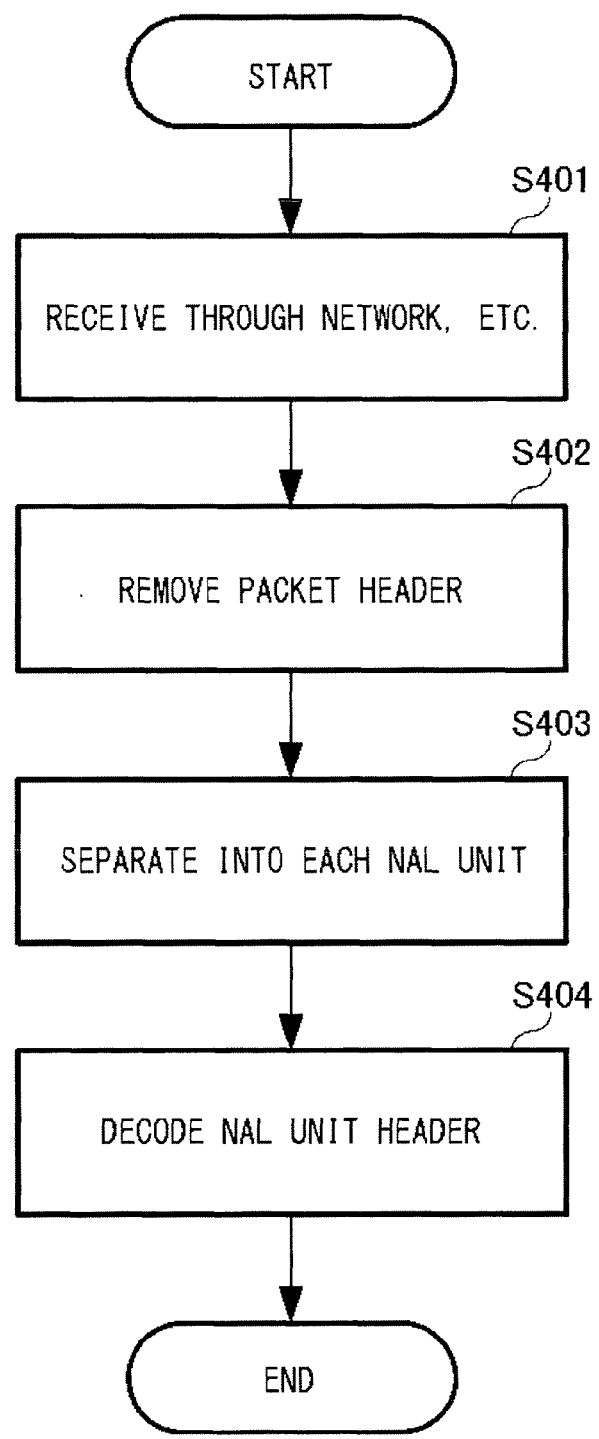
FIG. 24 is a flowchart illustrating a processing procedure for receiving an encoded bit sequence through a network and for separating into units of NAL unit.

FIG. 24 is a flowchart illustrating a processing procedure for receiving an encoded bit sequence through a network and for separating into units of NAL unit. In the flowchart in FIG. 24, a non-illustrated receiving unit receives an encoded bit sequence through a network (S401). Subsequently, a non-illustrated packet breakdown unit obtains the aforementioned encoded bit sequence by removing a packet header that has been added thereto based on the standards used in the received encoded bit sequence, such as MPEG-2 System, MP4 File Format, or RTP (S402). Subsequently, the breakdown unit 301 separates the encoded bit sequence into units of NAL unit (S402). The breakdown unit 301 then decodes the NAL unit header (S403).

When the value of the "nal_unit_type" is "14", "20", or "21", the breakdown unit 301 also decodes the "nal_unit_header_svc_mvc_extension", which is the viewpoint information included in the NAL unit header. Herein, the decoded viewpoint information includes a viewpoint ID, etc. The viewpoint information included in the NAL unit header in which the value of the "nal_unit_type" is "14" is made to be the viewpoint information of the following NAL unit, whereas the viewpoint information included in the NAL unit header in which the value of the "nal_unit_type" is "20" or "21" is made to be the viewpoint information of the NAL unit.

Referring back to the flowchart in FIG. 23, the breakdown unit 301 evaluates the "nal_unit_type", which is an identifier for identifying the type of the NAL unit included in the NAL unit header, which is a header of an NAL unit separated in the processing of Step S301 (S302). (a) When the value of the "nal_unit_type" is "7", that is, when the NAL unit is an encoded bit sequence in which the parameter information associated with the encoding of the whole sequence of the image signal at the base viewpoint has been encoded (S302/ 7), the processing proceeds to Step S303. (b) When the value of the "nal_unit_type" is "15", that is, when the NAL unit is an encoded bit sequence in which the parameter information (including the MVC extension information) associated with the encoding of the whole sequence, i.e., the sequence information of either an image signal at a non-base viewpoint or a depth information has been encoded (S302/15), the processing proceeds to Step S304. (c) When the value of the "nal_unit_type" is "8", that is, when the NAL unit is an encoded bit sequence in which the parameter information associated with the encoding of the whole picture of the image signal at the base viewpoint, an image signal at a non-base viewpoint, or a depth signal, has been encoded (S302/8), the processing proceeds to Step S305. (d) When the value of the "nal_unit_type" is "6", that is, when the NAL unit is an encoded bit sequence in which the supplemental enhancement information has been encoded (S302/6), the processing proceeds to Step S306. (e) When the value of the "nal_unit_type" is "14", that is, when the NAL is a prefix NAL unit (S302/14), the processing proceeds to Step S307. (f) When the value of the "nal_unit_type" is "1" or "5", that is, when the NAL unit is an encoded bit sequence in which a slice of the image signal at the base viewpoint has been encoded (S302/1 or 5), the processing proceeds to Step S308. (g) When the value of the "nal_unit_type" is "20", that is, when the NAL unit is an encoded bit sequence in which a slice of an image signal at a non-base viewpoint has been encoded (S302/20), the processing proceeds to Step S309. (h) When the value of the nal_unit_type" is "21", that is, when the NAL unit is an encoded bit sequence in which a slice of a depth signal has been encoded (S302/21), the processing proceeds to Step S310. (i) Although the "nal_unit_type" sometimes takes a value other than the aforementioned values (S302/ others), the description thereof will be omitted in the present specification.

The sequence information (for the image signal at the base viewpoint) decoding unit 303 obtains the parameter information associated with the encoding of the whole sequence of the image signal at the base viewpoint by decoding an encoded bit sequence in which the parameter information associated with the encoding of the whole sequence thereof (S303).

The sequence information (including the MVC extension information) decoding unit 304 obtains the parameter information associated with the encoding of the whole sequence of either an image signal at a non-base viewpoint or a depth signal by decoding an encoded bit sequence in which the parameter information, which includes the MVC extension information, associated with the encoding of the whole sequence, i.e., the sequence information of either an image signal at a non-base viewpoint or a depth signal has been encoded (S304).

The picture information decoding unit 305 obtains the parameter information associated with the encoding of the whole picture of the image signal at the base viewpoint, an image signal at a non-base viewpoint, or a depth signal by decoding an encoded bit sequence in which the parameter information associated with the encoding of the whole picture has been encoded (S305).

The supplemental enhancement information decoding unit 306 obtains the supplemental enhancement information by decoding an encoded bit sequence in which the supplemental enhancement information has been encoded (S306).

The breakdown unit 301 decodes the RBSP of a prefix NAL unit (S307). However, because the RBSP of a prefix NAL unit is empty in the MVC, decoding processing is not factually performed.

The image signal decoding unit 307 obtains a slice of the image signal at the base viewpoint by decoding an encoded bit sequence in which the slice header and an encoding mode, motion vector, and encoded residual signal, etc., of a slice, of an image signal at a non-base viewpoint, have been encoded (S308).

The image signal decoding unit 307 obtains a slice of an image signal at a non-base viewpoint by decoding an encoded bit sequence in which the slice header and an encoding mode, motion vector, and encoded residual signal, etc., of a slice, of an image signal at a non-base viewpoint, have been encoded (S309).

The depth signal decoding unit 309 obtains a slice of a depth signal by decoding an encoded bit sequence in which the slice header and an encoding mode, motion vector, and encoded residual signal, etc., of a slice, of a depth signal, have been encoded (S310).

The decoding management unit 302 determines whether it is the timing when the decoded image signal and depth signal are outputted (S311). When it is not the timing when they are outputted (S311/N), the processing proceeds to Step S313, whereas it is the timing when they are outputted (S311/Y), the decoding management unit 302 outputs the decoded image signal and depth signal (S312), the processing proceeding to Step S313. In this case, the decoding management unit 302 outputs the decoded image signal and decoded depth signal at each viewpoint by associating each of them with a viewpoint ID, which is the information for specifying the viewpoint thereof.

The decoding management unit 302 determines whether the decoding processing of all the NAL units have been completed (S313). When the decoding processing of all the NAL units have been completed (S313/Y), the present decoding processing is ended, whereas when not completed (S313/N), the processing of Steps S301 to S313 are repeated.

Each of the image decoding apparatuses 300 and 300a according to Embodiment 2 can obtain a single-view image signal by decoding an encoded bit sequence in which the single-view image signal has been encoded according to the existing AVC/H.264. Further, each of the image decoding apparatuses 300 and 300a according to Embodiment 2 can obtain multi-view image signals by decoding an encoded bit sequence in which the multi-view image signals excluding a depth signal have been encoded according to the existing MVC.

The case where the number of viewpoints between multi-view images and multi-view depth maps are different from each other and those do not correspond to each other one-to-one as illustrated in FIG. 10, has been described in the above description; however, it is needless to say that multi-view images and multi-view depth signals, which are the same as each other in number and correspond to each other one-to-one, can be encoded or decoded.

According to Embodiment 2, multi-view image signals and multi-view depth signals can be obtained in decoding the multi-view images by decoding an encoded bit sequence in which both the multi-view image signals including image signals from multiple viewpoints and the multi-view depth signals including, as supplemental information, depth signals from multiple viewpoints, have been encoded, as stated above. In the case, the encoded bit sequence can be efficiently received or read out.

Each of the image decoding apparatuses 300 and 300a according to Embodiment 2 can obtain a single-view image signal by decoding an encoded bit sequence in which only a conventional single-view image signal has been encoded. Further, each of the image decoding apparatuses 300 and 300a according to Embodiment 2 can also obtain multi-view image signals by decoding an encoded bit sequence in which only multi-view image signals that includes image signals at multiple viewpoints and excludes multi-view depth signals as supplemental information have been encoded, and upper compatibility can be maintained.

Furthermore, not only an encoded bit sequence in which multi-view image signals and multi-view depth signals are the same as each other in number and correspond to each other one-to-one, but also an encoded bit sequence in which both the above signals are different from each other in the number of viewpoints and do not correspond to each other one-to-one can be decoded.

Embodiment 3

Subsequently, an image encoding apparatus according to Embodiment 3 of the present invention will be described. The image encoding apparatus according to Embodiment 3 is different from the image encoding apparatus according to Embodiment 1 in that the former image encoding apparatus determines the viewpoints for an image signal and a depth signal that are required to be encoded, in accordance with the contents of a content or a scene, so that only an image signal and a depth signal at required viewpoints in accordance with the above determination are encoded. The functions other than that are the same as those of the latter image encoding apparatus, and accordingly description thereof will be omitted.

Figure 25:
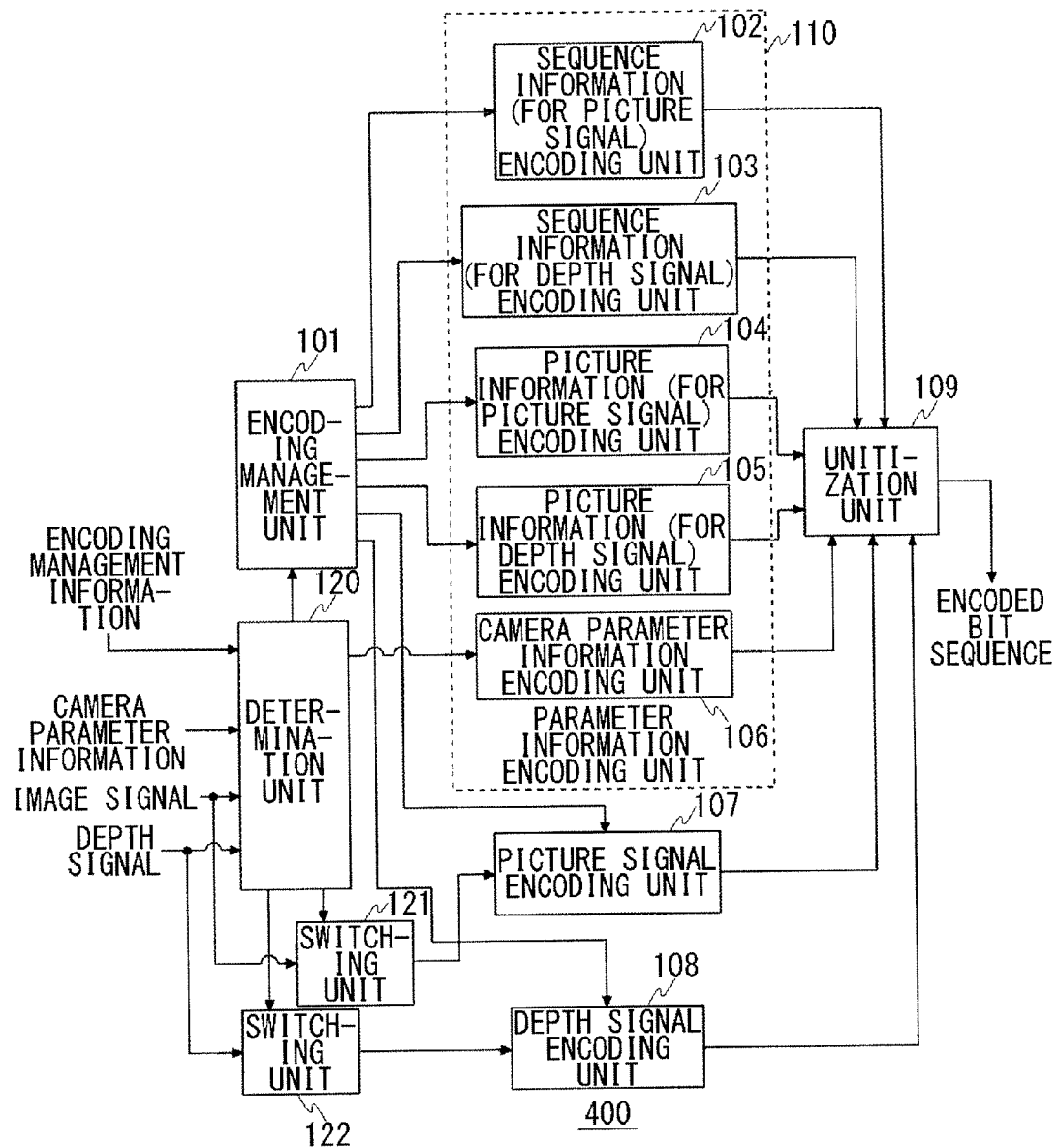
FIG. 25 is a block diagram illustrating the configuration of an image encoding apparatus according to Embodiment 3.

FIG. 25 is a block diagram illustrating the configuration of an image encoding apparatus 400 according to Embodiment 3. In FIG. 25, the same constituent blocks as those in FIG. 2 are denoted with like reference numerals. The image encoding apparatus 400 according to Embodiment 3 has a structure in which a determination unit 120 and switching units 121 and 122 are added to that of the image encoding apparatus 100 according to Embodiment 1.

The determination unit 120 determines whether depth information from a certain viewpoint is made to be encoding object. In this case, the unitization unit 109 generates an encoded stream including both image encoded data generated by the image signal encoding unit 107 and depth information encoded data in which the depth information, which has been determined to be encoding object by the determination unit 120, has been encoded by the depth signal encoding unit 108.

Further, the determination unit 120 determines whether an image from a certain viewpoint is made to be an encoding object. In this case, the unitization unit 109 generates an encoded stream including both the image encoded data in which the image, which has been determined to be an encoding object by the determination unit 120, has been encoded by the image signal encoding unit 107 and the depth information encoded data generated by the depth signal encoding unit 108. The determination unit 120 can also make both the determination. In this case, the unitization unit 109 generates an encoded stream including both the image encode data in which the image, which has been determined to be an encoding object by the determination unit 120, has been encoded by the image signal encoding unit 107 and the depth information encoded data in which the depth information, which has been determined to be encoding object by the determination unit 120, has been encoded by the depth signal encoding unit 108.

Hereinafter, the processing by the determination unit 120 will be described more specifically. The determination unit 120 is supplied with encoding management information, camera parameter information, an image signal at each viewpoint, and a depth signal at each viewpoint. The determination unit 120 determines the viewpoints for an image signal and a depth signal to be encoded based on these information and signals. The determination unit 120 generates new encoding management information in which the information with respect to the viewpoints for an image signal and a depth signal, which have been determined as being not to be encoded, are omitted and supplies it to the encoding management unit 101. The encoding management information to be supplied to the encoding management unit 101 in FIG. 25 is similar to the encoding management information supplied to the encoding management unit 101 in FIG. 1.

Hereinafter, a specific example of the determination method in the determination unit 120 will be described. As a determination example 1, when the distance between a viewpoint that is a basis of the depth information to be determined and a viewpoint that is a basis of another depth information already determined to be encoding object is smaller than a first reference distance, the determination unit 120 determines that the depth information to be determined is not made to be encoding object, whereas when the distance is larger than the first reference distance, the determination unit 120 determines that the depth information to be determined is made to be encoding object. The first reference distance can be arbitrarily set by a designer based on the knowledge acquired from experiments or simulations.

The determination unit 120 can specify the position of the viewpoint for each image signal and that for each depth signal from the external parameter information of a camera, which is included in the supplied camera parameter information. The external parameter information includes the arrangement information of the camera of each viewpoint, the arrangement information including a position in a three-dimensional space (x, y, z coordinates) or rotational degrees (roll, pitch, yaw) around three axes (x, y, z axes). When the interval between the viewpoints for supplied multiple depth signals at the same time is sufficiently small, the determination unit 120 excludes any one of the depth signals from the encoding objects. As stated above, when determining that, even when the encoding of depth signals from part of viewpoints are omitted, the image signal at a desired viewpoint can be easily generated on the decoding side, the determination unit 120 omits the depth signals at the viewpoints not required for the generation of the image signal at the desired viewpoint, and adopts a depth signal at a viewpoint required for the generation thereof as an encoding object. The determination example 1 is based on the knowledge described with reference to FIGS. 6 and 7.

As a determination example 2, when the distance between a first object and a second object within the same image is smaller than a predetermined second reference distance, the determination unit 120 omits part of a plurality of depth signals. The second reference distance can also be arbitrarily set by a designer based on the knowledge acquired from experiments or simulations. In this case, the determination unit 120 may reduce the number of the depth information to be determined as encoding object, as the distance between the first object and the second object is smaller.

The determination unit 120 can calculate the difference between objects overlapping each other from the supplied depth signal. As the difference between the objects, the difference between the pixel values by which an edge of the depth signal (e.g., a position where the density is steeply changed) is sandwiched can be adopted by extracting the edge thereof. When determining that the difference between the depths of the objects overlapping each other is sufficiently small and the image signal at a desired viewpoint can be easily generated on the decoding side even when the encoding of part of the viewpoints is omitted, the determination unit 120 omits the depth signals not required for the generation of the image signal at the desired viewpoint and adopts a depth signal at a viewpoint required for the generation thereof as encoding object. The determination example 2 is based on the knowledge described with reference to FIGS. 8 and 9.

In the aforementioned determination examples 1 and 2, in the case of an application in which it is assumed to generate the image signal at a desired viewpoint on the decoding side, a viewpoint for an image signal can be omitted as well as a viewpoint for a depth signal.

As a determination example 3, when, in the case where an image to be determined is predicted and generated from another image and depth information without the use of the image to be determined, the quality of the generated image is higher than a predetermined reference value, the determination unit 120 determines that the image to be determined is not made to an encoding object. The reference value can be also arbitrarily set by a designer based on the knowledge acquired from experiments or simulations.

The determination unit 120 omits image signals of part of the viewpoints for the supplied image signals and predicts and generates, from the image signals and the depth signals at the remaining viewpoints, the image signals at the omitted viewpoints. The determination unit 120 evaluates, for each pixel, the distortion amount between the original image signal at the omitted viewpoint and the predicted and generated image signal at the viewpoint by using an index, such as a square error. The determination unit 120 determines that the image signal having a distortion amount smaller than a predetermined reference value is a signal having less contribution to the generation of an image signal at a virtual viewpoint, thereby omitting the image signal at the viewpoint. A processing for omitting an image signal has been described above; however, a depth signal can also be omitted by similar processing.

The switching unit 121 supplies only the image signal at a viewpoint to be encoded to the image signal encoding unit 107 in accordance with the determination result by the determination unit 120. The image signal supplied to the image signal encoding unit 107 is similar to the image signal supplied to the image signal encoding unit 107 in FIG. 1. Similarly, the switching unit 122 supplies only the depth signal at a viewpoint to be encoded to the depth signal encoding unit 108 in accordance with the determination result by the determination unit 120. The image signal supplied to the depth signal encoding unit 108 is similar to the depth signal supplied to the depth signal encoding unit 108 in FIG. 1.

Figure 26:
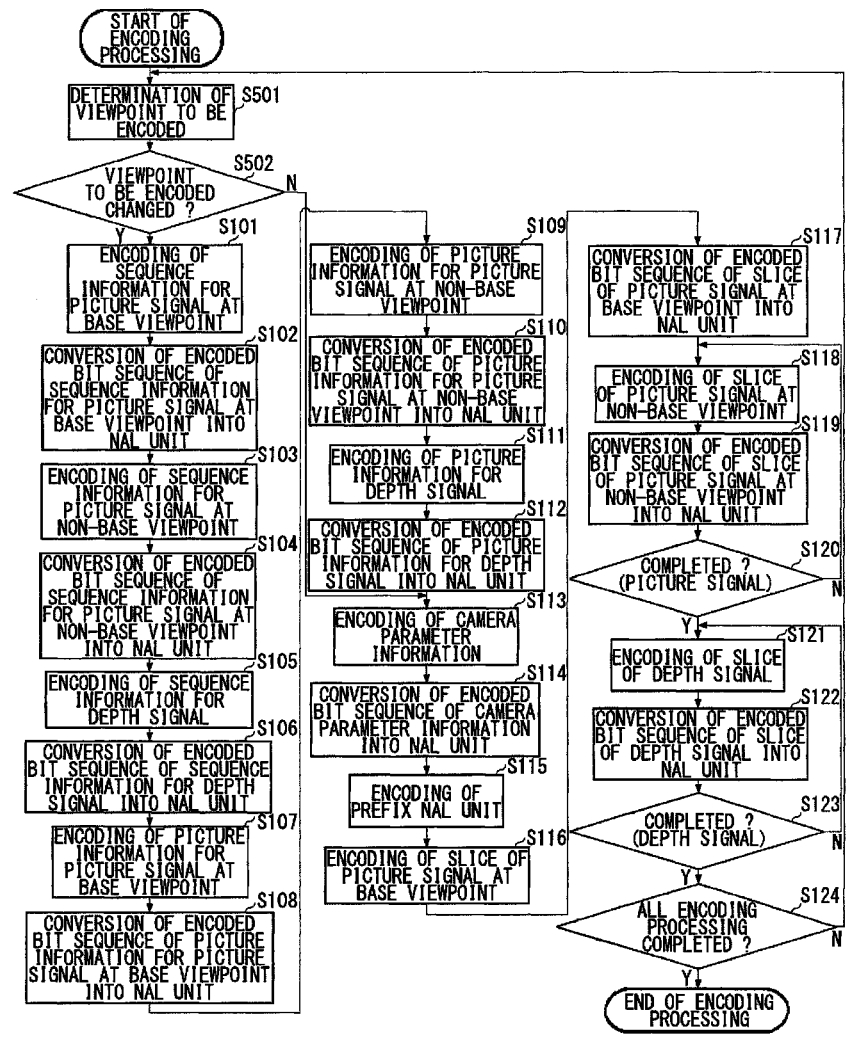
FIG. 26 is a flowchart illustrating a processing procedure for encoding multi-view images by the image encoding apparatus according to Embodiment 3.

Subsequently, a processing procedure for encoding multi-view images by the image encoding apparatus 400 according to Embodiment 3 will be described. FIG. 26 is a flowchart illustrating the processing procedure for encoding multi-view images by the image encoding apparatus 400 according to Embodiment 3. As stated above, the image encoding apparatus 400 according to Embodiment 3 determines viewpoints for an image signal and a depth signal, which are required to be encoded, in accordance with the contents of a content or a scene. The processing procedure for encoding an image according to Embodiment 3, illustrated in FIG. 26, is different from that according to Embodiment 1, illustrated in FIG. 1, in that, when viewpoints for an image signal and a depth signal that are required to be encoded are changed, the sequence is newly initiated. In FIG. 26, the same steps as those in FIG. 19 are denoted with like reference numerals, and only the points different from those in FIG. 19 will be described.

In the flowchart in FIG. 26, the determination unit 120 determines whether the signals at a viewpoint are adopted by evaluating the viewpoint for an image signal and a depth signal that are to be encoded (S501). Only the signals to be adopted proceed to the processing after the Step S502.

Subsequently, the encoding management unit 101 determines whether the viewpoint for an image signal and a depth signal, which has been adopted by the processing of Step S501, is change (S502). When the viewpoint is changed (S502/Y) and the determination is performed for the first time, the processing proceeds to Step S501, whereas when the viewpoint is not changed (S502/N), the processing proceeds to Step S113.

After Step S101, an image signal and a depth signal are encoded in the same way as the processing procedure for encoding an image according to Embodiment 1 in FIG. 19. However, when the processing for encoding all of the image signals and depth signals are not completed in the processing of Step S124 (S124/N), the encoding processing of Steps S501 to S124 are repeated.

The image encoding processing and the image decoding processing according to Embodiments 1 to 3 can be achieved not only by a transmission apparatus, storage apparatus, or receiving apparatus, in each of which hardware capable of executing the processing is mounted, but also by firmware stored in a ROM or flash memory or software of a computer, etc. It is also possible to provide the firmware programs and software programs by a computer-readable recording medium on which such programs have been recorded, or from a server through a wire or wireless network, or via terrestrial or satellite digital broadcasting.

The present invention has been described based on several embodiments. These embodiments have been described for exemplary purposes only, and it can be readily understood by those skilled in the art that various modifications may be made to the combinations of the aforementioned components or processes, which are also encompassed by the scope of the present invention.

INDUSTRIAL APPLICABILITY

The present invention can be applied to applications in which images taken from multiple viewpoints different from each other are encoded and decoded.

The invention claimed is:

1. An image encoding method comprising:
a first encoding step configured to generate image encoded data by encoding a plurality of images from multiple viewpoints different from each other;
a second encoding step configured to generate depth information encoded data by encoding depth information that indicates the depth of a specific space from at least one viewpoint;
a determination step configured to determine whether depth information from a certain viewpoint is made to be an encoding object; and
a stream generation step configured to generate an encoded stream including both the image encoded data generated by the first encoding step and the depth information encoded data in which the depth information, which has been determined to be the encoding object by the determination step, has been encoded by the second encoding step, wherein
when the distance between a viewpoint that is a basis of the depth information to be determined and a viewpoint that is a basis of another depth information already determined to be the encoding object is smaller than a predetermined first reference distance, the determination step determines that the depth information to be determined is not made to be the encoding object.

2. The image encoding method according to claim 1, wherein
the determination step reduces the number of the depth information to be determined as the encoding object, when the distance between a first object and a second object in the same image is smaller than a second predetermined reference distance.

3. An image encoding apparatus comprising:
a first encoding unit configured to generate image encoded data by encoding a plurality of images from multiple viewpoints different from each other;
a second encoding unit configured to generate depth information encoded data by encoding depth information that indicates the depth of a specific space from at least one viewpoint;
a determination unit configured to determine whether depth information from a certain viewpoint is made to be an encoding object; and
a stream generation unit configured to generate an encoded stream including both the image encoded data generated by the first encoding unit and the depth information encoded data in which the depth information, which has been determined to be the encoding object by the determination unit, has been encoded by the second encoding unit, wherein
when the distance between a viewpoint that is a basis of the depth information to be determined and a viewpoint that is a basis of another depth information already determined to be the encoding object is smaller than a first predetermined reference distance, the determination unit determines that the depth information to be determined is not made to be the encoding object, and
the first encoding unit, the second encoding unit, the determination unit, and the stream generation unit are hardware or a combination of hardware and software.

4. The image encoding apparatus according to claim 3, wherein
the determination unit reduces the number of the depth information to be determined as the encoding object, when the distance between a first object and a second object in the same image is smaller than a second predetermined reference distance.

* * * * *